US008285600B2

(12) United States Patent  
Mesaros

(10) Patent No.: US 8,285,600 B2
(45) Date of Patent: Oct. 9, 2012

(54) MULTIPLE CRITERIA BUYING AND SELLING MODEL

(75) Inventor: Gregory J. Mesaros, Westlake, OH (US)

(73) Assignee: eWinWin, Inc., Tampa, FL (US)

( * ) Notice: Subject to any disclaimer, the term of this patent is extended or adjusted under 35 U.S.C. 154(b) by 0 days.

(21) Appl. No.: 13/161,192

(22) Filed: Jun. 15, 2011

(65) Prior Publication Data

US 2011/0270699 A1 Nov. 3, 2011

Related U.S. Application Data

(63) Continuation of application No. 12/710,095, filed on Feb. 22, 2010.

(51) Int. Cl.
*G06Q 30/00* (2006.01)
(52) U.S. Cl. .................... 705/26.2; 235/383
(58) Field of Classification Search .............. 705/26.1, 705/26.2, 26.4, 28, 26.8, 30; 235/376, 383
See application file for complete search history.

(56) References Cited

U.S. PATENT DOCUMENTS

| | | | |
|---|---|---|---|
| 4,789,928 A | 12/1988 | Fujisaki | |
| 4,799,156 A | 1/1989 | Shavit et al. | |
| 4,887,207 A | 12/1989 | Natarajan | |
| 4,947,028 A | 8/1990 | Gorog | |
| 4,992,940 A | 2/1991 | Dworkin | |
| 5,053,956 A * | 10/1991 | Donald et al. | 713/601 |
| 5,053,957 A | 10/1991 | Suzuki | |
| 5,063,506 A | 11/1991 | Brockwell et al. | |
| 5,402,336 A | 3/1995 | Spiegelhoff et al. | |
| 5,414,838 A | 5/1995 | Kolton et al. | |
| 5,444,630 A | 8/1995 | Dlugos | |
| 5,564,115 A | 10/1996 | Clarkson | |
| 5,592,375 A | 1/1997 | Salmon et al. | |
| 5,615,109 A * | 3/1997 | Eder | 705/7.12 |
| 5,623,660 A | 4/1997 | Josephson | |
| 5,664,115 A | 9/1997 | Fraser | |
| 5,689,652 A | 11/1997 | Lupien et al. | |

(Continued)

FOREIGN PATENT DOCUMENTS

EP 2000/50970 A2 8/2000

(Continued)

OTHER PUBLICATIONS

"Excite@Home Standardizes on Siebel eBusiness; Leading Broadband Media Company Relies on Siebel Systems to Manage Customer Relationships Across Its Entire Family of Services," Business Wire, Jan. 19, 2000.

(Continued)

*Primary Examiner* — Andrew Joseph Rudy
(74) *Attorney, Agent, or Firm* — Lewis and Roca LLP

(57) ABSTRACT

A system and method for aggregating demand is provided. At least one seller may sponsor a deal room to aggregate selling goods/services from a plurality of buyers. The demand aggregation system can include a dashboard for allowing the at least one seller to set up DealRooms, price curves, offers, products, customers, and/or customer groups, for example. The dashboard can include a plurality of wizards for configuring such information. The demand aggregation system can also include seller displays for notifying buyers of changes in prices relative to ship dates and times of order. The demand aggregation system can also include a predictive modeling and reporting function. An algorithm is employed to utilize product information to post a probability chart on a product price point.

20 Claims, 25 Drawing Sheets

U.S. PATENT DOCUMENTS

| | | | |
|---|---|---|---|
| 5,710,887 A | 1/1998 | Chelliah et al. | |
| 5,717,989 A | 2/1998 | Tozzoli et al. | |
| 5,732,400 A | 3/1998 | Mandler et al. | |
| 5,734,890 A | 3/1998 | Case et al. | |
| 5,794,207 A | 8/1998 | Walker et al. | |
| 5,797,127 A | 8/1998 | Walker et al. | |
| 5,822,736 A | 10/1998 | Hartman et al. | |
| 5,826,244 A | 10/1998 | Huberman | |
| 5,835,896 A | 11/1998 | Fisher et al. | |
| 5,837,071 A | 11/1998 | Andersson et al. | |
| 5,842,178 A | 11/1998 | Giovannoli | |
| 5,845,265 A | 12/1998 | Woolston | |
| 5,850,442 A | 12/1998 | Muftic | |
| 5,870,721 A | 2/1999 | Norris | |
| 5,878,400 A | 3/1999 | Carter, III | |
| 5,890,138 A | 3/1999 | Godin et al. | |
| 5,897,620 A | 4/1999 | Walker et al. | |
| 5,903,830 A | 5/1999 | Joao et al. | |
| 5,923,741 A | 7/1999 | Wright et al. | |
| 5,933,817 A | 8/1999 | Hucal | |
| 5,940,807 A * | 8/1999 | Purcell | 705/26.35 |
| 5,945,653 A | 8/1999 | Walker et al. | |
| 5,950,172 A | 9/1999 | Klingman | |
| 5,960,411 A | 9/1999 | Hartman et al. | |
| 5,966,697 A | 10/1999 | Fergerson et al. | |
| 5,970,478 A | 10/1999 | Walker et al. | |
| 5,974,396 A * | 10/1999 | Anderson et al. | 705/7.33 |
| 5,974,406 A | 10/1999 | Bisdikian et al. | |
| 5,987,434 A | 11/1999 | Libman | |
| 5,995,943 A | 11/1999 | Bull et al. | |
| 6,014,638 A | 1/2000 | Burge et al. | |
| 6,016,484 A | 1/2000 | Williams et al. | |
| 6,026,383 A | 2/2000 | Ausubel | |
| 6,035,289 A | 3/2000 | Chou et al. | |
| 6,052,670 A | 4/2000 | Johnson | |
| 6,055,519 A | 4/2000 | Kennedy et al. | |
| 6,064,981 A | 5/2000 | Barni et al. | |
| 6,078,906 A | 6/2000 | Huberman | |
| 6,101,484 A | 8/2000 | Halbert et al. | |
| 6,108,632 A | 8/2000 | Reeder et al. | |
| 6,108,639 A | 8/2000 | Walker et al. | |
| 6,112,185 A | 8/2000 | Walker et al. | |
| 6,112,189 A | 8/2000 | Rickard et al. | |
| 6,131,087 A | 10/2000 | Luke et al. | |
| 6,141,653 A | 10/2000 | Conklin et al. | |
| 6,151,588 A | 11/2000 | Tozzoli et al. | |
| 6,154,738 A | 11/2000 | Call | |
| 6,167,383 A | 12/2000 | Henson | |
| 6,195,646 B1 | 2/2001 | Grosh et al. | |
| 6,219,653 B1 | 4/2001 | O'Neill et al. | |
| 6,233,566 B1 | 5/2001 | Levine et al. | |
| 6,236,972 B1 | 5/2001 | Shkedy | |
| 6,236,978 B1 | 5/2001 | Tuzhilin | |
| 6,249,772 B1 | 6/2001 | Walker et al. | |
| 6,253,189 B1 | 6/2001 | Feezell et al. | |
| 6,260,019 B1 | 7/2001 | Courts | |
| 6,260,024 B1 | 7/2001 | Shkedy | |
| 6,266,651 B1 | 7/2001 | Woolston | |
| 6,269,343 B1 * | 7/2001 | Pallakoff | 705/26.2 |
| 6,289,348 B1 | 9/2001 | Richard et al. | |
| 6,323,894 B1 | 11/2001 | Katz | |
| 6,332,127 B1 | 12/2001 | Bandera et al. | |
| 6,332,135 B1 | 12/2001 | Conklin et al. | |
| 6,336,105 B1 | 1/2002 | Conklin et al. | |
| 6,338,050 B1 | 1/2002 | Conklin et al. | |
| 6,360,205 B1 | 3/2002 | Iyengar et al. | |
| 6,397,208 B1 | 5/2002 | Lee | |
| 6,415,270 B1 | 7/2002 | Rackson et al. | |
| 6,418,415 B1 | 7/2002 | Walker et al. | |
| 6,418,441 B1 | 7/2002 | Call | |
| 6,449,601 B1 | 9/2002 | Friedland et al. | |
| 6,450,407 B1 | 9/2002 | Freeman et al. | |
| 6,456,986 B1 | 9/2002 | Boardman et al. | |
| 6,466,919 B1 | 10/2002 | Walker et al. | |
| 6,496,568 B1 | 12/2002 | Nelson | |
| 6,505,046 B1 | 1/2003 | Baker | |
| 6,507,279 B2 | 1/2003 | Loof | |
| 6,519,571 B1 | 2/2003 | Guheen et al. | |
| 6,553,346 B1 | 4/2003 | Walker et al. | |
| 6,553,350 B2 | 4/2003 | Carter | |
| 6,560,501 B1 | 5/2003 | Walser et al. | |
| 6,578,014 B1 | 6/2003 | Murcko, Jr. | |
| 6,584,451 B1 | 6/2003 | Shoham et al. | |
| 6,587,835 B1 | 7/2003 | Treyz et al. | |
| 6,598,026 B1 * | 7/2003 | Ojha et al. | 705/80 |
| 6,601,043 B1 * | 7/2003 | Purcell | 705/26.35 |
| 6,604,089 B1 | 8/2003 | Van Horn et al. | |
| 6,606,607 B1 | 8/2003 | Martin et al. | |
| 6,607,136 B1 | 8/2003 | Atsmon et al. | |
| 6,631,356 B1 | 10/2003 | Van Horn et al. | |
| 6,647,257 B2 | 11/2003 | Owensby | |
| 6,647,373 B1 | 11/2003 | Carlton-Foss | |
| 6,658,093 B1 | 12/2003 | Langseth et al. | |
| 6,662,194 B1 | 12/2003 | Joao et al. | |
| 6,716,101 B1 | 4/2004 | Meadows et al. | |
| 6,754,636 B1 | 6/2004 | Walker et al. | |
| 6,778,968 B1 | 8/2004 | Gulati | |
| 6,782,370 B1 | 8/2004 | Stack | |
| 6,785,661 B1 | 8/2004 | Mandler et al. | |
| 6,847,938 B1 | 1/2005 | Moore | |
| 6,847,965 B2 | 1/2005 | Walker et al. | |
| 6,850,907 B2 | 2/2005 | Lutnick et al. | |
| 6,868,392 B1 | 3/2005 | Ogasawara | |
| 6,871,140 B1 | 3/2005 | Florance et al. | |
| 6,871,190 B1 | 3/2005 | Seymour et al. | |
| 6,876,977 B1 | 4/2005 | Marks | |
| 6,876,983 B1 | 4/2005 | Goddard | |
| 6,877,655 B1 | 4/2005 | Robertson et al. | |
| 6,877,665 B2 | 4/2005 | Challa et al. | |
| 6,915,275 B2 | 7/2005 | Banerjee et al. | |
| 6,925,446 B2 | 8/2005 | Watanabe | |
| 6,928,416 B1 | 8/2005 | Bertash | |
| 6,934,690 B1 | 8/2005 | Van Horn et al. | |
| 6,954,734 B1 | 10/2005 | Kuelbs et al. | |
| 6,990,467 B1 | 1/2006 | Kwan | |
| 6,992,794 B2 | 1/2006 | Keane et al. | |
| 7,039,603 B2 | 5/2006 | Walker et al. | |
| 7,047,206 B1 | 5/2006 | Schultze | |
| 7,062,452 B1 | 6/2006 | Lotvin et al. | |
| 7,065,494 B1 | 6/2006 | Evans | |
| 7,069,228 B1 | 6/2006 | Rose et al. | |
| 7,072,849 B1 | 7/2006 | Filepp et al. | |
| 7,072,853 B2 | 7/2006 | Shkedi | |
| 7,076,447 B1 | 7/2006 | Peyser et al. | |
| 7,080,030 B2 | 7/2006 | Eglen et al. | |
| 7,103,565 B1 | 9/2006 | Vaid | |
| 7,107,225 B1 | 9/2006 | McClung, III | |
| 7,107,226 B1 | 9/2006 | Cassidy et al. | |
| 7,120,592 B1 | 10/2006 | Lewis | |
| 7,124,099 B2 | 10/2006 | Mesaros | |
| 7,124,107 B1 | 10/2006 | Pishevar et al. | |
| 7,133,835 B1 | 11/2006 | Fusz et al. | |
| 7,143,057 B2 | 11/2006 | Kuelbs et al. | |
| 7,146,330 B1 | 12/2006 | Alon et al. | |
| 7,165,045 B1 | 1/2007 | Kim-E | |
| 7,181,419 B1 * | 2/2007 | Mesaros | 705/26.2 |
| 7,194,427 B1 * | 3/2007 | Van Horn et al. | 705/26.2 |
| 7,194,442 B1 | 3/2007 | Flanagan et al. | |
| 7,213,754 B2 | 5/2007 | Eglen et al. | |
| 7,254,833 B1 | 8/2007 | Cornelius et al. | |
| 7,296,001 B1 | 11/2007 | Ephrati et al. | |
| 7,330,826 B1 | 2/2008 | Porat et al. | |
| 7,343,317 B2 | 3/2008 | Jokinen et al. | |
| 7,349,890 B1 | 3/2008 | Pathak et al. | |
| 7,363,246 B1 | 4/2008 | Van Horn et al. | |
| 7,364,086 B2 * | 4/2008 | Mesaros | 235/492 |
| 7,379,899 B1 | 5/2008 | Junger | |
| 7,415,428 B2 | 8/2008 | Garwood | |
| 7,415,617 B2 * | 8/2008 | Ginter et al. | 713/189 |
| 7,433,832 B1 | 10/2008 | Bezos et al. | |
| 7,464,051 B1 | 12/2008 | Heggem | |
| 7,475,024 B1 | 1/2009 | Phan | |
| 7,496,543 B1 | 2/2009 | Bamford et al. | |
| 7,539,742 B2 | 5/2009 | Spector | |
| 7,542,927 B2 * | 6/2009 | Mukai | 705/26.2 |
| 7,552,069 B2 | 6/2009 | Kepecs | |
| 7,584,146 B1 * | 9/2009 | Duhon | 705/38 |

| | | |
|---|---|---|
| 7,593,871 B1 | 9/2009 | Mesaros |
| 7,596,509 B1 * | 9/2009 | Bryson ............... 705/27.2 |
| 7,599,857 B2 | 10/2009 | Bishop et al. |
| 7,606,731 B2 * | 10/2009 | McClung, III ......... 705/14.34 |
| 7,624,044 B2 * | 11/2009 | Wren ................. 705/14.4 |
| 7,630,919 B1 | 12/2009 | Obrecht |
| 7,636,672 B2 | 12/2009 | Angles et al. |
| 7,672,870 B2 | 3/2010 | Haines et al. |
| 7,680,696 B1 | 3/2010 | Murray |
| 7,689,463 B1 | 3/2010 | Mesaros |
| 7,689,468 B2 | 3/2010 | Walker et al. |
| 7,689,469 B1 | 3/2010 | Mesaros |
| 7,693,748 B1 * | 4/2010 | Mesaros ............... 705/26.42 |
| 7,698,173 B1 | 4/2010 | Burge et al. |
| 7,698,208 B2 * | 4/2010 | Hirani et al. .......... 705/37 |
| 7,698,240 B1 * | 4/2010 | Chatterjee et al. ..... 705/36 |
| 7,706,838 B2 | 4/2010 | Atsmon et al. |
| 7,725,350 B2 | 5/2010 | Schlee |
| 7,729,977 B2 * | 6/2010 | Xiao et al. ........... 705/37 |
| 7,747,473 B1 | 6/2010 | Mesaros |
| 7,792,699 B2 * | 9/2010 | Kwei ................. 705/26.4 |
| 7,813,955 B2 | 10/2010 | Ariff et al. |
| 7,814,106 B2 | 10/2010 | Guido et al. |
| 7,815,114 B2 * | 10/2010 | Mesaros ............... 235/383 |
| 7,818,212 B1 * | 10/2010 | Mesaros ............... 705/26.1 |
| 7,860,776 B1 | 12/2010 | Chin et al. |
| 7,890,373 B2 | 2/2011 | Junger |
| 7,899,707 B1 * | 3/2011 | Mesaros ............... 705/14.66 |
| 7,912,761 B2 | 3/2011 | Vaid |
| 7,917,386 B2 | 3/2011 | Christensen |
| 7,917,416 B2 * | 3/2011 | Quinn et al. .......... 705/36 R |
| 7,937,288 B2 | 5/2011 | Blaser et al. |
| 7,942,316 B2 * | 5/2011 | Bennett et al. ........ 235/379 |
| 7,958,007 B2 | 6/2011 | Urbanski et al. |
| 8,005,747 B2 | 8/2011 | Forlai |
| 8,015,583 B2 * | 9/2011 | Bates et al. ........... 725/86 |
| 8,024,226 B2 | 9/2011 | Fusz et al. |
| 8,032,409 B1 | 10/2011 | Mikurak |
| 8,032,422 B2 | 10/2011 | Pickard et al. |
| 8,036,941 B2 * | 10/2011 | Bennett et al. ........ 705/26.1 |
| 8,073,762 B2 * | 12/2011 | Sheth et al. ........... 705/37 |
| 8,140,402 B1 | 3/2012 | Mesaros |
| 8,140,405 B2 | 3/2012 | Mesaros |
| 8,140,442 B2 * | 3/2012 | Heyer ................. 705/313 |
| 8,160,931 B2 | 4/2012 | Mesaros |
| 8,196,811 B2 | 6/2012 | Mesaros |
| 8,219,460 B1 | 7/2012 | Mesaros |
| 2001/0011264 A1 | 8/2001 | Kawasaki |
| 2001/0014868 A1 | 8/2001 | Herz et al. |
| 2001/0018660 A1 | 8/2001 | Sehr |
| 2001/0039514 A1 | 11/2001 | Barenbaum |
| 2001/0044751 A1 | 11/2001 | Pugliese, III et al. |
| 2001/0047296 A1 | 11/2001 | Wyker |
| 2001/0047311 A1 | 11/2001 | Singh |
| 2002/0026351 A1 | 2/2002 | Coleman |
| 2002/0032573 A1 | 3/2002 | Williams et al. |
| 2002/0035536 A1 | 3/2002 | Gellman |
| 2002/0040352 A1 | 4/2002 | McCormick |
| 2002/0046105 A1 | 4/2002 | Gardenswartz et al. |
| 2002/0046147 A1 | 4/2002 | Livesay et al. |
| 2002/0052782 A1 | 5/2002 | Landesmann |
| 2002/0065762 A1 | 5/2002 | Lee et al. |
| 2002/0065769 A1 | 5/2002 | Irribarren et al. |
| 2002/0069079 A1 | 6/2002 | Vega |
| 2002/0080950 A1 | 6/2002 | Koko et al. |
| 2002/0082881 A1 * | 6/2002 | Price et al. ........... 705/7 |
| 2002/0091580 A1 | 7/2002 | Wang |
| 2002/0099643 A1 | 7/2002 | Abeshouse et al. |
| 2002/0103741 A1 | 8/2002 | Boies et al. |
| 2002/0107773 A1 | 8/2002 | Abdou |
| 2002/0116282 A1 | 8/2002 | Martin et al. |
| 2002/0143692 A1 | 10/2002 | Heimermann et al. |
| 2002/0147670 A1 | 10/2002 | Lange |
| 2002/0165771 A1 | 11/2002 | Walker et al. |
| 2002/0165821 A1 | 11/2002 | Tree |
| 2002/0169703 A1 | 11/2002 | Lutnick et al. |
| 2002/0169759 A1 | 11/2002 | Kraft et al. |
| 2002/0174051 A1 | 11/2002 | Wise |
| 2002/0188508 A1 | 12/2002 | Lee et al. |
| 2003/0004802 A1 | 1/2003 | Callegari |
| 2003/0004808 A1 | 1/2003 | Elhaoussine et al. |
| 2003/0028473 A1 | 2/2003 | Eso et al. |
| 2003/0041002 A1 | 2/2003 | Hao et al. |
| 2003/0055774 A1 | 3/2003 | Ginsberg |
| 2003/0093355 A1 | 5/2003 | Issa |
| 2003/0109949 A1 | 6/2003 | Ikeda |
| 2003/0111531 A1 | 6/2003 | Williams |
| 2003/0115100 A1 | 6/2003 | Teicher |
| 2003/0126040 A1 | 7/2003 | Mesaros |
| 2003/0126250 A1 | 7/2003 | Jhanji |
| 2003/0149619 A1 | 8/2003 | Stanley et al. |
| 2003/0167222 A1 | 9/2003 | Mehrotra et al. |
| 2003/0195832 A1 | 10/2003 | Cao et al. |
| 2003/0208412 A1 | 11/2003 | Hillestad et al. |
| 2003/0216960 A1 | 11/2003 | Postrel |
| 2003/0233276 A1 | 12/2003 | Pearlman et al. |
| 2003/0233557 A1 | 12/2003 | Zimmerman |
| 2004/0015415 A1 | 1/2004 | Cofino et al. |
| 2004/0039661 A1 | 2/2004 | Fuzell-Casey et al. |
| 2004/0039677 A1 | 2/2004 | Mura et al. |
| 2004/0128197 A1 | 7/2004 | Bam et al. |
| 2004/0215500 A1 | 10/2004 | Monahan |
| 2005/0021400 A1 | 1/2005 | Postrel |
| 2005/0021401 A1 | 1/2005 | Postrel |
| 2005/0038713 A1 | 2/2005 | Pickard et al. |
| 2005/0149458 A1 | 7/2005 | Eglen et al. |
| 2005/0171918 A1 | 8/2005 | Eden et al. |
| 2005/0197857 A1 | 9/2005 | Avery |
| 2005/0216337 A1 | 9/2005 | Roberts et al. |
| 2005/0272442 A1 | 12/2005 | Miller et al. |
| 2005/0273415 A1 | 12/2005 | Mathews et al. |
| 2006/0059062 A1 | 3/2006 | Wood et al. |
| 2006/0069619 A1 | 3/2006 | Walker et al. |
| 2006/0095366 A1 | 5/2006 | Sheth et al. |
| 2006/0106678 A1 | 5/2006 | Walker et al. |
| 2006/0129454 A1 | 6/2006 | Moon et al. |
| 2006/0143080 A1 | 6/2006 | Garg et al. |
| 2006/0178918 A1 | 8/2006 | Mikurak |
| 2007/0150349 A1 | 6/2007 | Handel et al. |
| 2007/0220169 A1 | 9/2007 | Silver et al. |
| 2008/0015711 A1 | 1/2008 | Charland et al. |
| 2008/0052189 A1 | 2/2008 | Walker et al. |
| 2008/0126201 A1 | 5/2008 | Ullah |
| 2009/0055328 A1 | 2/2009 | Bamford et al. |
| 2009/0059856 A1 | 3/2009 | Kermoal et al. |
| 2009/0083136 A1 | 3/2009 | Blackwood |
| 2009/0187455 A1 | 7/2009 | Fernandes et al. |
| 2009/0198622 A1 | 8/2009 | Temte et al. |
| 2009/0307073 A1 | 12/2009 | MirrokniBanadaki et al. |
| 2009/0327034 A1 | 12/2009 | Peterson |
| 2009/0327038 A1 | 12/2009 | Peterson |
| 2009/0327101 A1 | 12/2009 | Sayed |
| 2009/0327140 A1 | 12/2009 | Kuo |
| 2010/0088174 A1 | 4/2010 | Cohagan et al. |
| 2010/0125525 A1 | 5/2010 | Inamdar |
| 2011/0004515 A1 | 1/2011 | Mesaros |
| 2011/0016010 A1 | 1/2011 | Mesaros |
| 2011/0040624 A1 | 2/2011 | Jhanji |
| 2011/0125592 A1 | 5/2011 | Mesaros |
| 2011/0213648 A1 | 9/2011 | Mesaros |
| 2011/0213649 A1 | 9/2011 | Mesaros |
| 2011/0213650 A1 | 9/2011 | Mesaros |
| 2011/0213653 A1 | 9/2011 | Mesaros |
| 2011/0238476 A1 | 9/2011 | Carr et al. |
| 2011/0246271 A1 | 10/2011 | Mesaros |
| 2011/0246274 A1 | 10/2011 | Mesaros |
| 2011/0264499 A1 | 10/2011 | Abendroth et al. |
| 2011/0270699 A1 | 11/2011 | Mesaros |
| 2011/0270700 A1 | 11/2011 | Mesaros |
| 2012/0022970 A1 | 1/2012 | Mesaros |
| 2012/0029993 A1 | 2/2012 | Mesaros |
| 2012/0029995 A1 | 2/2012 | Mesaros |
| 2012/0035999 A1 | 2/2012 | Mesaros |
| 2012/0036000 A1 | 2/2012 | Mesaros |
| 2012/0036031 A1 | 2/2012 | Mesaros |
| 2012/0041811 A1 | 2/2012 | Mesaros |
| 2012/0054012 A1 | 3/2012 | Mesaros |

| | | | |
|---|---|---|---|
| 2012/0158475 A1 | 6/2012 | Mesaros | |
| 2012/0179526 A1 | 7/2012 | Mesaros | |
| 2012/0179530 A1 | 7/2012 | Mesaros | |

FOREIGN PATENT DOCUMENTS

| | | | |
|---|---|---|---|
| JP | 11-184910 | | 7/1999 |
| WO | 9821713 | | 5/1998 |
| WO | 9821713 | A2 | 5/1998 |
| WO | 0050970 | A2 | 8/2000 |
| WO | 00/70424 | A2 | 11/2000 |
| WO | WO 2008/083371 | | 7/2008 |

OTHER PUBLICATIONS

"Global Real Estate Markets Spell Opportunity, Experts Tell Realtors," PR Newswire, Nov. 21, 1991.
"Lucent Launches On-Line Catalog" M2 Presswire, Jan. 22, 1999.
"Screen Savers," Lawyer, Feb. 19, 2001.
"The Oil and Gas Asset Clearinghouse, a Pertoleum Place Company, to Host It's Second Exclusively Online Auction of Oil and Gas Properties on Aug. 14-16, 2000." PR Newswire, p. 5591, Aug. 3, 2000, 2 pages.
Accompany: How it Works: "Anatomy of a Buy-Cycle", Jun. 15, 1999, pp. 1-3.
China—Welcome to the Machine: New Machinery, Electronics B-to-B Website Launched. China Online, Jul. 24, 2000, 1 page.
Ashton Technology Group, Inc. Announces NASDAQ National Market System Listing; Enters into Clearing Arrangements with 8 National Brokerage Firms, Business Wire, Jan. 3, 2000. http://www.findarticles.com/p/articles/mi_m0EIN/is_2000_Jan_3/ai_58429780/print. Last accessed Apr. 8, 2009, 3 pages.
Beaty. Mass Customisation. Manufacturing Engineer, vol. 75, issue 5, Oct. 1996, pp. 217-220.
Blyth, et al. Merchandising System Collecting Data. Derwent Information Ltd. Last accessed Jan. 20, 2009, 2 pages.
Breyer. "Bargains in Cyberspace," National Home Center News, vol. 26, No. 21, p. 21, Nov. 20, 2000.
Deierlein. "Smart Fuel Buying," Fleet Equipment, vol. 24, No. 8, pp. 42-44, Aug. 1998.
DiBiase. The Inventory Simulator: A Micro Computer Based Inventory Model. Modeling and Simulation on Microcomputers, Paul F. Hogan, ed., Society for Computer Simulation (SCS), La Jolla, pp. 104-106, Jan. 1987.
DomainTradeLIVE! Launched by solutionhome.com. Business Wire, Oct. 20, 1999, 1 page.
Easley, et al. Time and the Process of Security Price Adjustment, Journal of Finance, vol. 47, No. 2, Jun. 1992. http://ideas.repec.org/a/bla/jfinan/v47y1992i2p576-605.html. Last accessed Sep. 10, 2009, 30 pages.
Edwards. "Increase Your Bottom Line : Automated Customer Service and Marketing," E-Business Advisor, vol. 17, No. 7, p. 30, Jul. 1999.
Enos. Vying to be the Top Dog. Upside vol. 12, No. 3, pp. 160-165, Mar. 2000.
Gaonkar, et al. Strategic Sourcing and Collaborative Planning in Internet Enabled Supply Chain Networks Producing Multigeneration Products. IEEE Transactions on Automation Science and Engineering, vol. 2, issue 1, Jan. 2005, pp. 54-66.
Gurley. Creating a Great E-Commerce Business. Fortune, Mar. 16, 1998.
International Search Report for PCT Application No. PCT/US 07/89195, mailed May 12, 2008, 8 pages.
Jonsson, et al. Impact of Processing and Queueing Times on Order Quantities. Mater. Flow, vol. 2, No. 4, pp. 221-230, Aug. 1985. [in related U.S. Appl. No. 09/922,884 on May 7, 2004, but the examiner did not include the art per MPEP 707.05(a)].
Kantrow, American Express Sets a Three-Tier Pricing on Optima, Dialog: File 148 #05812190 (The Gale Group), American Banker, v157, n25, p. 1(2), Feb. 6, 1992.
Koenig, et al. Quantitative Industrial Ecology. IEEE Transactions on Systems, Man and Cybernetics, Part C, Issue 1, Feb. 1998, pp. 16-28.
Lamparter. "Natural Selection." American Printer, vol. 217, No. 3, pp. 54-64, Jun. 1996.
Magna Cash Cybersource Partner to Expand Online Payment Options. PR Newswire, New York, Jan. 15.

Market Engineering Research for Structural Impacts of e-Business in the European Chemicals Industry (Ch. 3), Structural Impact of e-Business on the Chemicals Industry, Frost & Sullivan, Market Research Report, Jun. 2001.
Maxwell, Pricing education in the United States of America: responding to the needs of business, The Journal of Product & Brand Management, Santa Barbara, Aug. 1998, vol. 7, Issue 4, p. 336-341.
Medrano, et al. Strategic Behaviour and Price Discovery, RAND Journal of Economics, vol. 32, No. 2, Jun. 21, 2001. https://editorialexpress.com/cgi-bin/rje_online.cgi?action=view&year=2001&issue=sum&page=221&&tid=83197&sc=uogfbloa. Last accessed Sep. 3, 2009, 29 pages.
Meriam Webster's Collegiate Dictionary, Tenth Edition, 1997, p. 732.
Meridex Introduces Advanced Features to its B2B Network, PR Newswire, May 25, 2000. http://www.canadait.com/cfm/index.cfm?It=106&Id=3421&Se=355&Sv=Company&Lo=441. Last accessed Apr. 30, 2009, 3 pages.
Mesaros. Innovation in Difficult Times : How US Manufacturers are Using Demand Aggregation to Increase Sales and Lower Costs. Jul. 26, 2001. Last accessed Mar. 19, 2008, 4 pages.
MobShop Launches New Rev of Selling App, Online Reporter, May 28, 2001. http://findarticles.com/p/articles/mi_hb5932/is_200105/ai_n23884526/. Last accessed Apr. 30, 2009, 2 pages.
MobShop Selected by WHN(TM) (WhatsHotNow.com (R), Inc.) to Power Demand Aggregation Within Its Licensed Merchandise Marketplace; Demand Aggregation Technology Enables Marketplaces to Improve Liquidity by Generating Volume Transactions, PR Newswire, San Francisco, Jan. 16, 2001. http://www.allbusiness.com/retail-trade/4291613-1.html.
Moody. From E-Commerce to We-Commerce. Computer Weekly, 42, Jun. 3, 1999. Last accessed Apr. 9, 2009, 2 pages.
Mullich. Altrade Serves as a Natural Resource—A Head Start and Big Trading Volume Give the Natural Gas Marketplace a Competitive Edge. Can it Last? Information Week, 152, Jun. 12, 2000, 3 pages.
Myers. "E-Solutions for Surplus Inventory," Dsn Retailing Today, vol. 39, No. 21, p. 13, Nov. 6, 2000.
Nellore, et al. Factors Influencing Success in Integrated Product Development (IPD) Projects. IEEE Transactions on Engineering Management, vol. 48, issue 2, May 2001, pp. 164-174.
OA dated Feb. 23, 2010 for U.S. Appl. No. 09/426,063, 11 pages.
OA dated Apr. 29, 2009 for U.S. Appl. No. 10/464,585, 19 pages.
OA dated Jul. 2, 2009 for U.S. Appl. No. 09/426,063, 24 pages.
OA dated Sep. 9, 2009 for U.S. Appl. No. 11/556,604, 60 pages.
OA dated Oct. 6, 2009 for U.S. Appl. No. 12/042,051, 53 pages.
OA dated Oct. 28, 2009 for U.S. Appl. No. 10/464,585, 37 pages.
OA dated Nov. 27, 2009 for U.S. Appl. No. 11/680,431, 43 pages.
OA dated Apr. 16, 2010 for U.S. Appl. No. 12/042,051, 32 pages.
OA dated Apr. 29, 2010 for U.S. Appl. No. 10/464,585, 16 pages.
OA Dated Apr. 10, 2009 for U.S. Appl. No. 10/351,069, 27 pages.
OA Dated Apr. 6, 2009 for U.S. Appl. No. 11/680,431, 33 pages.
OA Dated Feb. 6, 2009 for U.S. Appl. No. 09/626,296, 11 pages.
OA Dated Mar. 25, 2009 for U.S. Appl. No. 11/556,604, 59 pages.
OA dated Nov. 17, 2011 for U.S. Appl. No. 09/922,884, 13 pages.
OA dated Jan. 3, 2012 for U.S. Appl. No. 13/106,622, 20 pages.
OA dated Nov. 17, 2011 for U.S. Appl. No. 12/704,280, 18 pages.
Notice of Allowance mailed dated Dec. 5, 2011 for U.S. Appl. No. 12/539,714, 26 pages.
First Office Action dated Nov. 4, 2011 for U.S. Appl. No. 13/160,128, 58 pages.
Mercata.com, Archived by Archive.org on or before Jun. 19, 2000.
Kauffman et al., "Bid Together Buy Together; On the efficacy of group-buying business models in Internet-based Selling", May 16, 2001.
OA dated Oct. 24, 2011 for U.S. Appl. No. 11/618,412, 42 pages.
OA dated Jan. 3, 2012 for U.S. Appl. No. 13/105,387, 107 pages.
Garner, K., "Culture Vulture: up from under—Germaine Greer," Off Our Backs, Jun. 24, 1971, vol. 1, Iss. 23, p. 14.
OA dated Dec. 16, 2011 for U.S. Appl. No. 11/618,418, 29 pages.
OA dated Oct. 18, 2011 for U.S. Appl. No. 12/788,513, 61 pages.
Tippr http://www.tipper.com/ Internet Archive (Feb. 29, 2008)—http://web.archive.org/web/20080229121727/http://tippr.com/.
OA dated Jan. 4, 2012 for U.S. Appl. No. 09/922,884, 13 pages.

OA dated Jan. 10, 2012 for U.S. Appl. No. 13/272,147, 13 pages.
Anon. "Open Market Introduces New Software for Dynamic Web-based Commerce" PR Newswire, Oct. 1, 1996.
Millman, H. "Legacy Data Links Shrink Costs," InfoWorld, vol. 20, No. 1, pp. 51, 56, Jan. 5, 1998.
Anon. "ELCOM: Virgin Trains Cuts Procurement Costs with elcom. com; New Electronic Ordering System Offers Personalised Pricing," M2 Presswire, Jul. 18, 2000.
OA dated Jan. 3, 2012 for U.S. Appl. No. 13/270,133, 14 pages.
OA dated Oct. 28, 2011 for U.S. Appl. No. 12/539,714, 89 pages.
OA dated Dec. 22, 2011 for U.S. Appl. No. 13/269,360, 19 pages.
Office Action dated Dec. 9, 2011 for U.S. Appl. No. 13/160,128, 58 pages.
Office Action dated Dec. 28, 2011 for U.S. Appl. No. 13/275,054, 17 pages.
Office Action dated Dec. 29, 2011 for U.S. Appl. No. 13/274,213, 18 pages.
Rozic, Jeff, "Who's Watching While You Surf?", Inside Business 3, 5, 64, May 2001.
OA dated Sep. 12, 2011 for U.S. Appl. No. 09/922,884, 31 pages.
OA dated Sep. 2, 2011 for U.S. Appl. No. 11/680,431, 24 pages.
OA dated Sep. 21, 2011 for U.S. Appl. No. 13/106,622, 52 pages.
OA Dated Nov. 3, 2008 for U.S. Appl. No. 11/150,920, 161 pages.
OA Dated Oct. 20, 2008 for U.S. Appl. No. 10/464,585, 11 pages.
OA Dated Oct. 27, 2008 for U.S. Appl. No. 11/464,376, 13 pages.
O'Gorman, et al. Considerations for Connecting Renewable Generation into Bulk Supply Networks. Sixth International Conference on Advances in Power System Control, Operation and Management, ASDCOM 2003, vol. 2, Nov. 11-14, pp. 674-680. Last accessed Sep. 10, 2009, 7 pages.
Rahim, et al. Optimal Decision Rules for Determining the Length of Production Run, (Abstract Only), Computers and Industrial Engineering, vol. 9, No. 2, pp. 195-202, 1985.
Rahim, et al. "Optimal Production Run for a Process Having Multilevel Tool Wear," (Abstract only), International Journal of Systems Science, vol. 19, No. 1, pp. 139-149, 1988.
Rahim, et al. "Optimal Production Run for a Process with Random Linear Drift," (Abstract only), Omega, vol. 16, No. 4, pp. 347-351, 1988.
Scott. Chains of Trust, Supply Chain Management, Manufacturing Engineer, vol. 75, issue 4, Aug. 1996, pp. 172-174.
Scott. Supply Partnerships in the Aerospace Industry. Transforming Your Material Flow: A Practical Insight Into World Class Logistics and Supply Chain Management IEE Colloquium on, Oct. 24, 1996, pp. 3/1-3/3.
Scott. Supply Partnerships and the Effective Management of Low Cost Components. Transforming Your Material Flow: A Practical Insight Into World Class Logistics and Supply Chain Management IEE Colloquium on, Mar. 19, 1996, pp. 2/1-2/4.
Sivakumar, et al. Price Match Guarantees: Rationale, Implementation, and Consumer Response. Pricing Strategy and Practice, Bradford, 1996, vol. 4, issue 4, 11 pgs. Recovered from ProQuest Database Aug. 25, 2006.
Sjostrom. Price Discrimination by Shipping Conferences. Logistics and Transportation Review, Jun. 1992, [from Dialog® File 15, acc. No. 00727777 93-76998].
Tanaka. "As Other Companies Crumble, Ecount Carves Out Niche in Online-Payment Services." Knight Rider Tribune News Service, Washington, Feb. 27, 2002. (Recovered from ProQuest Database Dec. 4, 2006.).
Thomas, et al. JIT: Strategies for Distant Suppliers (Abstract). Business, vol. 40, No. 4, pp. 36-39, Dec. 1990.
Watson. The Effects of Demand Forecast Fluctuations on Customer Service and Inventory Cost When Demand is Lumpy. Journal of the Operational Research Society, vol. 38, No. 1, pp. 75-82, Jan. 1987. http://www.palgrave-journals.com/jors/journal/v38/n1/abs/jors19879a.html. Last accessed Sep. 10, 2009, 8 pages.
Yeh, et al. "Optimal Production Run Length for Products Sold with Warranty," (Abstract only), European Journal of Operational Research, vol. 120, No. 3, pp. 575-582, Feb. 1, 2000.
"Supplier pricing and lot sizing when demand is price sensitive". Abad, P.L. Fac. of Bus., McMaster Univ., Hamilton, Ont., Canada.
European Journal of Operational Research, vol. 78, No. 3, p. 334-54. Date: Nov. 10, 1994 [recovered from Dialog on Oct. 20, 2009], 1 page.
Efficient bid pricing based on costing methods for Internet bid systems Sung Eun Park; Yong Kyu Lee. Dept. of Comput. Eng., Dongguk Univ., South Korea. Book Title: Web Information Systems—WISE 2006. 7th International Conference on Web Information Systems Engineering. Proceedings (Lecture Notes in Computer Science vol. 42) [recovered from Dialog on ], 1 page.
Advisory Action Dated Apr. 29, 2010 for U.S. Appl. No. 11/680,431.
OA dated Sep. 17, 2010 for U.S. Appl. No. 11/618,412, 97 pages.
Mack, Going Local. © 2006 ProQuest Info&Learning. Last accessed Sep. 17, 2010, 2 pages.
De Gheest, Computer Implemented Electronic Bidding for Electronic Sales Application. Derwent Acc No. 2001-006585, © 2010 Derwent Information Ltd. Last accessed Sep. 17, 2010, 2 pages.
Swartz, Wireless Ads: Loved/Loathed. Wireless Review. © 2006 The Gale Group. Last accessed Sep. 17, 2010, 3 pages.
OA dated Sep. 30, 2010 for U.S. Appl. No. 11/618,418, 125 pages.
OA dated Aug. 4, 2010 for U.S. Appl. No. 11/680,415, 65 pages.
OA dated Oct. 21, 2010 for U.S. Appl. No. 12/788,513, 62 pages.
OA mailed Mar. 21, 2011 for U.S. Appl. No. 12/887,778, 38 pages.
OA mailed Feb. 18, 2011 for U.S. Appl. No. 11/680,431, 33 pages.
OA mailed Jan. 24, 2011 for U.S. Appl. No. 11/680,415, 24 pages.
OA mailed Feb. 23, 2011 for U.S. Appl. No. 11/618,412, 27 pages.
OA mailed Mar. 28, 2011 for U.S. Appl. No. 11/618,418, 22 pages.
OA mailed Jan. 21, 2011 for U.S. Appl. No. 12/881,923, 48 pages.
OA dated Apr. 6, 2011 for U.S. Appl. No. 12/788,513, 38 pages.
OA dated Aug. 18, 2011 for U.S. Appl. No. 12/881,923, 32 pages.
OA dated Aug. 2, 2011 for U.S. Appl. No. 11/680,415, 27 pages.
OA dated Jul. 28, 2011 for U.S. Appl. No. 12/704,280, 55 pages.
Amazon.com, "Help/Shipping", Archived on Feb. 2, 2003 by www.archive.org. Last accessed Mar. 19, 2008, 9 pages.
Business Editors and High Tech Writers, "eWinWin Announces the Release of DAS 3.0, the Next Generation of B2B Demand Aggregation Solutions" Dec. 28, 2000, Businee wire, p. 1 (4 pages).
Business Editors. "Weatherchem Announces Major eCommerce Success with eWinWin", Aug. 9, 2001, Business Wire, (p. 1) 2 pages.
CBOT, "Trading in Futures Can Provide Considerable Financial Rewards", Last accessed Mar. 19, 2008, 41 pages.
Chicago Board of Trade, "Knowledge Center," as archived by Archive.org, on Feb. 13, 2003.
Computer Geeks Discount Outlet, "Order Status," Mar. 1, 2002.
eWinWin, "eCommerce Redefined : The Positive Impact of eWinWin's Demand Aggregation System on the Manufacturing Supply Chain", Oct. 2000. Last accessed Mar. 19, 2008, 11 pages.
OA dated Mar. 19, 2008 for U.S. Appl. No. 11/152,462, 26 pages.
OA Dated Oct. 29, 2008 for U.S. Appl. No. 11/152,462, 27 pages.
Stacklin. "Bridgestone Printing Unit Teams with ewinwin", Mar. 25, 2002, Crain's Cleveland Business, vol. 23, issue 12, 3 pages.
Wayback Machine. "Searched for http://www.ewinwin.com/corp/ewinwinwhitepaper.pdf", Oct. 2, 2008, Archive.org.
Amazon.com, "Earths Biggest Selection," Jun. 30, 2001, archived by Archive.org: http://web.archive.org/web/20010630130618/http://www.amazon.com/exec/obidos/subst/home/home.html.
Boroshok, Jon, "Wireless, Location-Based, Shopping Portal being Tested in New York City and San Francisco by GeePS.com, Inc.," published Apr. 3, 2000, New York, NY and San Francisco, CA; as downloaded from http://www.techmarcom.com/geeps.html on Jan. 6, 2012.
Business/High Tech Editors "Mercata Launches Compelling Alternative to Online Auctions," Business Wire, Nov. 15, 2000.
Adam et al. "Strategic Directions in Electronic Commerce and Digital Libraries: Towards a Digital Agora". *ACM Computing Surveys* [Online] 1996, vol. 28, Issue 4, pp. 818-835.
ebay.com "eBay Services: The Feedback Forum," Aug. 1, 2001, archived by archive.org: "http://web.archive.org/web/20010801145144/http://pages.ebay.com/services/forum/feedback.html".
Ha, Sung Ho et al., "Matching Buyers and Suppliers: An Intelligent Dynamic-Exchange Model," IEEE Intelligent Systems, 2001.

Hinze, Annika et al., "Location- and Time-Based Information Delivery in Tourism," as downloaded Apr. 20, 2012 from http://page.mi.fu-berlin.de/voisard/Papers/sstd03.pdf.

IEEE Xplore Search Results, Aug. 12, 2007.

Mercata.com "How to Ship an Order" Oct. 22, 2000, archived by archive.org: http://web.archive.org/web/20001022035135/http://www.mercata.com/cgi-bin/mercata/mercata/v1/pages/editorial.jsp?name=Ship+an+Order.

Rajaraman, Rajesh et al., "The Effect of Demand Elasticity on Security Prices for the Poolco and Multi-Lateral Contract Models," IEEE Transactions on Power Systems, vol. 12, No. 3, Aug. 1997.

WHN Selects MobShop to Power Aggregated Buying for WHN Exchange. Jan. 23, 2001. http://www.allbusiness.com/retail-trade/4291613-1.html. Last accessed Sep. 11, 2009, 2 pages.

U.S. Appl. No. 13/104,723 Office Action mailed Mar. 22, 2012.
U.S. Appl. No. 12/710,095 Office Action mailed Apr. 6, 2012.
U.S. Appl. No. 13/161,192 Office Action mailed Apr. 5, 2012.
U.S. Appl. No. 13/251,668 Office Action mailed Feb. 9, 2012.
U.S. Appl. No. 13/251,668 Final Office Action mailed Apr. 17, 2012.
U.S. Appl. No. 13/160,128 Final Office Action mailed Feb. 22, 2012.
U.S. Appl. No. 13/271,464 Office Action mailed May 10, 2012.
U.S. Appl. No. 09/922,884 Office Action mailed May 1, 2012.
U.S. Appl. No. 13/104,723 Final Office Action mailed Jun. 8, 2012.
U.S. Appl. No. 13/270,133 Final Office Action mailed Jun. 12, 2012.
U.S. Appl. No. 13/292,971 Office Action mailed Jun. 14, 2012.
U.S. Appl. No. 13/272,144 Office Action mailed May 16, 2012.
U.S. Appl. No. 11/680,415 Final Office Action mailed May 2, 2012.
U.S. Appl. No. 13/269,360 Final Office Action mailed Jul. 6, 2012.
U.S. Appl. No. 12/710,095 Final Office Action mailed Jun. 28, 2012.
U.S. Appl. No. 12/881,923 Office Action mailed Jun. 29, 2012.
U.S. Appl. No. 13/345,681 Office Action mailed Jun. 20, 2012.
U.S. Appl. No. 11/618,412 Final Office Action mailed May 1, 2012.

* cited by examiner

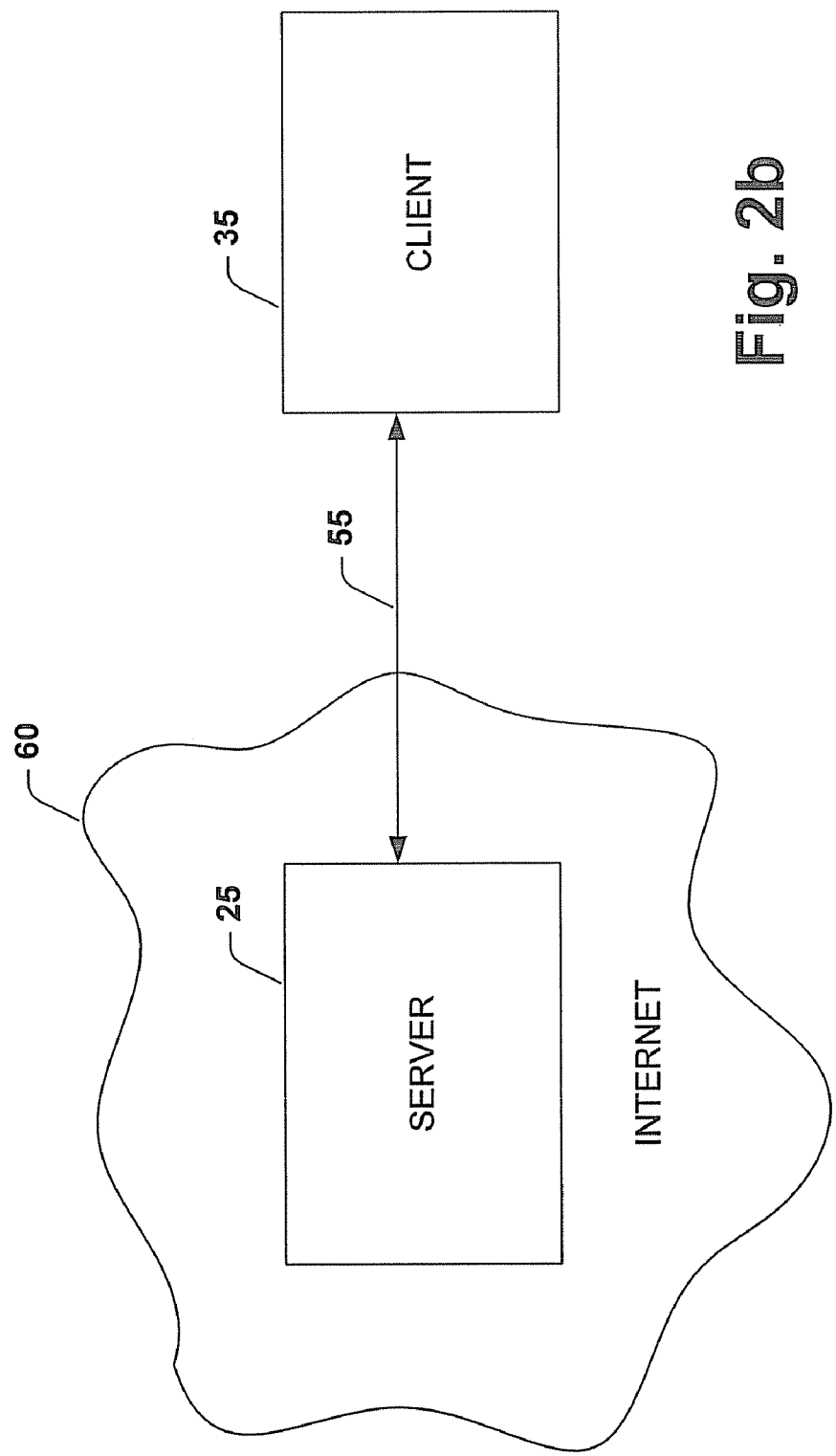

PRODUCT: GLASS

BUYER'S PRODUCT ORDERING CRITERIA

166

ENTER PRICE RANGE: ____ - ____ (dollars/pound)

168

ENTER VOLUME RANGE: ____ - ____ (pounds)

170

ENTER DELIVERY RANGE: ____ - ____ (days)

172

ENTER ACCEPTABLE % DEFECTS: ____ (percent)

174

ENTER MINIMUM WARRANTY: ____ (months)

LIST SELLERS PREVIOUSLY USED BY BUYER

SELLER #1
SELLER #2
SELLER #3
SELLER #4

176

178 — SEARCH FOR DEAL

Fig. 4b

DEALS MATCHING ORDERING CRITERIA

| SELLER | DEAL# | VOLUME | P/LBS. | DEL. TIME | WARRANTY | %DEFECTS |
|---|---|---|---|---|---|---|
| SELLER #1 | 1 | OVER 100 | $6.00 | 10 DAYS | 12 MONTHS | 5% |
|  | 2 | 30-100 | $7.00 | 5 DAYS | 18 MONTHS | 3% |
|  | 3 | 10-30 | $12.00 | 5 DAYS | 36 MONTHS | 0.05% |
| SELLER #2 | 1 | OVER 50 | $5.75 | 7 DAYS | 12 MONTHS | 3% |
| SELLER #3 | 1 | 0-50 | $7.00 | 5 DAYS | 12 MONTHS | 3% |
|  | 2 | OVER 50 | $6.50 | 3 DAYS | 12 MONTHS | 3% |
| SELLER #4 | 1 | OVER 10 | $9.00 | 7 DAYS | 24 MONTHS | 1% |
| SELLER #5 | 1 | OVER 50 | $6.25 | 5 DAYS | 12 MONTHS | 3% |

ENTER DEAL

ENTER SELLER: SELLER #3
ENTER DEAL NUMBER: DEAL # 3
ENTER VOLUME ORDER: 90

SUBMIT DEAL

Fig. 4c

BUYER REGISTRATION

BUYER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):

Fig. 6

| BUYER DATA NAME, ADDRESS, CONTACT, ETC. | USER NAME | PASSWORD | CREDIT CARD NO. & EXP. |
|---|---|---|---|
| BUYER 1 | USER NAME (1) | PASSWORD (1) | XXXXXXXXX EXP. 05/03 |
| . . . | . . . | . . . | . . . |
| BUYER (N) | USER NAME (N) | PASSWORD (N) | CREDIT CARD (N) |

SELLER REGISTRATION

SELLER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):

Fig. 10

MULTIPLE CRITERIA BUYING AND SELLING MODEL

RELATED APPLICATIONS

This application is a continuation of U.S. patent application Ser. No. 12/710,095 filed on Feb. 22, 2010 and entitled MULTIPLE CRITERIA BUYING AND SELLING MODEL, which is a continuation of U.S. Pat. No. 7,693,748 filed on Jan. 24, 2003 and entitled MULTIPLE CRITERIA BUYING AND SELLING MODEL, which is: a continuation-in-part of U.S. patent application Ser. No. 09/324,391, entitled E-COMMERCE VOLUME PRICING filed on Jun. 3, 1999, which claims priority to U.S. Patent Application Ser. No. 60/133,769, filed May 12, 1999, and entitled E-COMMERCE VOLUME PRICING; a continuation-in-part of co-pending U.S. Pat. No. 7,818,212, entitled MULTIPLE CRITERIA BUYING AND SELLING MODEL filed Oct. 22, 1999; a continuation-in-part of co-pending P.C.T. Patent Application Serial No. PCT/US00/11989, filed May 3, 2000, and entitled MULTIPLE CRITERIA BUYING AND SELLING MODEL, AND SYSTEM FOR MANAGING OPEN OFFER SHEETS, which claims priority to: U.S. Patent Application Ser. No. 60/137,583, filed Jun. 4, 1999, and entitled E-COMMERCE AUTOMATED SELLER SELECTION SYSTEM; U.S. Patent Application Ser. No. 60/138,209, filed Jun. 9, 1999, and entitled SECURITIZATION OF ACCOUNTS RECEIVABLE; U.S. Patent Application Ser. No. 60/139,338, filed Jun. 16, 1999, and entitled REAL-TIME OPTIMIZED BUYING BLOCK; U.S. Patent Application Ser. No. 60/139,518, filed Jun. 16, 1999, and entitled REAL-TIME MARKET PURCHASING; U.S. Patent Application Ser. No. 60/139,519, filed Jun. 16, 1999, and entitled E-COMMERCE PURCHASING CARD; U.S. patent application Ser. No. 09/342,345, filed Jun. 29, 1999, and entitled CREDIT BASED TRANSACTION SYSTEM AND METHODOLOGY; U.S. Patent Application Ser. No. 60/142,371, filed Jul. 6, 1999, and entitled TIME VALUE OF MONEY BASED CREDIT CARD FOR MERCHANT; U.S. Patent Application Ser. No. 60/160,510, filed Oct. 20, 1999, and entitled MULTIPLE CRITERIA BUYING AND SELLING MODEL, AND SYSTEM FOR MANAGING OPEN OFFER SHEETS; U.S. patent application Ser. No. 09/426,063, filed Oct. 22, 1999, and entitled MULTIPLE CRITERIA BUYING AND SELLING MODEL; U.S. Patent Application Ser. No. 60/162,182, filed Oct. 28, 1999, and entitled MULTIPLE CRITERIA BUYING AND SELLING MODEL, AND SYSTEM FOR MANAGING OPEN OFFER SHEETS; and U.S. Patent Application Ser. No. 60/173,409, filed Dec. 28, 1999, and entitled MULTIPLE CRITERIA BUYING AND SELLING MODEL, AND SYSTEM FOR MANAGING OPEN OFFER SHEETS; and claims the benefit of U.S. provisional application Ser. No. 60/351,770, filed Jan. 25, 2002, and entitled MULTIPLE CRITERIA BUYING AND SELLING MODEL, the entirety of which is incorporated herein by reference; and U.S. provisional application Ser. No. 60/375,628, filed Apr. 26, 2002, and entitled DAS PREDICTIVE MODELING AND REPORTING FUNCTION. The entireties of these applications are incorporated herein by reference.

TECHNICAL FIELD

The present invention relates to a demand aggregation system and more particularly to a system and method of employing various features within the demand aggregation system.

BACKGROUND OF THE INVENTION

The buying and selling of products and services has resulted in a vast array of buying schemes which are used to vary the price at which such products are sold. A common buying scheme, which businesses encounter regularly, is known as volume buying. According to this buying scheme, sellers set a fixed unit price for their products based on the volume of units that a buyer is willing to purchase. Buyers desiring to purchase products from the seller are each required to pay the same fixed price depending on the volume of units the buyer is purchasing. If a seller finds that the demand for a given product is greater or less than expected, the seller may later adjust the fixed price per unit of the product to account for such findings. Although the fixed price per unit system provides a simple way for a seller to conduct business with multiple buyers, one drawback of this buying scheme is that it fails to provide buyers with a choice between a variety of different buying criteria that may be just as important as or more important to the buyer than price.

For example, a buyer that is in need of goods, such as raw materials to make products for an expedited order may be willing to pay a higher price for a faster delivery time. Another buyer may be concerned with the quality of the goods they are purchasing, such that the buyer would pay a higher price for goods having a minimum number of defects. Yet another buyer may be concerned with the warranty time allotted for the goods they are purchasing, and may want the warranty of the goods that they are purchasing to match or exceed the warranty the buyers are offering their own customers.

Yet another buying scheme which has been advanced in recent years is buyer-driven bidding. According to this buying scheme, a single buyer desiring to obtain a product communicates a price at which the buyer is willing to purchase the product to multiple sellers. Each of the sellers is provided an opportunity to review the buyer's price. A sale is complete when one of the sellers agrees to sell the product to the buyer at the price suggested by the buyer. While the buyer-driven bidding scheme provides advantages for certain types of transactions when, for example, sellers may be willing to sell products at lower than normal prices, the uncertainties involved with whether a buyer's offer will be accepted is often problematic for high volume commercial transactions in which the reliability that a transaction will be complete is of paramount importance. Another problem with the present buying schemes is that the buyers have no control in determining the criteria of the product or services that they may receive, while the seller has no control of the type of purchase that the buyer's request.

SUMMARY OF THE INVENTION

A demand aggregation system is structured to provide incentive for buyers to work together when purchasing products. By working together, buyers are able to take advantage of lower pricing due to quantity discounts. To facilitate buying and selling products using the volume pricing methodology, an electronic forum is provided whereby buyers and sellers are able to conveniently exchange information and order products.

A system and method for aggregating demand is provided. At least one seller may sponsor a deal room to aggregate selling goods/services from a plurality of buyers. The demand aggregation system can include a sales manager dashboard for allowing the at least one seller to set up DealRooms, price curves, offers, products, customers, and/or customer groups, for example. The sales manager dashboard can include a plurality of wizards for configuring such information.

The demand aggregation system can also include an action manager dashboard for allowing access to a plurality of Deal-Rooms from a single display. The action manager dashboard can provide access to part of or the entire operation of Deal-Rooms from multiple suppliers, multiple buyers, multiple price curves, etc. New customers can be posted to Deal-Rooms, access rights to DealRooms can be changed, and customers can be deleted from DealRooms by the action manager dashboard.

The demand aggregation system can also include seller displays for notifying buyers of changes in prices relative to ship dates and times of order. The displays can include: a calendar for showing offers by day; a product calendar that coincides with the product ship date; a listing posted in a DealRoom; prices and quantities of available in-stock products; and a three-dimensional chart which includes a month with relative price points and quantities available, a price curve, and time remaining.

The demand aggregation system can also include a predictive modeling and reporting function. An algorithm is employed to utilize the product information to post a probability chart on a product price point.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 2b is a schematic illustration of a client computer operatively coupled to a server computer system in accordance with an aspect of the present invention;

FIG. 4b illustrates a buyer's product ordering criteria input screen in accordance with an aspect of the present invention;

FIG. 4c illustrates a list of seller's deals matching the buyer's product ordering criteria in accordance with an aspect of the present invention;

FIG. 6 illustrates an on-line registration form for a buyer in accordance with an aspect of the present invention;

FIG. 7 illustrates a buyer database stored in a central server in accordance with an aspect of the present invention;

FIG. 10 illustrates an on-line registration form for a seller in accordance with an aspect of the present invention;

DETAILED DESCRIPTION OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component.

Figure 1:
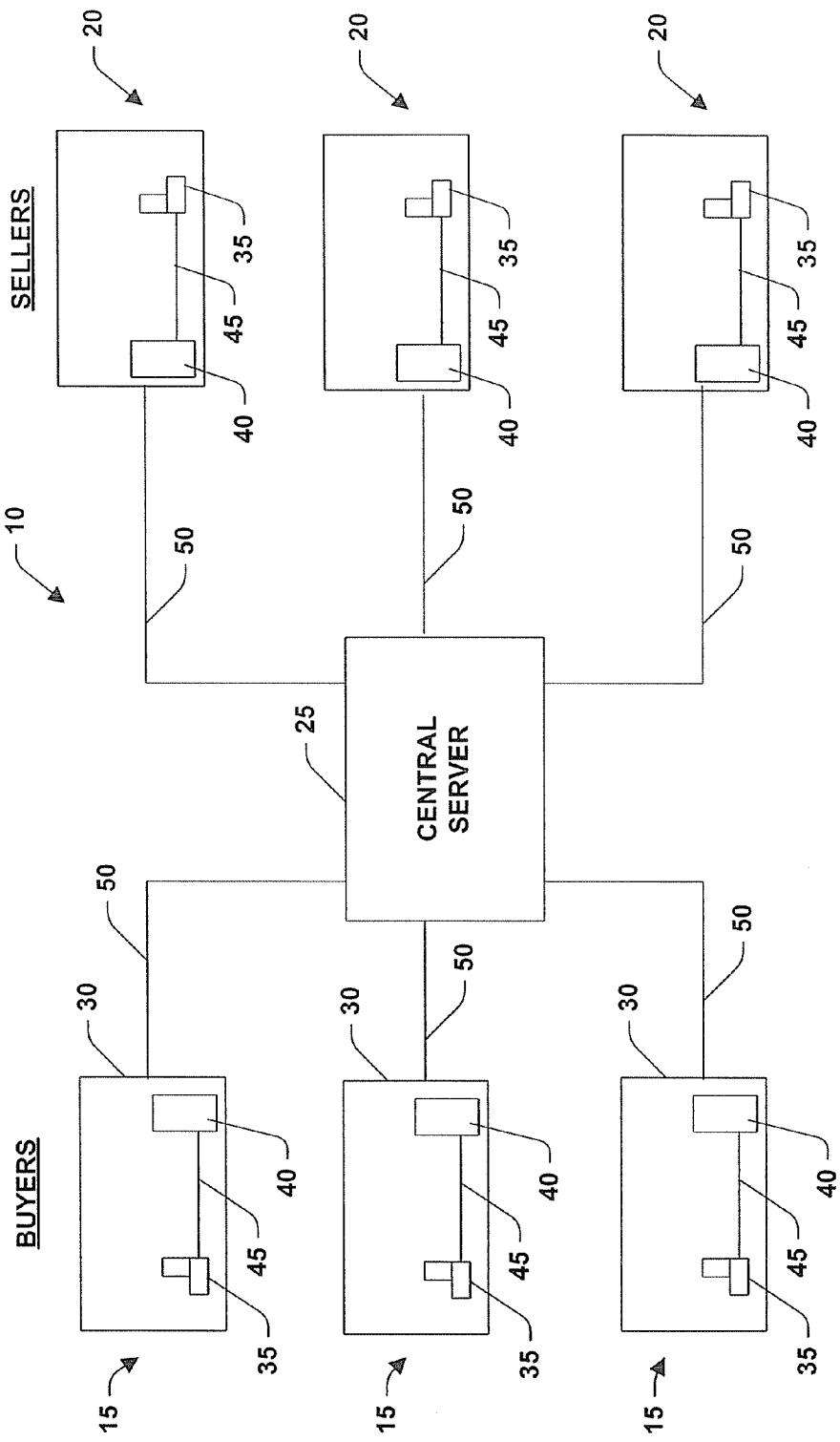
FIG. 1 illustrates a diagrammatic view of a system for electronically conducting business in accordance with an aspect of the present invention.

Referring initially to FIG. 1, a demand aggregation system 10 is shown in which multiple buyers 15 and sellers 20 are electronically linked via a central server 25. As discussed in more detail below, the central server 25 is configured to provide the buyers 15 and sellers 20 with a convenient forum in which to buy and sell goods in accordance with an aspect of the present invention. The forum may, for example, be a preestablished Internet web page where sellers 20 can post product information and the buyers 15 can order products. The multiple criteria buying scheme calls for a seller 20 to post a number of deals for a given product, which vary according to different offering criteria defining the limits of a number of selling criteria, such as, for example, price, volume, quality and delivery time. The buyers 15 can enter a range of criteria that the buyer would require for a deal to be made. A list of sellers and prospective deals offered by sellers 20 is generated for the buyers 15 to review. The buyers 15 can then review the list of deals and choose a deal based on the buyers' 15 particular needs. In this manner, the buyers 15 can be certain that particular thresholds have been met.

It is to be appreciated that the present invention has wide applicability to the purchasing and/or selling of a variety of different products and/or services. For example, the present invention may be applied within the context of purchasing and/or selling airline tickets wherein buyers' criteria may include, for example: (1) reputation of airline; (2) reliability; (3) timeliness; (4) price; (5) number of alternative flights; (6) comfort; (7) quality of service; and (8) quality of foods. The sellers' criteria may include, for example: (1) volume of tickets; (2) buyer's versatility in time schedule; (3) buyer's method of payment, etc.

The present invention may also be applied in the context of purchasing and/or selling an automobile wherein buyer's criteria may include, for example: (1) reputation of automobile manufacturer; (2) reputation of dealer; (3) price of automobile; (4) delivery options; (5) automobile availability; (6) safety; and (7) financing terms; etc. While, the seller's criteria may include, for example: (1) buyer's creditworthiness; (2) desired finance terms; (3) delivery requests of buyer; (4) delivery dates; etc.

Thus, the present invention allows buyers and/or sellers of products and/or services to pre-select a plurality of criteria prior to negotiating a deal for the product and/or service. Of course the preselected criteria will vary depending on the particular product and/or service. The scope of the present invention as defined in the hereto appended claims intends to include any product and/or service (and plurality of pre-selected criteria associated therewith) suitable for deal-making in accordance with the present invention.

Each of the buyers 15 and sellers 20 may access the central server 25 in any of a variety of ways. For example, in the present aspect, each buyer 15 and seller 20 is shown to be part of separate establishments 30 which include one or more respective computer systems 35 and local servers 40. The computer systems 35 may, for example, be a desktop or laptop computer with a local area network (LAN) interface for communicating over a network backbone 45 to the local server 40. The local servers 40, in turn, interface with the central server 25 via a network cable 50 or the like. It will be appreciated that while the present aspect depicts the computer system 35 communicating with the central server 25 via hardwired network connections, in an alternative aspect the computer system 35 may interface with the central server 25 using a modem, wireless local area and/or wide area networks, etc. Further, it will be appreciated, that while the buyers 15 and sellers 20 are shown to communicate with the central server 25 via different computer systems 35, it will be appreciated that the buyers 15 and/or sellers 20 may access the central server 25 from the same computer system 25.

Figure 2A:
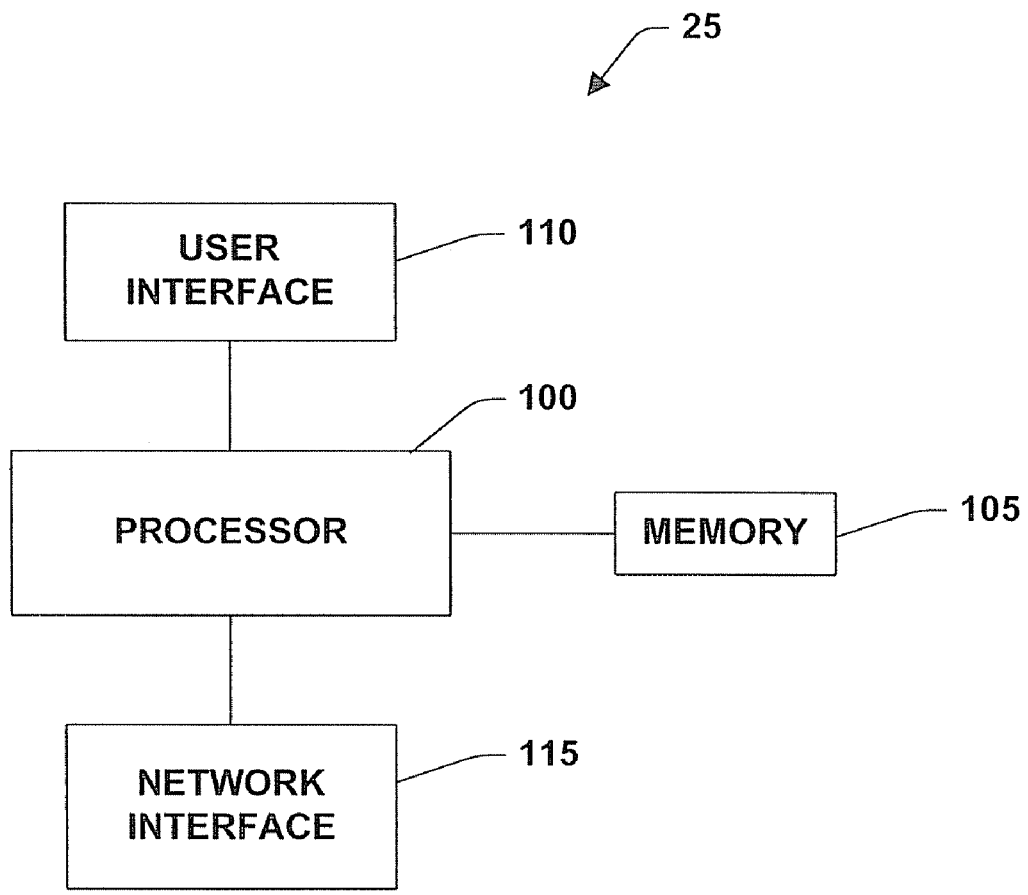
FIG. 2a illustrates a block diagram of a central server in accordance with an aspect of the present invention.

Turning now to FIG. 2a, a block diagram of hardware components of the central server 25 is shown. In particular, the central server 25 includes a central processor 100 for performing the various functions described herein. A memory 105 is coupled to the processor 100 and stores operating code and other data associated with the operations of the central server 25. A user interface 110 is also coupled to the processor 100 and provides an interface through which the central server 25 may be directly programmed or accessed. The user interface 110 may, for example, be an alphanumeric keyboard and mouse. A network interface 115 coupled to the processor 100 provides multiple connections for transceiving information with buyers 15 and sellers 20 over the network cables 50.

As previously stated, the present invention could take advantage of the wide availability and versatility of the Internet. Referring to FIG. 2b, a schematic block diagram is illustrated which depicts an environment of interest in accordance with an aspect of the present invention. The client computer system 35 is shown connected to the central server computer system 25 that is part of the Internet 60. The client computer system 35 and server 25 are connected via an Internet connection 55 using a public switched phone network, for example, such as those provided by a local or regional telephone operating company. The Internet connection 55 may also be provided by dedicated data lines, Personal Communication Systems (PCS), microwave, or satellite networks, for example, or any suitable means. It is to be understood that the terms client and server are to be construed in the broadest sense, and that all such constructions of the terms are intended to fall within the scope of the hereto appended claims.

Figure 3:
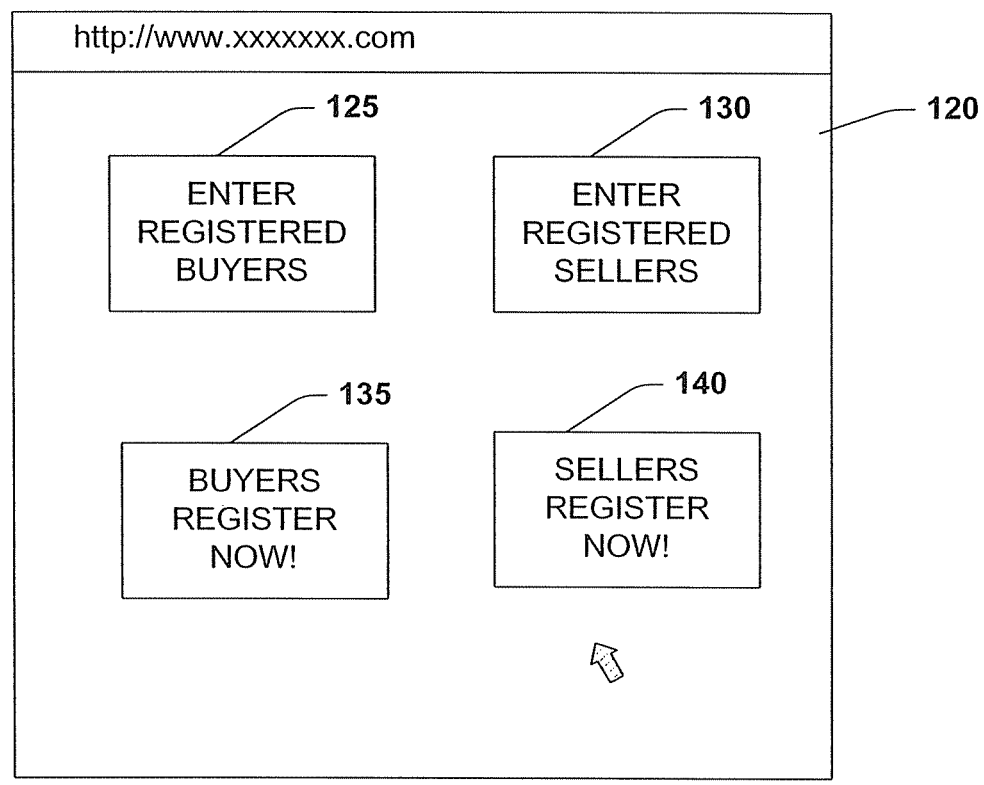
FIG. 3 illustrates a web page providing options to buyers and sellers desiring to conduct business electronically in accordance with an aspect of the present invention.

Turning now to FIG. 3, an exemplary Internet web page 120 which provides buyers 15 and sellers 20 with access to a forum for conducting business using the multiple criteria buying methodology described in detail below is shown. The web page 120 is shown to include hyperlinks for handling both registered and un-registered buyers and sellers of products. For example, as shown in FIG. 3, registered buyers may select a hyperlink to a registered buyer login screen via hyperlink 125 while non-registered buyers may select a hyperlink to a non-registered buyer registration screen via hyperlink 135. Similarly, registered sellers may select a hyperlink to a registered seller login screen via hyperlink 130, while non-registered sellers may select a hyperlink to a non-registered seller registration screen via hyperlink 140. While the present aspect illustrates separate hyperlinks for buyers and sellers, it will be appreciated that such hyperlinks could alternatively be combined and the status of buyer or seller could be determined during a later stage in the login procedure.

Figure 4A:
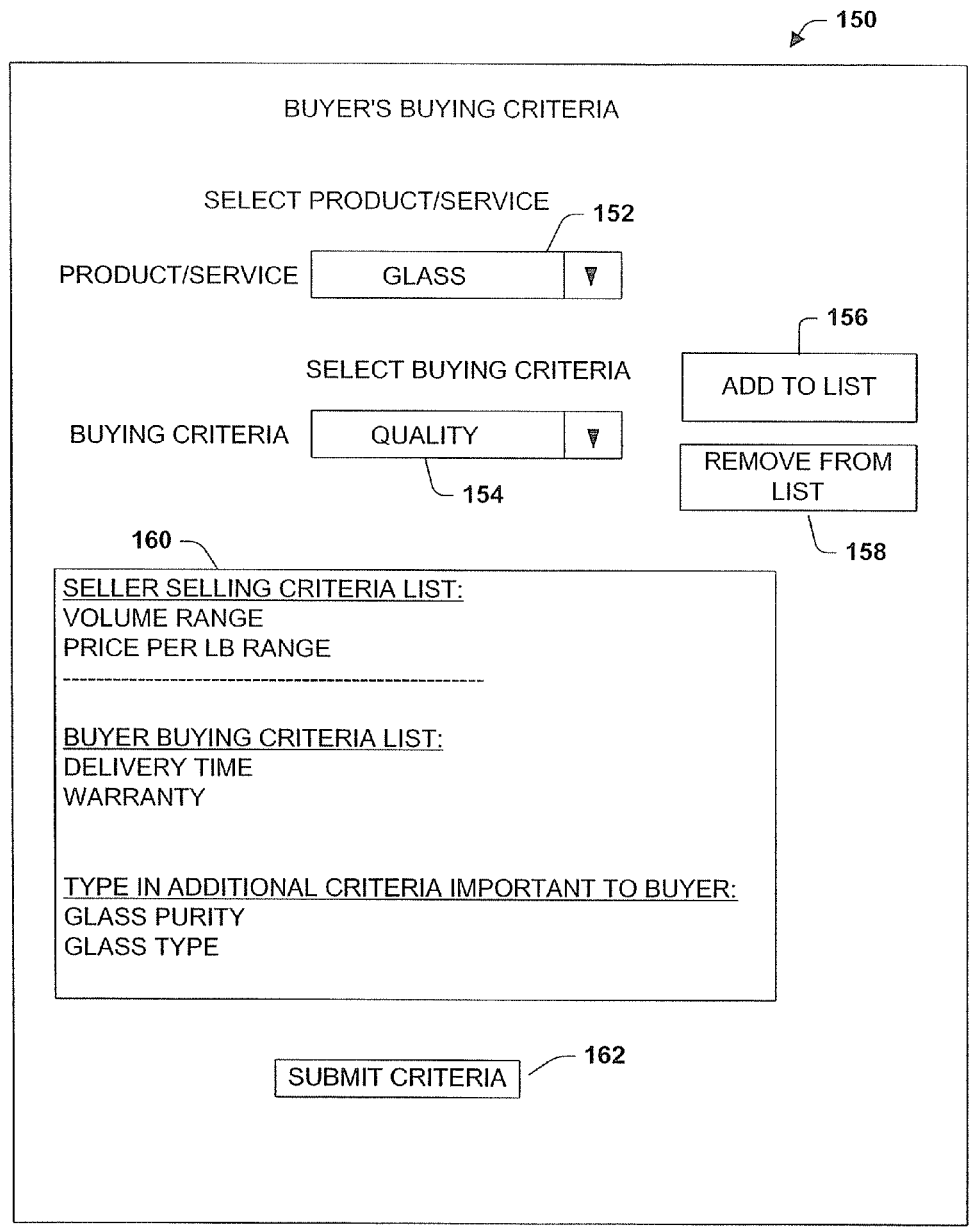
FIG. 4a illustrates a buyer's buying criteria input screen in accordance with an aspect of the present invention.

Turning now to FIG. 4a, in accordance with an aspect of the present invention, registered buyers 15 enter several product buying criteria into a "Buyer's Buying Criteria" input page 150. The buyer 15 selects a product or service from a list in a scroll down menu 152. It should be appreciated that the list on the scroll down menu 152 could include any number of related or non-related goods and services only limited by the size of a database used in accordance with the present invention. Upon selecting a product or service (e.g., glass) from the scroll down menu 152, a list of seller criteria automatically appears in a window 160. The list of seller criteria appearing in the window 160 can include minimum inputs to be provided by the buyer to obtain a deal listing. These minimum inputs are decided by a class of sellers selling individual product(s) or service(s) and/or decided by a system administrator of the system. The buyer 15 can then begin adding buying criteria by selecting criteria from a scroll down list 154, and clicking on an "Add to List" button 156 with a computer mouse (not shown) or via a touch screen, for example. If the buyer 15 desires to remove a selected criterion, the buyer can highlight the criterion in the window 160 and click on a "Remove from List" button 158. Once the list is completed, the buyer 15 may add additional criteria not in the selection of choices. The additional criteria may or may not be utilized in this particular deal search; however, if it is not, it will be provided to the sellers, such that they can be alerted of these additional criteria important to the buyer. Accordingly, sellers may opt to add the additional criteria to the selectable choices at a later time. Once the complete custom buying criteria list is completed, the buyer can click on a "Submit Criteria" button 162 for submission of the buyer's buying criteria to build a "Buyer's Product Ordering Criteria" input screen 165, as illustrated in FIG. 4b.

Turning now to FIG. 4b, in accordance with an aspect of the present invention, buyer 15 enter several product ordering criteria that would be acceptable to the buyer 15 on a "Buyer's Product Ordering Criteria" input screen 165. In this particular example, the buyer 15 is looking to purchase raw glass by the pound, however, many different types of products and services could be purchased/sold using the present invention. The buyer's ordering criteria of this example includes: price range 166 in dollars per pound; volume range 168 in number of pounds; delivery range 170 in days; the acceptable % of defects 172 in percent; and the minimum required warranty 174 in months. The buyer 15 can then list the names of the sellers 20 in the window 176 that the buyer 15 has bought products from previously, so that the buyer 15 can be entitled to any good customer or multi-purchase discounts offered by the sellers 20. Once the buying ordering criteria are entered, the buyer can search for deals by clicking on a "Search for Deal" button 178 on a touch screen and/or via a mouse and/or via a touch screen. A search engine can then be employed to search through a database of deals offered by various sellers of the product, and provide an output of deals to the buyer which matches the buyer's ordering criteria. The output can be displayed on a "Deal Matching Ordering Criteria" page 180, as shown in FIG. 4c.

In FIG. 4c, registered sellers 20 set up a variety of deals 182 by which buyers 15 are able to order products. As will be discussed in more detail below, the variety of deals 182 are set up to display the following information which is input from the seller 20 and/or calculated by the processor 100 of the central processor 25 according to the deal 182, which includes: a seller name 184; a deal number 186; a volume ordering range required 188 to obtain a current price/pound level 190; an expected delivery time 192; a warranty period 196; and a percentage of defects 198 of the product the buyer 15 can expect to receive in a given order. Based on such information, buyers 15 can make an informed decision as to whether they desire to order a particular deal based on the criteria that is important to that particular buyer. If a buyer 15 desires to place an order, the buyer 15 inputs a seller 183, a deal number 185 and a volume order 187. The buyer 15 then clicks on the "Submit Deal" button 189 with a mouse pointer, for example, on the computer display and the deal is finalized.

Figure 5:
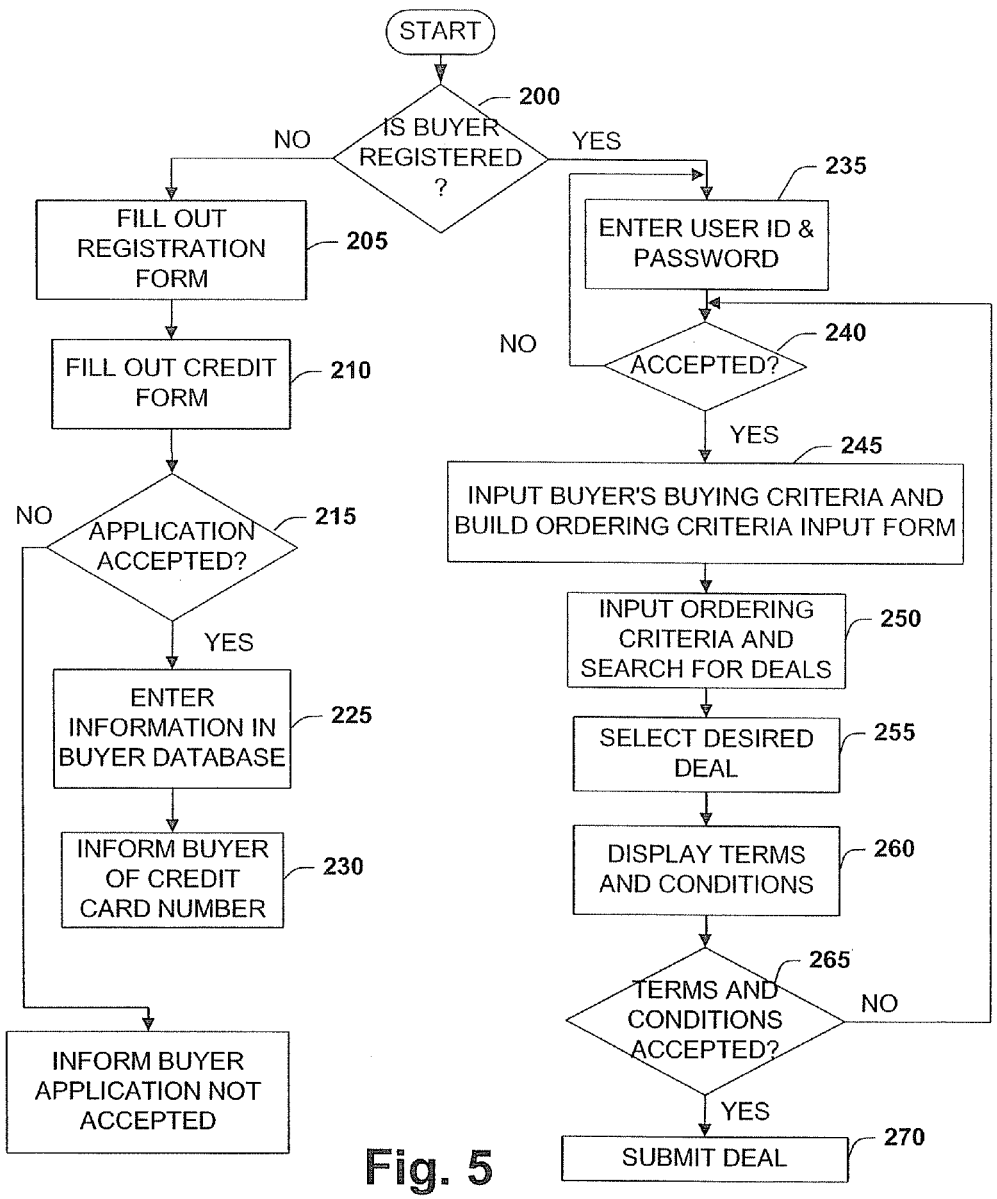
FIG. 5 illustrates a flow chart for a buyer desiring to conduct business electronically in accordance with an aspect of the present invention.

Turning now to FIG. 5, a methodology of entering web page 150 is illustrated. At 200, it is determined whether a buyer 15 is registered or not. If the buyer 15 is not registered, the buyer 15 selects hyperlink 135 (FIG. 3) and proceeds to 205. At 205, the processor 100 of the central server 25 requests that the buyer 15 fill out a registration form. For example, the buyer 15 is requested to fill out a registration form 208 such as that shown in FIG. 6. In the present example, the registration form 208 requests that the buyer 15 enter information such as: buyer name; address; primary contact person; phone; fax; e-mail; short description of company; preferred login user name; and preferred password. With respect to the user name and password, the processor 100 is configured to determine whether the selected user name and password combination are available and, if not, to prompt the buyer 15 to enter a new user name and password until an available combination is selected.

Turning back to FIG. 5, at 210, the buyer is requested to fill out a credit card application so that purchases made on the web site may be immediately approved. The credit card registration and approval process may be accomplished via a hyperlink to one of various electronic credit card approval agencies which check the buyer's credit rating and set up a merchant account with a line of credit. For example, an electronic credit card approval agency which may be used in conjunction with the present invention can be found on the Internet at interent-ecommerce.com. Next, at 215, the processor 100 determines if the credit card application has been approved by the electronic credit card approval agency. If the credit card application has not been approved, the processor 100 proceeds to 220 where a message is sent back to the buyer 15 indicating regret that they have not been approved for a line of credit and therefore have not successfully completed the registration process. At 220, a customer service telephone number can be provided to the buyer 15 in case the buyer has questions and/or desires to pursue registration further.

If at 215, the processor 100 is informed that the buyer 15 has been provided a line of credit and a credit card number has been issued, the processor 100 proceeds to 225. At 225, the buyer information from the registration form 208 and the newly issued credit card number are stored in a buyer database 270 (FIG. 7) in the memory 105 of the processor 25 (FIG. 2a). Next, at 230, the processor 100 is configured to provide the buyer 15 with the newly issued credit card number so that the buyer 15 is able to purchase products and/or services. Furthermore, the processor 100 is configured to provide a report to the system administrator who then mails a confirmation copy of the buyer's information stored in the buyer's database to the buyer 15. This completes the buyer's registration process.

Returning back to 200, if a buyer has already registered, the buyer 15 may login as a registered user by selecting the registered user hyperlink 125 (FIG. 3). Once selected, the processor 100, at 240, prompts the buyer 15 to enter a user ID and password. Upon entry of such information, the processor 100 verifies the user ID and password with those stored in the buyer database 270 (FIG. 7). If the user ID and password entered by the buyer 15 does not match any entry in the buyer database 270, the processor 100 returns to 235 for re-entry of such information. If, however, at 240, a valid user ID and password are entered, the processor 100 proceeds to 245.

At 245, the processor 100 provides the buyer 15 with a buyer's buying criteria input screen where the buyer 15 is able to enter a variety of buying criteria that is important to that particular buyer 15. The buyer 15 selects a plurality of buying criteria and submits the criteria, so that the system can build an input ordering criteria form. At 250, the buyer 15 enters a range of ordering criteria that is acceptable to the buyer in the input ordering criteria form, and then submits the criteria causing the system search engine to match the ordering criteria with a list of seller deals in a seller deal database. The search engine then lists the seller deals matching the buyer's buying and ordering criteria. As discussed above, the deals 182 provide the buyer 15 with information regarding the sale of a particular product such as, for example, a volume range to get a particular price per pound, delivery time, warranty period and a percentage of defects in each order that a buyer can expect. In order to allow a buyer to quickly find deals 182 of interest, the processor 100 provides the buyer 15 with the input "Buyer's Buying Criteria" input screen 150, so that active deals 182 of interest may be found.

Once a search is completed, the buyer 15, at 250, can select a desired deal 182 from the results obtained. For example, the buyer 15 may choose a desired deal because it has a faster delivery time than the other deals. The buyer 15 may choose a deal because it has a low percentage of defects in the goods, or has a longer warranty than other goods. Regardless of the deal the buyer 15 may choose, the buyer 15 can make an informed decision based on a variety of buying criteria. If the buyer 15 is unsatisfied with the search results or simply desires to re-perform the search, the buyer 15 at any time is able to return back to a previous screen selecting the "back" function available using an Internet browser such as, for example, Microsoft Internet Explorer, Netscape, etc. Additionally, a hyperlink to various screens, such as the search screen, preferably is provided on each web page.

Upon selecting a deal 182, the processor 100 in step 255 displays a page of standard terms and conditions which the buyer 15 must agree to prior to completing the deal. The terms and conditions relate to the terms governing the sale of the product or service according to which both the buyer and seller are willing to conduct business. If the terms and conditions are not accepted, the processor 100 returns the buyer 15 to step 245, so that another deal 182 may be selected and/or another search may be performed. If, however, in step 260 the terms and conditions are accepted, the processor 100 proceeds to allow the buyer 15 to complete the deal in step 265.

Figure 8A:
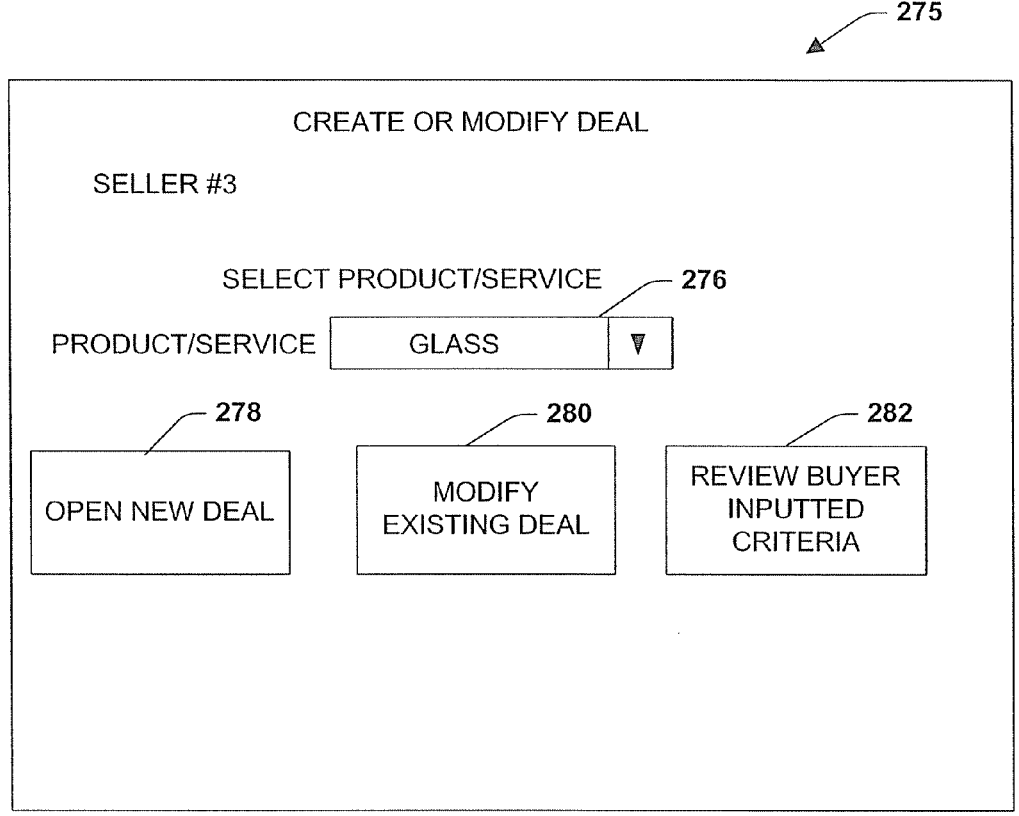
FIG. 8a illustrates a web page for a buyer to create or modify a deal in accordance with an aspect of the present invention.
Figure 8B:
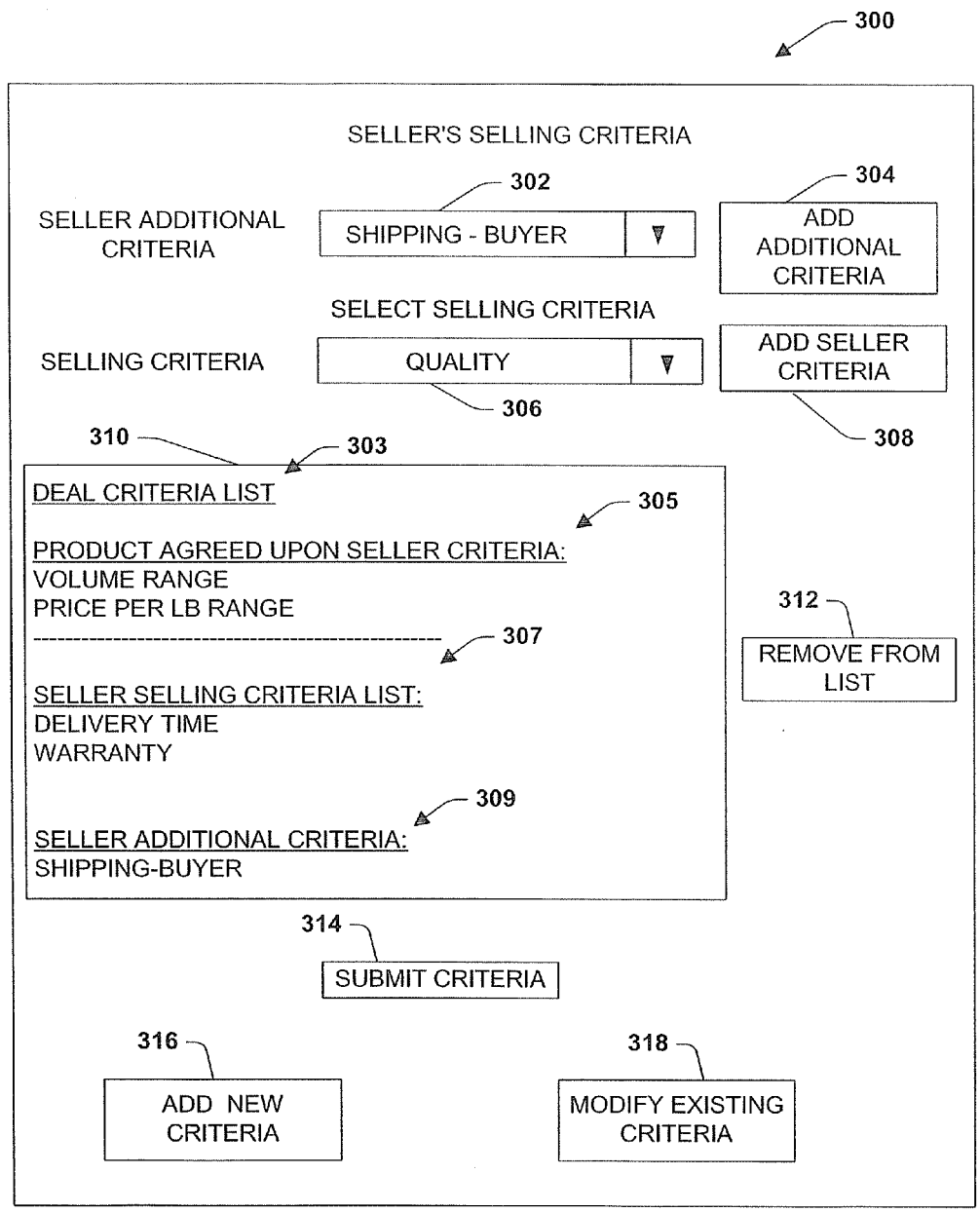
FIG. 8b illustrates a seller's buying and selling criteria input screen in accordance with an aspect of the present invention.

Turning now to FIG. 8a, in accordance with one aspect of the present invention, registered sellers 20 enter into a "Create or Modify Deal" screen 275. The seller 20 can choose a product or service from the product/service scroll down menu 276 and choose to either click on an "Open New Deal" button 278, a "Modify Existing Deal" button 280 or a "Review Buyer Inputted Criteria" button 282. If the buyer selects the "Review Buyer Inputted Criteria" button 282, the seller will be provided with a list of buyer buying criteria that the buyers 15 manually inputted into the window 160 of FIG. 4a. This allows the sellers 20 to review criteria that are important to their buyers, which the sellers were not aware. If a seller 20 chooses to click on the "Open New Deal" button 278, the seller 20 will enter into a "Seller's Product Selling Criteria" input screen 300, as illustrated in FIG. 8b. If the seller 20 chooses to click on the "Modify Existing Deal" button 280, the seller 20 will enter into a "Seller's Product Offering Criteria" input screen 330, as illustrated in FIG. 8c with the seller being prompted to enter a deal number, which causes the ordering criteria of the chosen deal number to be editable in the input screen.

Referring to FIG. 8b illustrating the "Seller's Selling Criteria" input screen 300, the seller 20 can begin building a new deal by selecting a number of seller additional criteria, and seller criteria from a list in a scroll down menu 302 and a list in scroll down menu 306, respectively. The seller can click on the "Add Seller Additional Criteria" button 304 for adding seller additional criteria from the scroll down menu 302 into a window 310 containing a deal criteria list 303. The deal criteria list 303 includes a first portion listing the "Product Agreed upon Seller Criteria" 305, decided by the group of sellers for a particular product/service and/or the system administrator, a second portion which is the seller criteria list 307 and a third portion which is the seller additional criteria list 309. It should be noted that the criteria in the seller additional criteria list is not a mandatory criteria for the buyer when the buyer is inputting the buyer's buying criteria at 245 of FIG. 5, but is listed in the terms and conditions 265 after a deal is chosen by the buyer. The seller can add seller criteria by selecting the criteria from the scroll down bar 306 and clicking on the "Add Seller Criteria" button 308. The seller can remove any of the criteria from the overall criteria list, except for the "Product Agreed upon Seller Criteria", by highlighting the selection with the computer mouse and clicking on a "Remove from List" button 312. The seller 20 can add new selling criteria by clicking on a hyperlink 316 labeled "Add New Criteria" sending the seller 20 to an "Adding and Modifying Deal Criteria" screen 360, illustrated in FIG. 8d. The seller can modify current criteria by highlighting the criteria in window 310 and clicking on a hyperlink 318 labeled "Modify Existing Criteria" sending the seller to the "Adding and Modifying Deal Criteria" screen 360 with the criteria information defaulting to the highlighted criteria for modification therefrom.

Figure 8C:
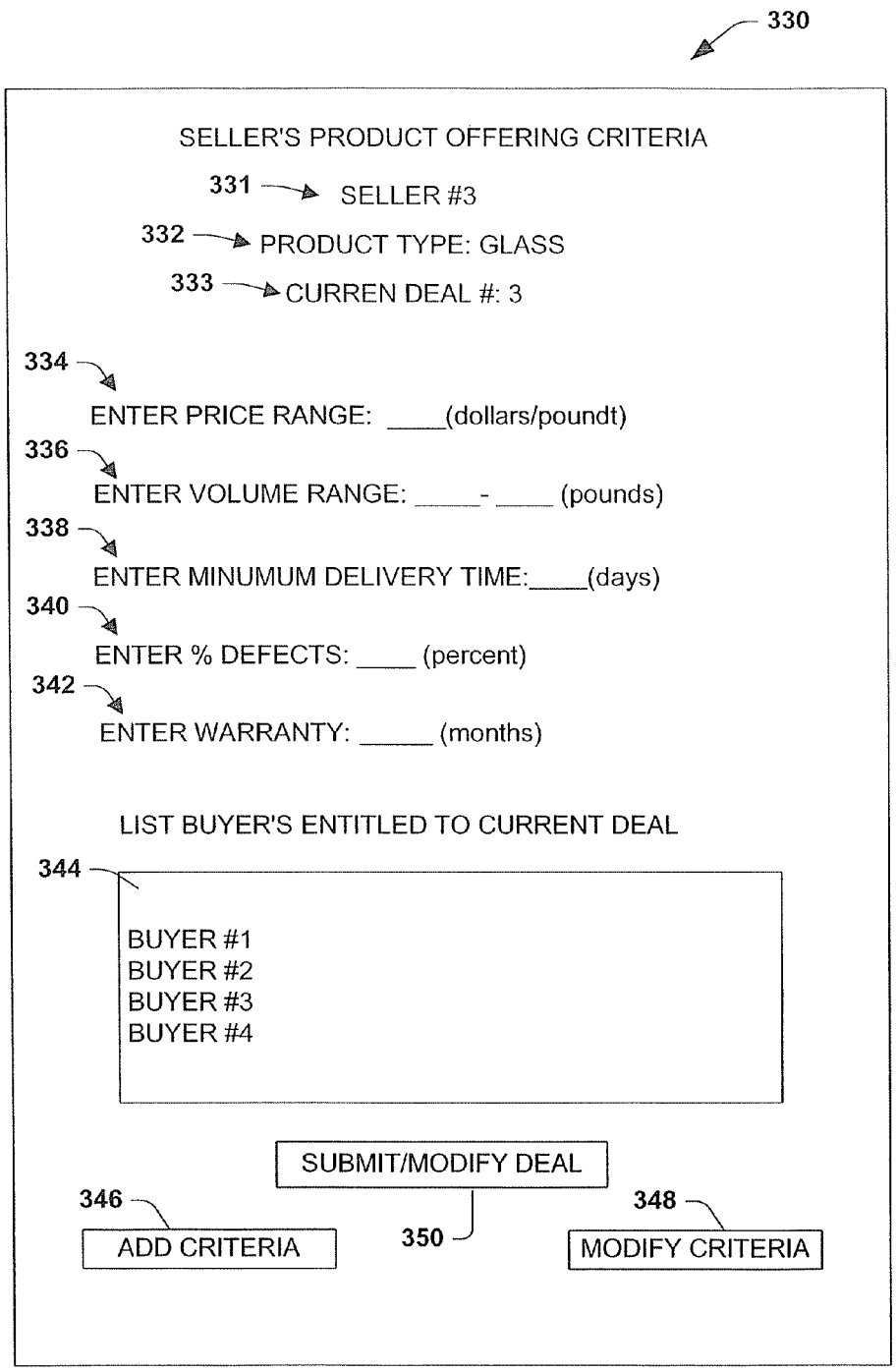
FIG. 8c illustrates a seller's product ordering criteria input screen in accordance with an aspect of the present invention.

Referring now to FIG. 8c, once the criteria are selected and submitted, the system generates the "Seller's Product Offering Criteria" input screen 330. A seller number 331, a product type 332 and a current deal number 333 are automatically generated and displayed on input screen 330. The seller 20 can enter offering limits relating to the selling criteria of the seller's product for a particular deal. The seller's offering criteria of this example includes: price 166 in dollars per pound; volume range 168 in the number of pounds; delivery time 170 in days; the % of defects 172 in percent; and the warranty 174 in months. The seller 20 can also list the names of the buyers 15 in a window 344 that the deal is being offered or select and/or type in a term, such as "All" if the offer is open to any buyer. Once the seller offering criteria is entered, the seller 20 can submit the deal by clicking on a "Submit/Modify Deal" button 350 on the computer screen by using the computer's mouse. The present invention then creates a record of the deal in a database of deals offered by various sellers 20 of the product. Accordingly, deals in which a seller's offering criteria match a buyer's ordering criteria can be output to the buyer 15 in a list of deals on the "Deals Matching Ordering Criteria" output page 180, as shown in FIG. 4c.

Figure 8D:
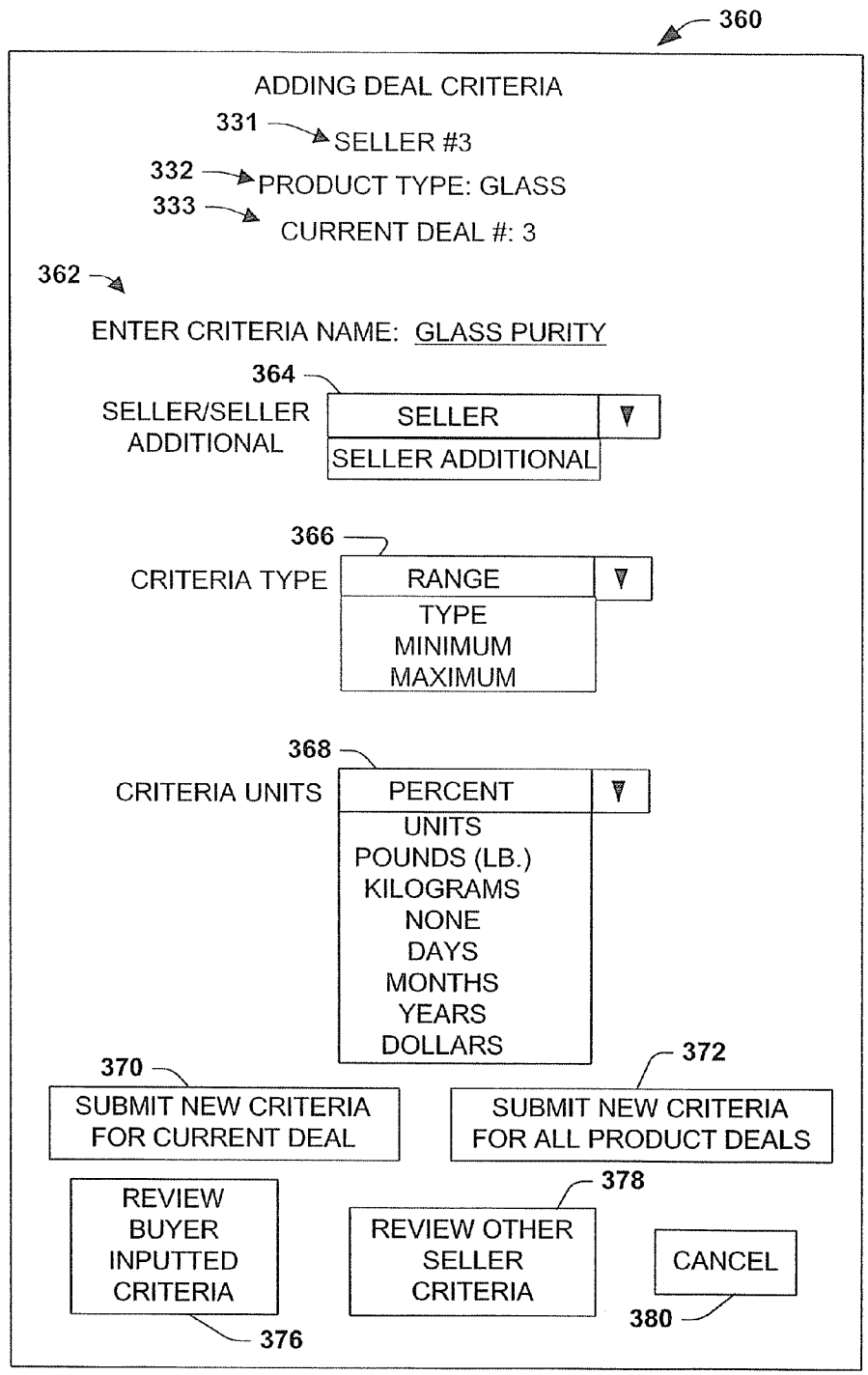
FIG. 8d illustrates an input screen for adding buying and selling criteria to the deal in accordance with an aspect of the present invention.

Referring now to FIG. 8d, an example of an "Adding Deal Criteria" input screen 360 is depicted. The seller number 331, the product type 332 and the current deal number 333 are automatically generated and display on an input screen 360. The seller 20 can enter a criteria name in the "Enter Criteria Name" box 362. The seller can then choose whether the criteria are a seller type or a seller additional criteria type from a first scroll down menu 364. The seller 20 chooses a criteria type from a second scroll down menu 366 and the criteria units in a third scroll down menu 368. The seller can submit these new criteria for the current deal by clicking on the "Submit New Criteria for Current Deal" button 370 or add the new criteria for the product deals by clicking on the "Submit New Criteria for All Product Deals" button 372. The seller 20 may at any time review the buyer inputted criteria submitted by the buyer 15 that is not in any of the seller's deals by clicking on the "Review Buyer Inputted Criteria" button 376. The seller 20 can review this list to determine whether or not the seller 20 would like to add these criteria to the present deal or deals such that they are in accord with buyer needs. The seller 20 may also review the criteria that are offered by other sellers, but not the current seller, by clicking on a "Review Other Seller Criteria" button 378. This will help the seller keep current on what the other seller's selling criteria are being utilized for matching to the buyer's buying criteria to satisfy the current market demands.

If the seller would like to return to the "Create or Modify Deal" screen 275 the seller 20 can click on the "Cancel" button at any time. Furthermore, if the seller 20 simply desires to re-perform the search, the seller 20 at any time is able to return back to a previous screen selecting the "back" function available using an Internet browser such as, for example, Microsoft Internet Explorer, Netscape, etc. Additionally, a hyperlink to various screens, such as the search screen, preferably is provided on each web page.

Figure 9:
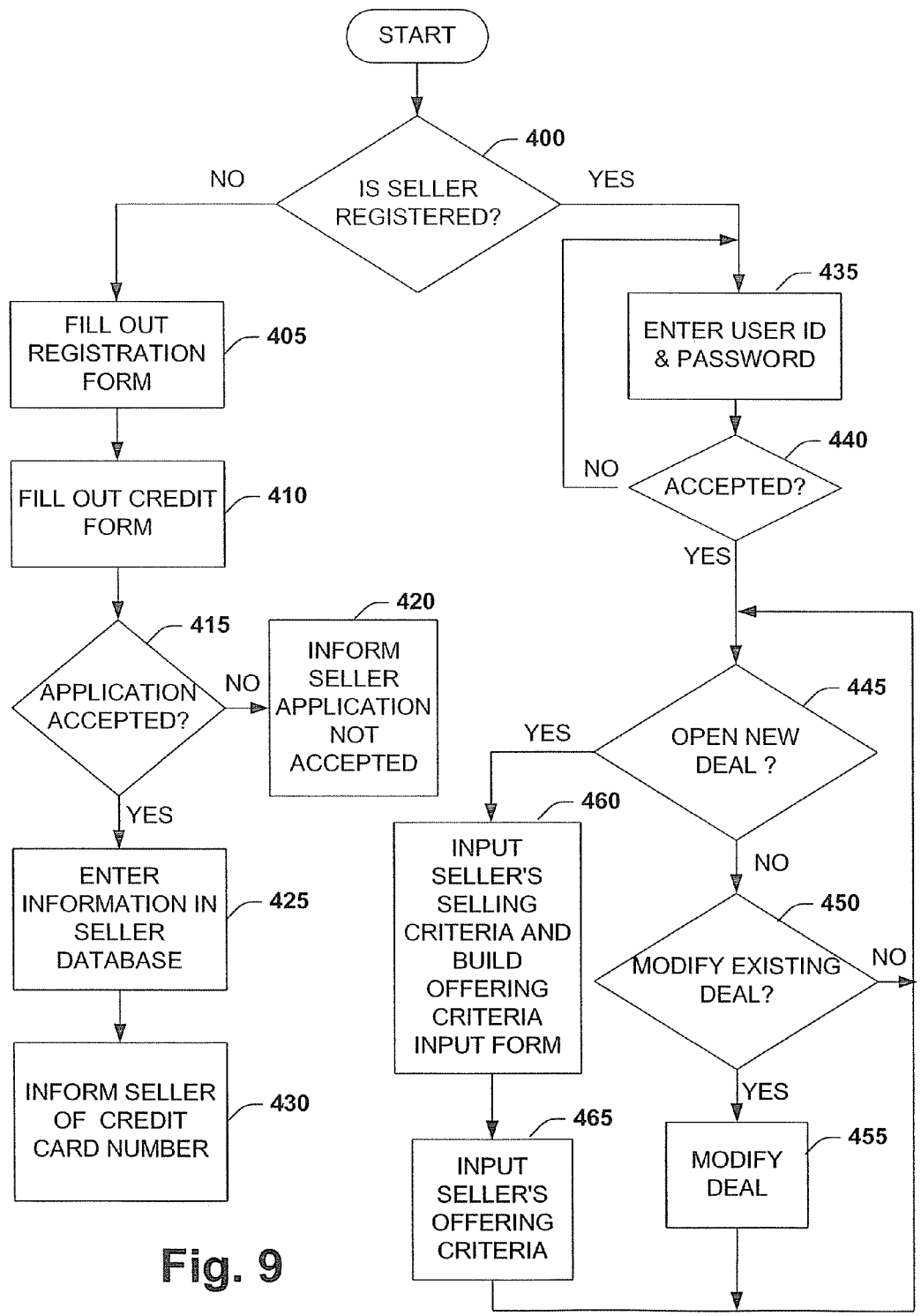
FIG. 9 illustrates a flow chart for a seller desiring to conduct business electronically in accordance with an aspect of the present invention.

Proceeding now to FIG. 9, the operations of the processor 100 of the central server 25 in handling sellers 20 is depicted. In particular, the processor 100 at 400 determines whether a seller 20 is registered or not based on which hyperlink 130, 140 (FIG. 3) the seller 20 selects. If the seller 20 selects hyperlink 140 indicating that the seller is not registered, the processor 100 proceeds to 405. At 405, the processor 100 provides the seller 20 with a seller's registration form 408 (FIG. 10) to fill out. The registration form 408 is similar to registration form 208 for the buyer 20 and allows the seller 20 to select a preferred user ID and password. Once completed, the processor 100 proceeds to 410 where the seller 20 is requested to submit a credit card application so that costs and fees associated with conducting business may be directly billed to the seller's credit card. As discussed above, the credit card approval process can be performed by a third party vendor accessible via a hyperlink.

Figure 11:
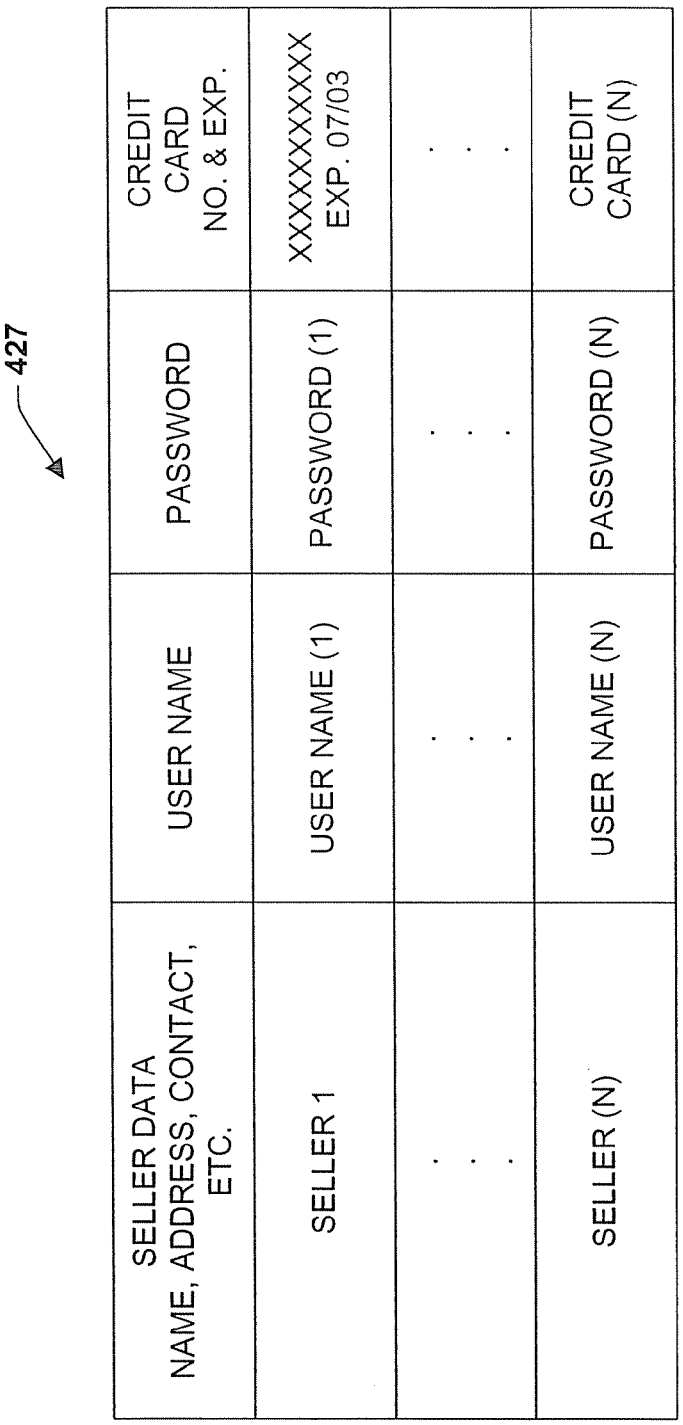
FIG. 11 illustrates a seller database stored in the central server in accordance with an aspect of the present invention.

Once the credit card application is submitted by the seller 20, the processor 100 proceeds to 415 where the processor 100 determines if the credit card application has been approved. If the credit card application has not been approved, the processor 100 proceeds to 420 where the seller 20 is informed that the credit card application has not been approved. The seller 20 can be provided with a customer service telephone number so that the seller 20 may optionally set up the account in a different fashion. If, however, at 415 the credit card application is accepted, the processor 100 proceeds to 425 where seller information is stored in a seller database 427 (FIG. 11). Then, at 430, the processor 100 is configured to provide the seller 20 with the newly issued credit card number so that the seller 20 is able to open deals. Further, the processor 100 is configured to provide a report to a system administrator, who can send a confirmation copy of the seller's information stored in the seller's database to the seller 20. This completes the seller's registration process.

However, if at 400 a seller has already registered, the seller 20 may login as a registered user by selecting the registered user hyperlink 130 (FIG. 3). Once selected, the processor 100, at 435 prompts the seller 20 to enter their user ID and password. Upon input of the user ID and password, the processor 100 proceeds to 440 where the processor 100 verifies a valid user ID and password have been entered by comparison with the information stored in the seller database 427 (FIG. 11). If the user ID and password entered by the seller 20 does not match any entry in the seller database 427, the processor 100 returns to 435 for re-entry of such information. If, however, at 440, a valid user ID and password are entered, the processor 100 proceeds to 445.

Upon successful entry of a user ID and password, the seller 20 is provided with a seller option screen 275 as shown in FIG. 8a. For example, the seller 20 may decide to open a new deal 182 or the seller 20 may decide to view a current deal 182 for one of a number of goods or services offered by the seller 20 or review a list of buyer inputted criteria. Accordingly, if at 445, the processor 100 determines that the seller 20 desires to open new deal 182 for a selected product, the processor 100 proceeds to 460.

At 460, the processor 100 requests that the seller 20 enter the seller's selling criteria, so that the system can build a seller's product offering criteria input screen, at 465. For example, in the present aspect the product agreed upon seller criteria is the volume range of the order and the price per pound of the order, the seller's selling criteria includes the delivery time and warranty with quality to be added next, and the seller additional criteria is that the buyer pay the cost of shipping the goods. As discussed above, the processor 100 utilizes the information input from the seller 20 to display a seller's product ordering input form 330.

At 465, the processor 100 request that the seller enter the limits associated with the seller's selling criteria chosen at 460, and the list of buyer's entitled to be offered the present deal. The information is entered and submitted to form a deal. The processor 100 uses this information to match buying and ordering criteria of the buyer with selling and offering criteria of the seller, so that deals can be completed in an expedited manner.

Continuing to refer to FIG. 9, if the seller 20 has not selected to open a new deal, the processor 100 determines, at 450, whether the seller 20 has decided to modify an existing deal 182. In the present aspect of the invention, the seller 20 is limited to modify those deals which they have opened. Accordingly, if the processor 100 determines that the seller does desire to modify a deal 182, the processor 100 provides the seller 20 with a list of deals 180 which the seller has opened. Upon selection of one of the deals 182, the processor 100 proceeds to 455 where the deal 182 is displayed to the seller 20. If a deal 182 is not entered at 450, or at 455 and/or 460, the processor 100 returns to 445.

Buyer Sponsored DealRoom

Figure 13:
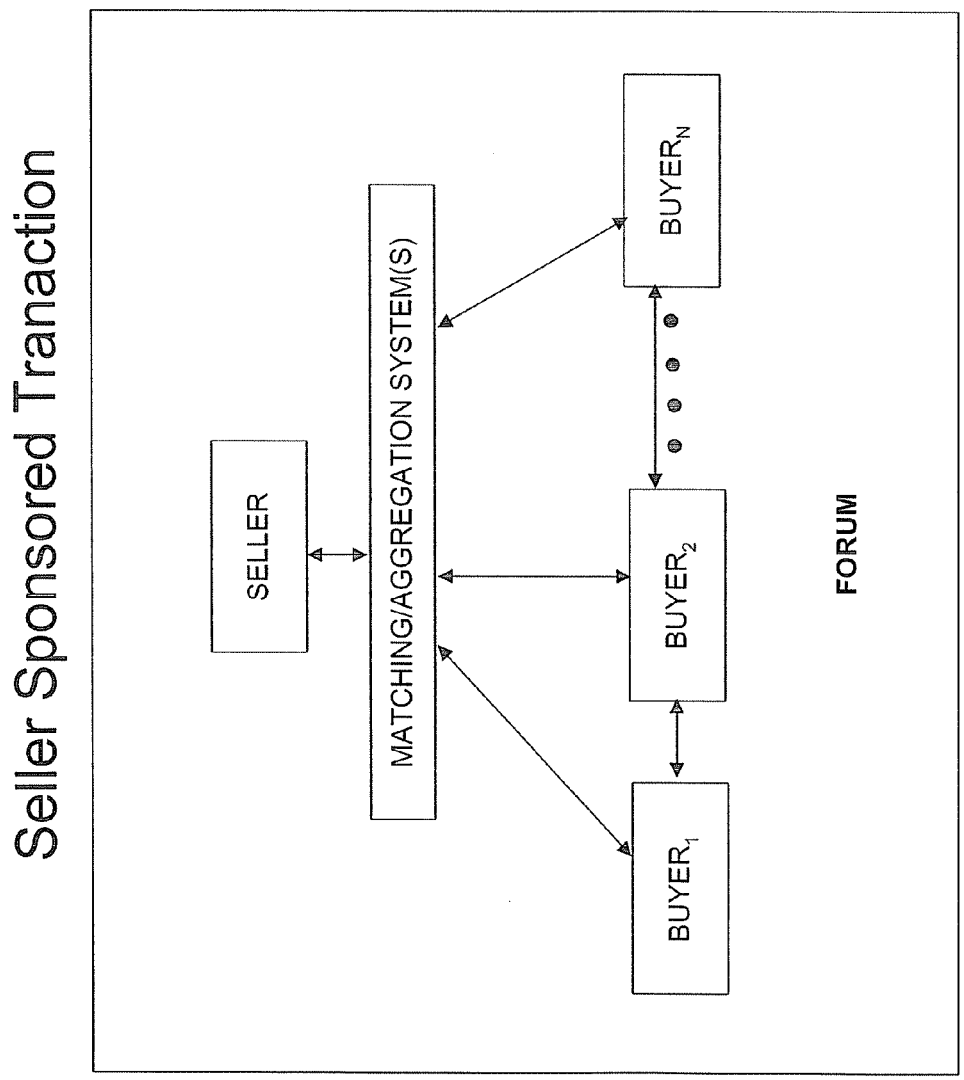
FIG. 13 is a schematic illustration of an electronic forum for conducting a seller sponsored business transaction in accordance with an aspect of the present invention.
Figure 14:
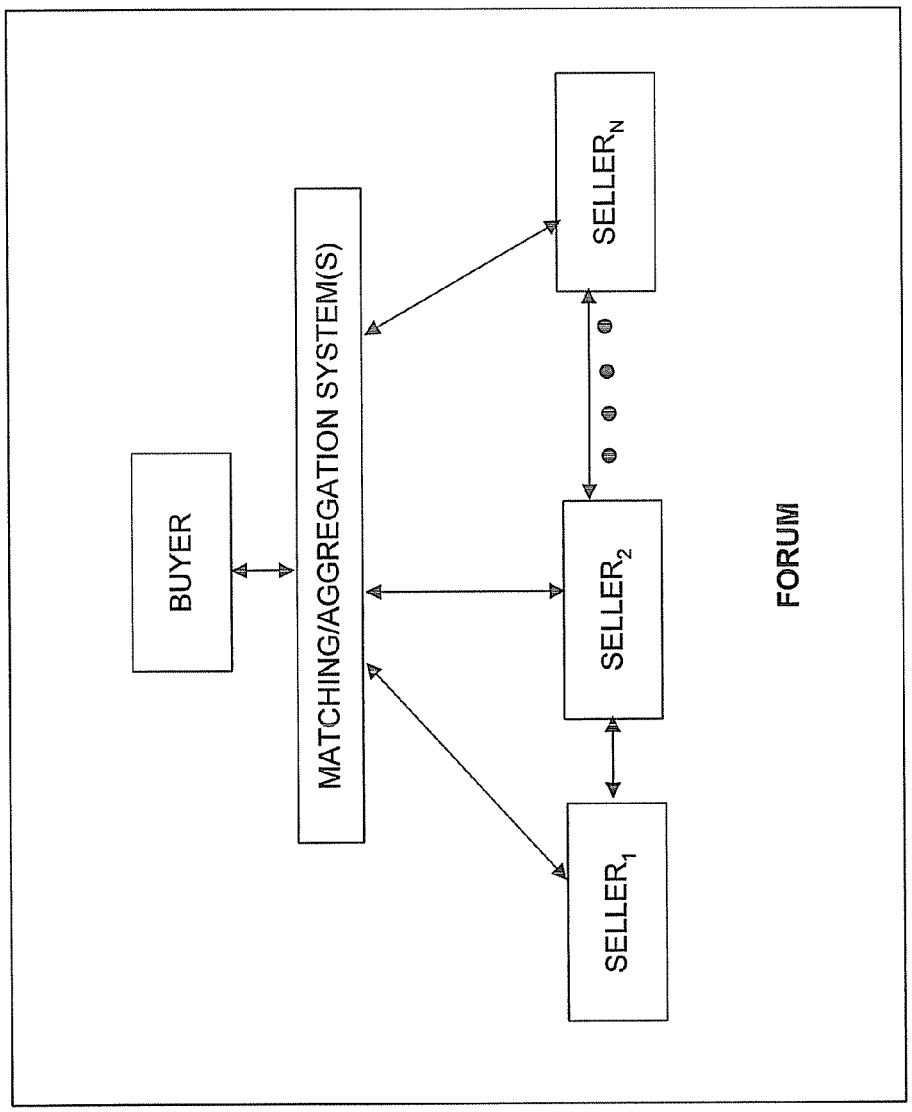
FIG. 14 is a schematic illustration of an electronic forum for conducting a buyer sponsored business transaction in accordance with an aspect of the present invention.

Regarding FIG. 14, although the present invention has been largely described within the context of a seller sponsored DealRoom (FIG. 13), it is to be appreciated that a buyer or buyers may sponsor a DealRoom to aggregate purchasing goods/services from a plurality of sellers. For example, a large corporate buyer may employ the present invention to create a DealRoom where a plurality of sellers may assemble to aggregate selling of specific goods and/or services that the buyer desires. Such a transaction facilitates the buyer satisfying purchase requirements in one forum and to coordinate deliver of goods/services. Furthermore, such a system facilitates sellers making sales to the buyer, which but for the sellers being able to aggregate the buyer may not have dealt with the individual seller because of insufficient capacity to meet the buyers' needs. The subject specification describes exemplary systems and interfaces for implementing the subject invention, and therefore further discussion thereto is omitted for sake of brevity. However, it is to be appreciated that one skilled in the art based on the above discussion regarding seller sponsored DealRooms/transactions could apply such teachings to implement the aforementioned buyer sponsored DealRoom/transaction.

Multiple Buyer and Multiple Seller Sponsored DealRoom/Transaction

Figure 15:
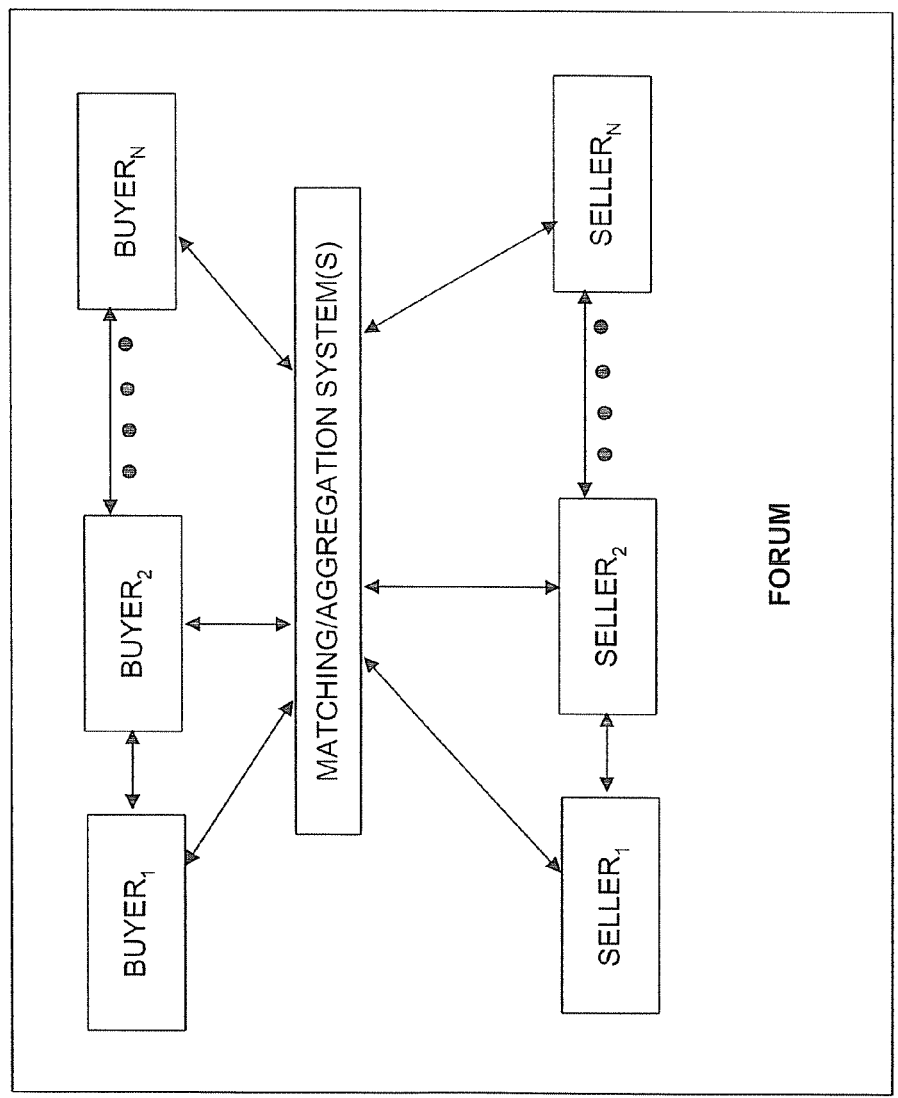
FIG. 15 is a schematic illustration of an electronic forum for conducting a buyer and seller co-sponsored business transaction in accordance with an aspect of the present invention.

Regarding FIG. 15, although the present invention has been largely described within the context of a seller sponsored DealRoom/transaction, it is to be appreciated that buyers and sellers may concurrently sponsor a deal room/transaction to aggregate selling of and purchasing of goods/services by a plurality of sellers and buyers respectively. For example, a multiple sellers and buyers may employ the present invention to create a DealRoom/transaction forum where a plurality of sellers and buyers may assemble to aggregate selling and buying of specific goods and/or services that the sellers which to sell and the buyers desire to purchase. Such a transaction forum creates great efficiencies with respect to purchase price and/or selling quantity of particular goods/services. For example, in such a forum dedicated to the selling and purchasing of a specific product/service, sellers can assemble to compete for the sale of their respective product/service, which leads to pricing efficiencies. Buyers can assemble in such a forum to aggregate buying power in order to negotiate good prices and close deals. Sellers on the other hand may also aggregate to meet the needs of a large buying block. The subject specification describes exemplary systems and interfaces for implementing the subject invention, and therefore further discussion thereto is omitted for sake of brevity. However, it is to be appreciated that one skilled in the art based on the above discussion regarding seller sponsored DealRooms/transactions could apply such teachings to implement the aforementioned buyer sponsored DealRoom/transaction.

OpenOffer Management System

One alternative aspect of the present invention affords for creating, altering and/or managing OpenOffer sheets on more than one Private DealRoom at the same time.

This aspect of the invention (preferably implemented via software) allows the company completing an OpenOffer Sheet to select those private DealRooms it wishes to submit the OpenOffer sheet. For example, a first OpenOffer sheet with one price and volume schedule may be automatically submitted to DealRoom #1 and #2. A second OpenOffer sheet can be submitted for the same product with different price points and volume schedules to DealRoom #3. The system allows a supplier to track any number of DealRooms and label a customer accordingly. The supplier may create subsets of private DealRooms at any time through grouping the DealRooms and saving them with a different name (e.g., mid-size companies, tier one, large company). This allows the supplier the real-time ability to segment all or some customers according to any number of criteria and present current pricing and capacity information. Therefore, the system is a tool for creating any number of pricing configurations among different products and updating those prices and volumes in a moment's notice among the selected DealRooms.

A company is able to see a pricing summary by product type across DealRooms. For example, the ability to select a product category and have the system return a list of the prices submitted for each along with the current price and the lowest price to be achieved. This allows for the company to track pricing strategy across DealRooms. The information can be reviewed in any number of configurations: pie charts, bar charts, scatter charts, etc. and any subsets of DealRooms. Statistical numbers are also available including totals, averages, etc.

The system also provides a running list of buyers that have access to DealRooms supported by the company. This is done through a search file in that private DealRoom and saved to the master management system. Every DealRoom has a different URL such as WCeWinWin.com or ADeWinWin.com with the requisite security. The system is also capable of performing a search by entering the customer name which then provides the proper DealRoom and password. Changes can be made by the supplier.

An OpenOffer Sheet can be posted on a regular interval and/or programmed to reset the offer with a rolling date (e.g., daily, weekly, bi-weekly, monthly) on master and individual sites. In addition, a component(s) of the OpenOffer Sheet can be altered and saved under a different name. For example, if a product price is selected to stay constant while the ship date changes to the next business day on a regular interval, that OpenOffer sheet can be saved and posted. The iteration will change with the passing of time. Likewise, OpenOffer sheets can be frozen with or without intervals with a freeze command.

OpenOffer sheets can also be retracted. This feature will pull offers from all DealRooms or any combination of DealRooms selected by the supplier. A product name and identification number can be accessed; and a retract or recall feature can be engaged. In the event that orders have been placed within the OpenOffer sheets, the supplier can fulfill the order as scheduled and/or notify the buyer(s) that the order has been cancelled.

The supplier can also list and search OpenOffers that have no orders. This is done with a quick search that will pull up the OpenOffers, DealRoom URL, projected ship date, etc. The master list can be perused and when highlighted, the supplier has the option of modifying the information accordingly and then post again within the specified DealRooms. Such changes as price, volumes, ship dates, close dates, etc. can be made and the new DealRooms submitted.

An online DealRoom can be created by a supplier instantly, if desired. The supplier can highlight a "Create New DealRoom" option and a room identification number and base URL for the new DealRoom is created. The supplier can then be asked to name the URL with up to a certain number of digits. Once the name and an administrator's password is selected, the new DealRoom is available. Additional information including contact name, e-mail address of contact, etc. can be automatically recognized based on a supplier user name, or the supplier may be asked to provide such information.

A private online DealRoom can be created for invited buyers. The invited buyers are notified of the opening of the DealRoom and given a username and password to remain anonymous. Preferred customers can also be given special pseudonyms, so that they can travel from DealRoom to DealRoom, while maintaining anonymity from reports generated by other suppliers and buyers utilizing the OpenOffer Management system. The private DealRooms invitations can be sent automatically via e-mail, instant message, etc.

A company can create a private DealRoom online, without revealing their identity. The supplier can enter a pseudonym and basic company criteria, such as the type of company (e.g. fortune 500, midsize, small), quality ranking, type of business (e.g., specialized, conglomerate), etc. The company can then track purchases and demand utilizing the pseudonym. The DealRoom can be configured to be offered to a specified group, such as distributors or preferred customers, or the general public as a blind offer. The deal room can be configured as a single order deal or as a time specified deal that allows buyers to aggregate in and reduce the price.

Transaction fees can be requested in real-time across one or more DealRooms. A fee structure is applied for customers based on the number of single transactions (e.g., completion of OpenOffer sheet by customer). Accordingly, a transactional figure is calculated for determining an online transactional fee.

Demand Aggregator System

The demand aggregator can capture and/or collate current and/or historical orders from OpenOffer sheets.

An OpenOffer Request Form allows a buyer on the system to alert suppliers of the product needed, category, quantity and when shipment is required. This allows the suppliers to respond with OpenOffer Sheets that match this need. The alert is by e-mail to the designated address given by the supplier. The buyer can request a private deal room, so that the identity of the buyer remains anonymous. The buyer can provide a pseudonym or an e-mail address, so that the supplier can notify the buyer or post a message to the buyer.

An OpenOffer Request Summary is available by product category. For instance, the supplier may wish to aggregate requests from all DealRooms by product category. In this way, the supplier may see the level of demand required by its buyers in advance of placing an OpenOffer for the product. This feature can be accessed in real-time. An icon can be clicked to show the summary of products being requested and pertinent data related to shipments. Excess capacity can be priced to preferred customers.

The demand aggregator can also compare current orders for a product on a timeline with the aggregated volume received from OpenOffer Requests for the same product and requested ship dates is available. This aggregation and comparison allows the supplier to better estimate production estimates and forecasts. This allows for better planned production and the ability to evaluate the cost savings in terms of labor, material, production runs, etc. which, in turn, allows the supplier to estimate the savings and prepare the appropriate price and volume points.

A search engine system is included for searching for deals over different supplier sites including the particular product requested.

Other information can be included in the system, such as:
Total capacity posted by product, total, timeline, etc.
  Total number of orders placed by product, total, timeline, etc.
  % of capacity remaining by each product category measured over the timeline
  Average price per product by product category, by DealRoom, by customer, etc.
  Historical timeline of product ordered, average price, breakdown by DealRoom
  Historical review of total capacity listed by product that went unpurchased
  Historical review of total orders over days, weeks, months, quarters, etc.
  Chart of top customers for each product line
  Projected sales taking historic information by product and extrapolating over time by weeks, months, etc.
  Trend analysis of product mix over periods of time
  Evaluation of a volume of unpurchased product over a predetermined time period and when such capacity will be taken off market (e.g., termination of specials from completed OpenOffer Sheets with close dates)

Private Buyer DealRoom Management System

A private buyer DealRoom management system allows a buyer to review product summaries and order information in a plurality of ways on the system based on DealRoom transactions. Such transactions can include:
  Total orders placed by product, group, average, etc.
  Total share by product type for each supplier—measured over days, weeks, months, etc.
  Summary of supplier ranking by product category
  Summary of current pricing information by product category
  Historical review of total orders over days, weeks, months, quarters, etc.
  Projected orders for each product taking historic information and extrapolating over time by weeks, months, etc.
  Trend analysis of product mix over periods of time
  This trend analysis is available on the site for suppliers to review in order to complete OpenOffer Sheets with relevant volumes
  Ability to compare percentage of products delivered on-time by product category over days, weeks, months, etc,
  Ability to compare percentage of products that meet quality criteria
  Ability to compare percentage of product suppliers with good customer service
  Ability to trend the price for a product over time: days, months, quarters, years
  Ability to profile a supplier over any period of time in price, quality, customer service, and deliver with a line chart showing trends to those suppliers via e-mail
  Ability to profile suppliers of a similar product in such a way to compare performance over time
  Ability to provide access for suppliers to see relative performance of their company versus other companies in the same category
  The function of setting minimum performance rankings for suppliers and when suppliers fail to meet these standards, the buyer is notified of—the buyer has the option of having an icon to click which will list those suppliers who are in jeopardy along with a brief order summary and ranking totals
  Ability to send to new suppliers via e-mail
  Ability to review the number of orders placed online and the fees associated therewith Pre-Programmed Search Agents A buyer can have pre-programmed search agents with pre-set queries, requests, order execution rights and limitations, and a myriad other instructions listed in the various other applications described herein. Additionally, there can be an associated Master Registration Form associated with the agent, which gives the buyer agent potential access to appropriate DealRooms. The buyer agent can have an embedded access code, which, if access is granted by the supplier, will permit the buyer agent to access the offer information. The buyer agent may have access to multiple DealRooms simultaneously. Through this arrangement, the buyer agent and the seller agent may interact to process the order. For example, the buyer agent might ask: "Can Product A be delivered on the $25^{th}$ instead of the $30^{th}$ for the same price?" The seller agent's response will be based on information programmed into its negotiating parameters, for example, "There is a 0.005% carrying cost added to the price for the requested change." This process is iterative based on the pre-programmed parameters of the agents.

The buyer agent can simultaneously negotiate with multiple seller agents from multiple DealRooms and collate information from various suppliers. The collated information is then displayed for the buyer's review according to display preferences preset in the agent's display protocol. For example, information can be ranked according to lowest price, earliest ship date, longest warranty, or any number of other criteria. Furthermore, criteria can be combined and or weighted to suit the buyer's particular needs at any given time.

The agent can also be provided with purchase rights. For example, if predetermined criteria are met, an order will be processed, including issuance of a purchase order number, confirmation notification, etc. Such information is valuable to the seller in that the agent is recognized as an agent having pre-programmed authority to purchase rather than an agent that is merely gathering information, thus permitting the seller to place higher priority in this particular agent.

The supplier can access interactions with buyer agents and the progress thereof. This information can be displayed, for example, on the supplier's computer screen, personal digital assistant, fax machine, etc. and will indicate early trends (for example, price and volume of each interaction) as wells as other data beneficial to the supplier's evaluation of potential modifications to the seller agent's protocol.

With access requests provided by a buyer and access rights given by a supplier, the system immediately allows for higher-level interactions between buyer and seller in private and secure locations. In these secure locations, the agents can interact proceed with the "buy-no-buy" decision. Similarly, a supplier may initiate the process with a buyer by sending a notice to the buyer's computer, personal digital assistant, fax, etc. Buyer has the ability to agree to view the offer, register, submit a profile, program the buyer agent via the questions provided by the seller, etc.

The agents are capable of using a variety of communication languages. The methodology of the system includes interactions involving JAVA, XML, etc., for additional information pertaining to the particulars of the offer, the buyer or seller, the product, etc.

Trend Analysis System

This aspect of the present invention (preferably implemented via software) captures and collates current and/or historical orders from OpenOffer and/or OpenOffer Request sheets.

The trend analysis system aggregates patterns of buyers in purchases and demands. The trend analysis system also aggregates patterns of suppliers in offers and performance criteria to form a variety of trend analysis reports. The system also allows analysis of buyers to facilitate buying blocks for buyers and to assist suppliers in adjustment of their deal room offers. The trend analysis system also provides reports on anonymous buyers and sellers via a pseudonym. The system can communicate between websites to rank suppliers based on different criteria. The system can also establish transactional profiles based on industries, geographical location and time periods. The various trend analyses can be provided in different formats (e.g. pie charts, time lines, etc.). The trend analysis system can be utilized to identify various problems with buyer OpenOffer Request trends and supplier OpenOffer trends and communicated back to the buyers and/or suppliers.

Market Share System Reports

This aspect of the present invention (preferably implemented by software) is capable of providing a file for suppliers to see the relative market share they have for a single product versus their competition. Substantially every item but price can be reviewed by the supplier online with the same functionality as the Private Buyer DealRoom Management System.

OpenOffer Merge File

Figure 12:
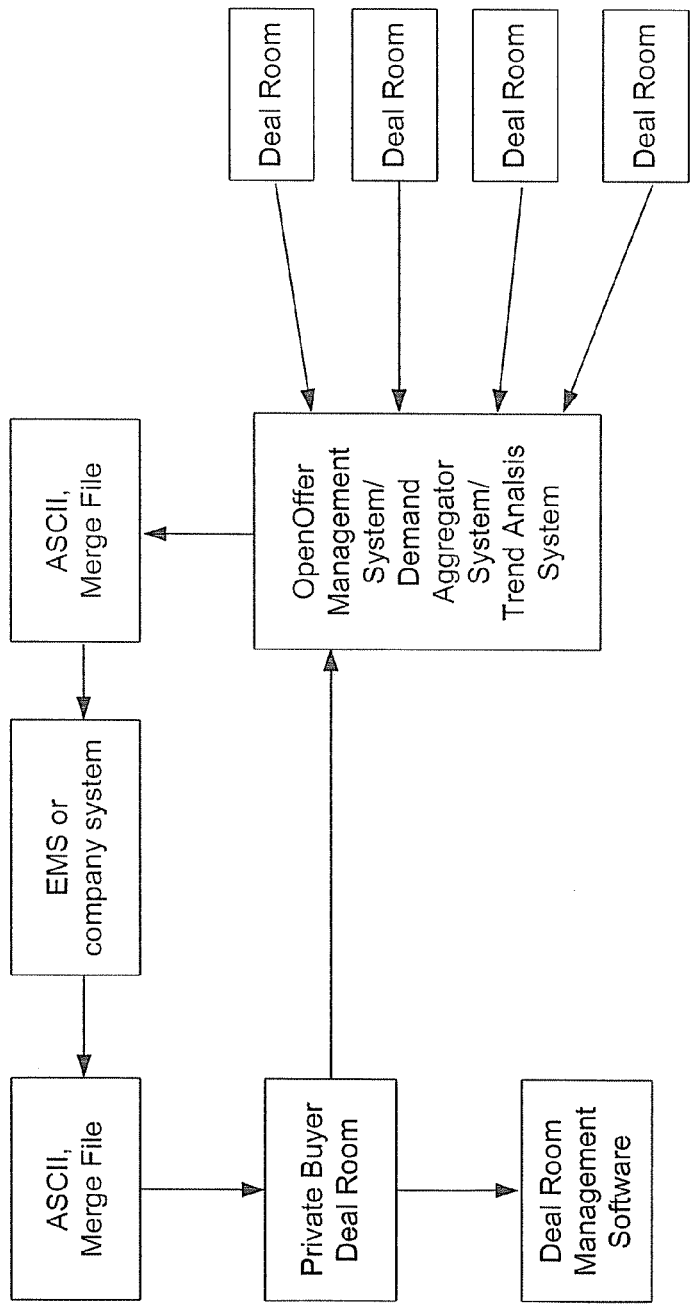
FIG. 12 is a schematic illustration of an ordering process in accordance with an aspect of the present invention.

For the buyer, the ability to place an order on any sponsored site and after placing the order, have the option to present the order in an ASCI II, comma delimited file that will be sent to a specified e-mail account automatically. The icon ASCI II will be available for the supplier to hit at the beginning of the purchasing process which will cover purchases made on that site. The ASCI II information will be posted to the e-mail address indicated by the buyer. This feature will also be included as a default set-up under MyeWinWin. This feature will then be engaged whenever a buyer has set up this default and will travel with the buyer from the site to the sponsor site. MyeWinWin is then activated whenever the buyer places an order on the sponsor site. FIG. 12 is a schematic illustration of an ordering process.

Dynamic Pricing Model

The previous activity of the buyer on a site is recorded on such criteria as amount of cancelled orders (as expressed by a number of %), the track record of on-time payment, etc. until a ranking is assigned to the buyer either manually or by default criteria set by the manufacturer. For instance, a buyer with a 100% rate of taking receipt of orders online and 100% of paying within 30 days would be assigned a high value such as AA. When this buyer returned to the site and entered a password, the AA rating would be denoted and a series of value-added services would be made available to that buyer such as a 5% discount for placing an aggregated order, special offers such as a rebate of x amount when the buyer is the first to place an order in the aggregated OpenOffer, etc.

In addition, a dynamic price can be assigned to the ranking of a buyer. For instance, buyers can be ranked in various groups such as AA, BB, or CC based on their past history. The AA can be tied to an automatic 5% discount whereby aggregated prices change automatically when the password of that company is entered. A company with a CC ranking could actually see a 5% premium when they visit the same site, simply based on the password and the company's past performance. The buyer that has a history of canceling may carry a higher cost to the supplierYthis cost, in turn, can be programmed into that particular buyer's experience on their site. In this way, additional DealRooms may not be required, as the same DealRoom will take on the characteristics of that buyer.

The rating of a buyer on one particular DealRoom can be aggregated and averaged along with the DealRooms of other suppliers to develop an accurate "buyer profile." This profile can be accessed by supplier to determine which customers visit the supplier's DealRoom and what prices they eventually see. For example, price range could be displayed in a single box, showing the buyer a potential price based on various factors, such as added buyer volume for a given ship date, lower raw material costs, etc. The box can show the "next" price in one area and the potential "final" price in another, employing any number of visual queues to emphasize the two prices and the difference between them. This dynamic price option can be set by the supplier or his agent or requested by the buyer or his agent.

Not Exceed Pricing Option

A supplier can list as an option for certain customers a NOT TO EXCEED option. In this case, a buyer has already negotiated a NOT TO EXCEED price through a blanket contract for a set period of time (e.g., B one year). The NTE tag along with the set price is programmed into the site through a series of fields. The buyer places orders on the aggregated schedule at any time. If the eventual price is below the NTE price, the order is executed at the lower price. If the eventual price is above the NTE price, the buyer is guaranteed that the highest price paid will be the NTE price. The benefits are as follows: the buyer is capable of only bettering the price negotiated at the beginning of the year, the buyer gains the advantage of playing regional prices to their advantage, and the supplier can secure a year-long contract to baseload the business while adding value for this prime customer.

A supplier can list as an option for certain customers a NOT TO EXCEED option. In this case, a buyer has already negotiated a NOT TO EXCEED price through a blanket contract for a set period of time (e.g., one year). The NTE tag along with the set price is programmed into the site through a series of fields. The buyer places orders on the aggregated schedule at any time. If the eventual price is below the NTE price, the order is executed at the lower price. If the eventual price is above the NTE price, the buyer is guaranteed that the highest price paid will be the NTE price. The benefits are as follows: the buyer is capable of only bettering the price negotiated at the beginning of the year, the buyer gains the advantage of playing regional prices to their advantage, and the supplier can secure a year-long contract to baseload the business while adding value for this prime customer.

Baseload Option

The baseload option status is conferred upon a buyer. In this case, the supplier negotiates a better price at the onset of the year in exchange for guaranteed acceptance of product orders throughout the year by the buyer. Once the buyer accepts shipment over the course of the year on pre-determined dates, the supplier can then post planned inventory in advance based on this baseloaded business. For instance, if the buyer agrees to accept shipment of 100 racks of glass the first week of every month for the next six months, the supplier then posts the availability of an additional 50 racks of the same glass for the same week. The existing of the original buyer provides a base that absorbs much of the fixed costs associated with the schedule while the incremental 50 racks represents proper capacity utilization at much higher profit margins.

The schedule can be posted in advance at prices that create an incentive for additional orders from other buyers on the site. A NTE price option can also be given to this supplier.

Show Status

This status can be conferred on a buyer as an incentive for the buyer to place orders early in the cycle of a product. A point system can be applied for the buyer. For every time a buyer is the first company to place an order in an OpenOffer Sheet, points can be accrued that result in a year-end rebate or some other incentive. For instance, 5 points assigned to every time the company is the first to order in an OpenOffer sheet applies towards the points needed by the end of the year to secure a discount. Such an incentive creates customer loyalty and rewards a buyer beyond the current system of discounts. Likewise, a rating system applied to non-cancellation or proper payment could further reinforce this behavior.

Real-time Price Update Screen

A screen setting is available that allows a buyer to post a series of product categories in a DealRoom with the current price setting and the close date. The buyer is able to check on a real-time basis the current price of clear glass by either a supplier or group of suppliers, and the respective volume still available with the close date. A product exchange is available to the buyer on an as-needed and customized basis. Likewise, the supplier can have a screen that shows the current prices of OpenOffers across DealRooms and additional information.

Scheduled Production by Product Category

The supplier is capable of engaging a feature in the system to aggregate, by product category, the total amount of product that has been ordered, when it is due to ship and the remaining amount of product that is still available. By inputting the amount of available inventory of the product on site, the supplier is able to see the production schedule for the product over the next duration of a week, month, quarter or year. This schedule can be viewed in a graph form with total capacity acting as the backdrop to total production currently booked. The system is capable of incorporating information from the supplier's MRP system in order to determine the total capacity available. Also, a field of total capacity per time period can be inserted. Now, the system can return an OpenOffer sheet automatically with the amount of volume available. The supplier can "split" the product offering among a couple of different OpenOffer Sheets and DealRooms. The system can also alert the supplier of the DealRoom with the highest price, historically, and where the excess volume should be placed.

Demand Forecast System

The buyer and supplier both have access to a historical purchase by a product category. The buyer can review historic product demand schedules and request that the DFS take over. The Demand Forecast System takes the preceding history and conducts an average, extrapolating into the future the anticipated demand. This demand is automatically placed into OpenOffer sheets. The OpenOffer sheets can be sent to the suppliers for that product category. The supplier simply assigns a price schedule based on the volume and submits the form to the DealRoom. The process saves the supplier and buyer from calculating or requesting forecasted demand manually.

The buyer and supplier both have access to a historical purchase by a product category. The buyer can review historic product demand schedules and request that the DFS take over. The Demand Forecast System takes the preceding history and conducts an average, extrapolating into the future the anticipated demand. This demand is automatically placed into OpenOffer sheets. The OpenOffer sheets can be sent to the suppliers for that product category. The supplier simply assigns a price schedule based on the volume and submits the form to the DealRoom. The process saves the supplier and buyer from calculating or requesting forecasted demand manually.

Reactive Pricing Model

A reactive pricing model can be provided which is based on orders for at least one product. In this case, the supplier has the option of lowering a price automatically based on market activity. A supplier of clear glass has set a price and volume schedule. If the activity of the site is such that multiple glass orders have been placed, and the data show such orders have taken place with other suppliers of the same product, registered discounts may be triggered by such activity automatically if pre-determined by the supplier. No pricing information is shared. Rather it is simply based on the volume of product. The supplier may come in with pricing starting at $0.29 per square foot of glass. If the trigger point is reached with enough orders being placed with other suppliers, the price is dropped to a pre-determined schedule already determined by the supplier. Conversely, the price can be set to increase if activity is skewed too heavily to the supplier in question. In this case, if orders are coming in sooner than anticipated the supplier has the option to pull the pricing schedule automatically (dropping current orders to their lowest point or not) and resubmit the pricing at a different schedule predetermined by the supplier.

Additionally, the supplier can program the price feature to engage over several DealRooms. For instance, assuming the glass price in one DealRoom is priced higher and is being accepted by the customer, the system will automatically alert the supplier of this happening and suggest additional volume be placed in that room. The program could also allow for the supplier to automatically post more products, say a specified amount, to the DealRoom with the highest price.

Additional criteria can be added to this analysis. Assuming a DealRoom profile of customers who accept the order on time, pay in a timely manner, and pay a higher price than other DealRooms would automatically be listed as the first customers to receive the next available product volume.

Alternatively, or additionally, another reactive pricing model can be provided which is based on an amount of time left in an offer. A timed offer can be preset with the supplier presetting dynamic pricing as the time elapses on an OpenOffer sheet. Assuming no one has placed an order or if available quantities are still available, the price can be programmed to drop by a percentage throughout the remainder of the bid until a hidden price point is reached. The buyers are encouraged to place their orders accordingly until the market price has been established.

CRM Package

Information on buyer and prospective buyers are loaded into a database that can include buyer information, such as:
Individual name
Company name and address
Email address
Phone number
Cell number
Products purchased
Volumes
Time of purchase Other aspects of purchasing can also be included, such as, times purchased, number of visits before order, price point at first visit, second visit, products ordered, etc.

The record can also included information from the supplier, such as:

Whether a prospective buyer generally pays on time (yes or no, or ranking applied, rating, etc.)

What percentage of business a prospective buyer gives a supplier (whether there is potential to get more business? If yes, then buyer joins another group segmented by the supplier)

Special offers to buyers, such as, discounts and/or coupons, which may be in the form of a % off the curve or a new curve if buyer agrees to place an order during this visit.

The cost to service customers can vary according to a variety of factors. One of which is "when" the order is placed. For example, the sooner an order is placed, the more beneficial it is to the supplier with the ability to plan production to reduce costs of subsequent orders. The earlier an order is placed and the larger the amount, the more value may be created.

Incentive to Place Orders Sooner

Figure 16:
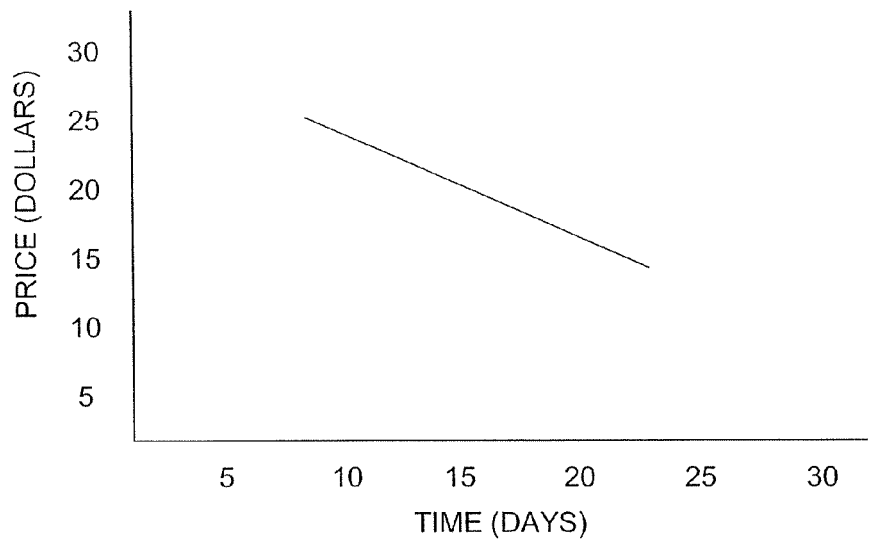
FIG. 16 is an example of a price curve in accordance with an aspect of the present invention.

One example of motivating buyers to place orders sooner involves an initial offering of lower curves to a group of buyers. The curve (or curves) can "change" according to a pre-determined set of criteria. For instance, buyer A sees a curve as shown in FIG. 16. As orders are placed, the curve can be constant for that group of buyers, or a lower tier can change. This can be specified in advance to the buyers by the supplier.

Figure 17:
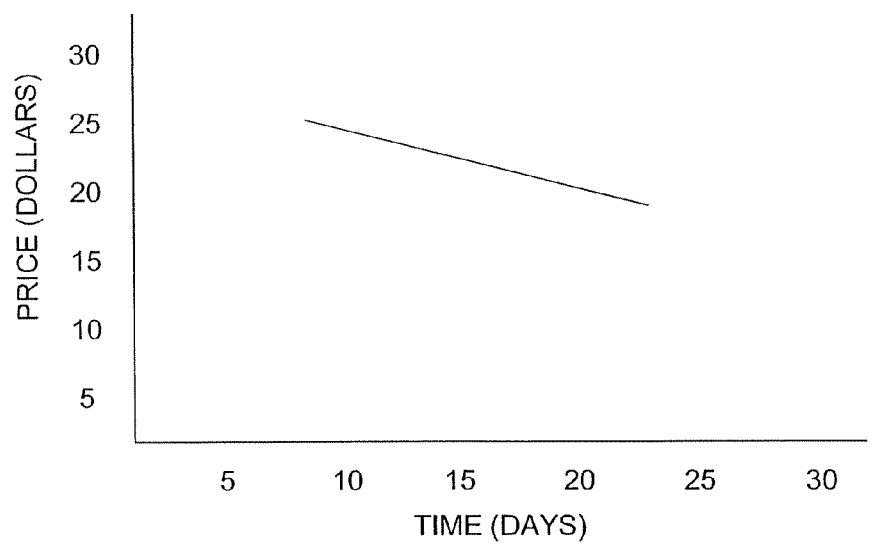
FIG. 17 is an example of another price curve in accordance with an aspect of the present invention.

However, as shown in FIG. 17, subsequent buyers may see a different curve for the same product with any number of variations (e.g., first price is different, price breaks vary, lower price is changed). This system rewards the buyers willing to place an order earlier and lets the supplier plan the production run in advance.

The CRM package records information for each buyer so that custom curves can be set-up by the supplier. For instance, a buyer has ordered product A three times over the past six months. The first order was placed when the product price was $22, the second when it was $20 and the third when it was $20 again. The final price received was $17, $16 and $15 respectively. The next curve the buyer may see will be set automatically based on the supplier's specification. Examples of such specifications include:

Past price average over x period of time (number of orders, period of time, etc.) will be the first, middle or last price seen as determined by the supplier First price point will be x % above the last order price placed Last price received (curve bottom is set x % below that price, initial price is set at x % above the curve top).

Past price first view

Past price first order

The CRM package can evaluate buyer patterns and tendencies and determine the optimal price curve for each buyer, group of buyers, sub-segment of buyers, etc. Such curves will be created in rapid succession whenever this tool is constructed and filled out by the supplier for each buyer. Curves will be created around a particular buyer's "experiences" online whatever they may.

A supplier may also designate an instant "Not to Exceed" price based on certain buyers going online. For instance, in the previous example buyer A may go online and be offered a price somewhere in the middle of the curve as a "Not to Exceed" $18 dollars. In which case, the buyer will be guaranteed that price at a maximum with the potential to get a better price as the volume increases. These alerts can be customized based on the data collected from that buyer and set into the software to appear on selected products and offers. These can also be sent to directly to the buyers via software generated HTML updates and notices of the offer, sent to voice mail, personal digital assistant's etc.

A buyer may also be given the special offer of "buy now that the offer has closed and receive an additional 2% of the total price" to help facilitate more sales. Other specials can include: "order now and receive free shipping," "5% off the next order or this order," "free storage for x number of days," etc.

The CRM software can record every offer ever made to a buyer and document which offer(s) was successful. This information can be analyzed for buyer patterns and provide input on future curves/new buyer segments, etc. For instance, buyers that ordered at a price point of $20 were 80% more likely to add to the order when free shipping was included.

Likewise, data from online questionnaires can be tabulated and presented as part of the buyer profile and used in future offers. A buyer who states they like the free shipping feature can be segmented into a group in which that offer is made available; the new price curve may reflect a surcharge for such feature.

Conversely, buyers who like the no-cost storage for 30 days could see a different curve automatically with that a part of the offer. In this way, the buyer's behavior and input will be used to automatically present curves that reflect their wants and/or needs.

Option to Sell Back to the Supplier

Buyers may also buy "futures" of a product. For instance, a group offer may be presented. The buyer can place the order for X quantity. The supplier has the right to "buy back" the product from the buyer if desired. The buyer may be given a lower price for this option. Thus, the buyer can take the product for predetermined period of time, and the supplier may buy back the product at a same (or different) price if desired.

Buyer Can Select Price Curves

A supplier can post three curves for the same product and a buyer can select which price curve will be applied to a particular product by accepting different terms and conditions associated with each curve (payment due at time of order).

Offers May Be Personalized

Buyers can receive personalized offers, such as, place order now, place order on your next visit, place order within x period of time, add to your initial order and receive X % more off this purchase or receive a deeper discount curve.

One-Click Add to Initial Order

A buyer can have the ability add to a previous order without going back to site. An HTML (voice mail, personal digital assistant, cell phone, etc.) can be generated and sent to the buyer showing the price curve and the total volume ordered. Based on this knowledge, the buyer is able to click on the HTML and directly be sent to the curve's order form (or have fields already presented there) and add to the initial order. The system would update the order automatically, post the new volume on the purchase order and update the curve at the same time.

Likewise, special offers can be delivered via this same medium. For instance, a special offer for a buyer to order now and immediately receive 3% off the price of the product regardless of any more orders being placed would allow a buyer to add to the order.

Extend Offer

A supplier can select an icon that opens a price curve's close date. An automatic message can be generated within a specified period of time (x days before close, a few hours before close, etc.) that asks the supplier if the offer should be extended for x hours, days, etc. The supplier can click on an icon and a field appears in which the supplier selects an acceptable time period. An email may then generate an automatic alert letting buyers know of this opportunity.

This feature can also be sent to those buyers listed in the CRM program that have or have NOT visited the offer. The curve can be sent to the group of buyers with the extension and price. A special offer can be included as well that offers these buyers an extra incentive to place an order. Since the buyers are registered, they can agree to place an order from the HTML notice if they have engaged this feature on their end.

Changes in minimum order quantities can also be done via a notification system. The supplier may specify a certain minimum for an offer. Once it is reached, a notice can go out which changes the minimum for future purchases. Also, once a minimum quantity is reached, the supplier can set the program to change the price curve. Future buyers may see different starting, middle and ending price figures.

Spot Curves

Figure 18:
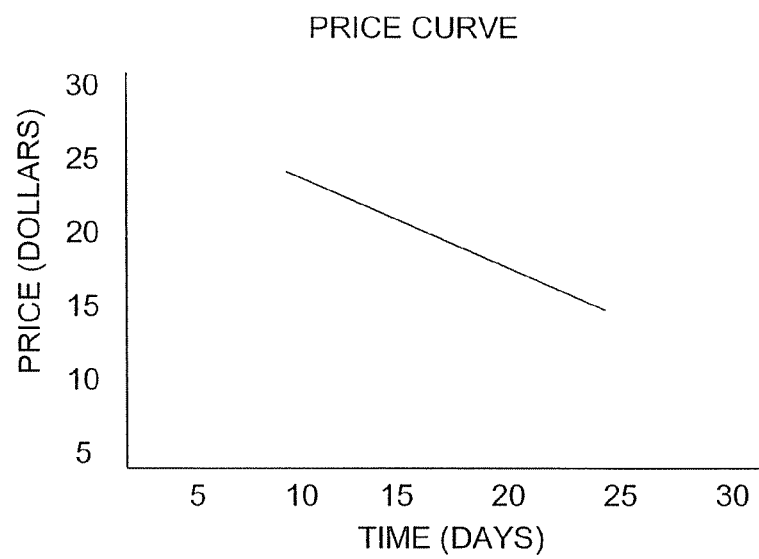
FIG. 18 is an example of a spot curve in accordance with an aspect of the present invention.

A supplier can create spot curves, as shown in FIG. 18. This feature can be used when inventory is high and certain products must be moved. In this case, an offer can be extended for a period of time. A buyer may come in and place an order for the product and then take the product immediately or along the period assigned. The final price will be determined at the end of the order period, which may come after the product is already at the buyer's location. Spot curves can be sent to buyers via the CRM package and offer buyers another incentive to place an order immediately.

The buyer also has the ability to change the accept date. The system will calculate the new price based on the underlying carrying cost. An alert will go out to the buyer (he can request to be notified within a period of time).

For instance, a buyer has agreed to purchase 20 tons of steel. He specifies 10 tons to be delivered on the $10^{th}$ and the other 10 tons to be delivered on the $30^{th}$. The total order is then calculated based on what surcharge has been placed on the offer by the supplier (the surcharge may also be $0). As more buyers order, the price drops according to the curve. A ship location may also be identified to specify if the first 10 tons need to be delivered to a certain location and the second 10 tons to a different location. A ship icon can be used to present the transportation costs and a total icon can be used to present the total costs to the buyer.

Supplier Can Offer Products Accordingly:

A supplier can offer products according to a specific date range (e.g., week) or by a particular date. A buyer could have the option of choosing an icon for a specific date to have delivery made. The supplier can add the costs per day or even per hour, on each ship date. The buyer gets the benefit of a group purchase with receipt at the given time. If the buyer needs to change the ship date, he can do so by clicking on "change ship date." The quantities ordered, the shipping location, the order number, the date of delivery, etc. can be listed and a Modify button can be clicked to change the quantities shipped and the dates. If the change is outside of a predetermined range, a cost may be levied. If the date specified is in such a range that carries a surcharge, then the buyer would be billed the extra cost (a calculation can be set by the measured quantity such as tons and the carrying cost per day associated with that unit). This is an optional feature that can be turned on or off dependent upon the supplier and what "groups" of buyers have this feature engaged.

Also, this feature can be turned off during the offer and an HTML can be sent to buyers letting them know the order can be placed and they will not be charged for storage up until x date. This is a semi-automatic or automatic feature that is embedded in the software.

A shipping icon can flash once an order has been placed asking the buyer if they would like to arrange for shipping at this time. The current price per mile or other form of pricing can be presented.

Change Order

A buyer can click on an icon that directs them to his/her order page in which the buyer can change the options of the product selected. For example, a buyer may place an initial order for 50,000 units without specifying any or all of the options and/or details associated with the product. Later, the buyer can return and specify one or more of the options, ship dates, etc. for the products. There may or may not be a charge for this feature.

Buyer's Ability to Change Quantity

This feature allows a buyer to change a total quantity ordered. The curve may not change for the group of buyers who already ordered. This event, however, could trigger changes in slope, prices, quantities available, etc. for the other curves. A surcharge may be levied or not based on the supplier's decision.

Curve Sets Automatically

A first price for a product may be $25 and a final price for the product may be $15. The software allows a supplier to define such prices along with a volume and a price curve can automatically calculates any price breaks. The supplier can specify a number of breaks that should be calculated, such as 2 or 3. Specify a shallow initial curve, and the curve automatically is set up, or specify a deeper curve, and the curve is presented.

Every Order Reduces the Price Curve

The uniqueness of this curve is that with every minimum order (if set), the price drops according to the curve. For instance, the supplier sets the top and bottom prices along with the volume. As every order is placed, the curve automatically reflects the current price (e.g.—could be in dollars, cents). Regardless, every order reduces the final price.

The slope can also change to reflect a deeper curve at the beginning, and then shallow out at the end. A supplier specifies the type of curve (an icon with different slopes can be presented and the supplier simply has to click on the slope of choice and the prices will calculate automatically). The curve is superior in many ways because the buyers don't need a larger incremental volume to be reached before receiving a lower price.

This curve can also be introduced into a regular curve. The initial curve starts out with segments. Buyers can be notified via HTML that the offer has been modified so that every order will drop the price. A minimum can also be changed. Regardless, the value to the buyers is the ability to add to their initial order and know that every unit will reduce their price even more.

Multiple curves can be linked and de-linked at will by the supplier.

Price Break Change

New price breaks can be introduced by a supplier with a single click of the icon. The price breaks are presented and the supplier can make changes by clicking on the break in question, clicking on a % and clicking on reduce or increase, and pressing submit. All buyers, specified buyers, and/or those buyers who haven't seen price curve yet, etc. can be notified of the new price curve.

A buyer can have access to such changes made by a particular supplier. For instance, in a buyer's DealRoom the information on the supplier's changes to curves, segments, prices, different buyers, etc. can be evaluated.

Buyer Information

The supplier can make available to the buyer the average price for a product over the last X number of offers, time, etc. The metrics can be listed in their entirety, or in some form as controlled by the supplier (or buyer in the BSDR). Probabilities would be calculated and shown to the buyers: for instance there is a 70% probability the next price tier of x dollars will be reached with the margin of error displayed.

Alert System for Supplier

If a % of probability is not holding true on an order and time is passing quickly, an alert system will let the supplier know of the options available (i.e. B drop price curve, shill order, offer special curve to certain buyers (e.g. B A profile buyers).

Integration of CRM, ERP (Production Scheduling) and DAS

Figure 19:
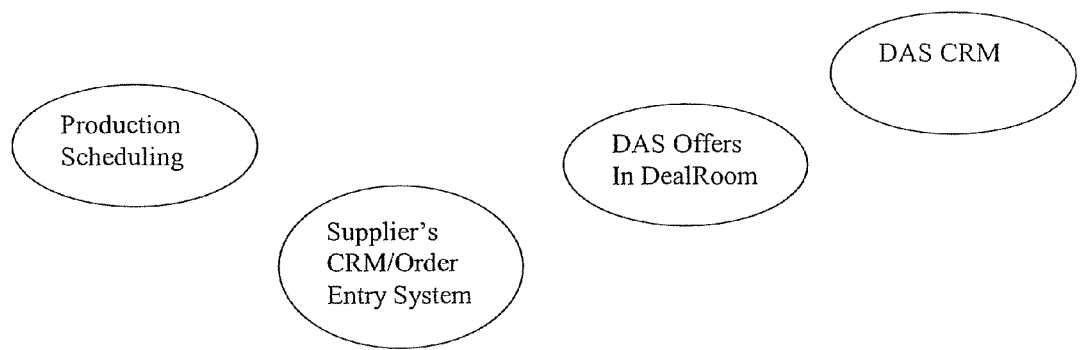
FIG. 19 is an example of a demand aggregation system in accordance with an aspect of the present invention.

The following section describes how production scheduling, the supplier's CRM package, DAS and DAS CRM can interact with one another to create a system, as shown in FIG. 19, that adds value for buyers and suppliers.

For instance, a production run can be scheduled for six weeks from now for product B with options X and Y available. The total quantity to be produced is x, and x+300 is the optimal run. The scheduler can indicate this to the Product Manager/Sales Manager etc. with the notice: Do we post the remaining quantity in the DealRoom? Or, the software will be written to automatically post these offers to the DealRoom with the same ship date, fob point, etc. populating accordingly to the buyers listed in the DealRoom/CRM package. Once the curve is created and confirmed (automatically or semi-automatically by the other party), the curve is posted in the DealRoom and the emails alerting the appropriate buyers (as listed in the CRM) and internal people (e.g. sales, inside customer service, etc.) are sent. Multiple curves may be sent, linear offers may be prepared (e.g. B show curve 1 for 24 hours, if not takers post curve 2, etc.) or any number of other features may be included as listed in this patent application and other applications. Further elaborating on this feature, the software can be configured with a series of if, then instructions:

Post to first buyer B price curve A

Post to second set of buyers B price curve B

Post to third set of buyers B price curve C

The system allows for the supplier to change the sequence and the time between offers (first offer may be for A, if no orders or a certain thresholds not ordered then offer B and C concurrently with linked curves).

If an order were to be received online in the DealRoom, it would automatically populate the production schedule with quantity ordered and other specifics and/or the order entry software. Likewise, if an order can in from the order entry system, the change would be reflected in the DealRoom (e.g. B capacity changed, minimums changed, curves changed, etc.). "Astimulus" event would impact the other parts of the system, and show up as a way to price out the available capacity. Likewise, cancelled orders/changes to production runs would immediately change the offers and order entry data. If the total quantity has been ordered, a notice would be sent to production regarding additional capacity/quantity?

A change in the production schedule would also alert the Marketing/Sales Manager of available capacity and the ability to add to the curve. The cost curve for the product is also available for viewing. The manager can determine what price curve should be set. Also, customer feedback as to when they would like to receive their next order can be tabulated and sent to the production manager. The production manager can put into the schedule and agree to the total volume optimal in the run. The Marketing Manager is notified, approving of the offer specifics and the buyers to be contacted, and the order entry software is also contacted with the information and is shown on the screen for internal order takers/sales representatives.

The data collected from the order entry system regarding the customers who ordered, their volumes, prices, etc. can be shared and inputted into the CRM package for data analysis. Buyer spending limits set in the order entry system can be set and carried across to the DAS DealRoom. A credit system/amount available can also be referenced in the software and indicated to the buyer and supplier. If the buyer attempts to exceed his limit, a notice is given that he is doing so and needs to speak with the supplier. The order has not impacted the curve at this time.

One Time Only Curves

A supplier is able to post curves that can be pulled at any time. Buyers are aware of these special offers and thus, may not choose to plan their production on this availability. These are truly spot opportunities and must be seized immediately. A guide can be provided to the buyers on the types of curves that can be presented.

Multi-Dimensional Curve

Figure 20:
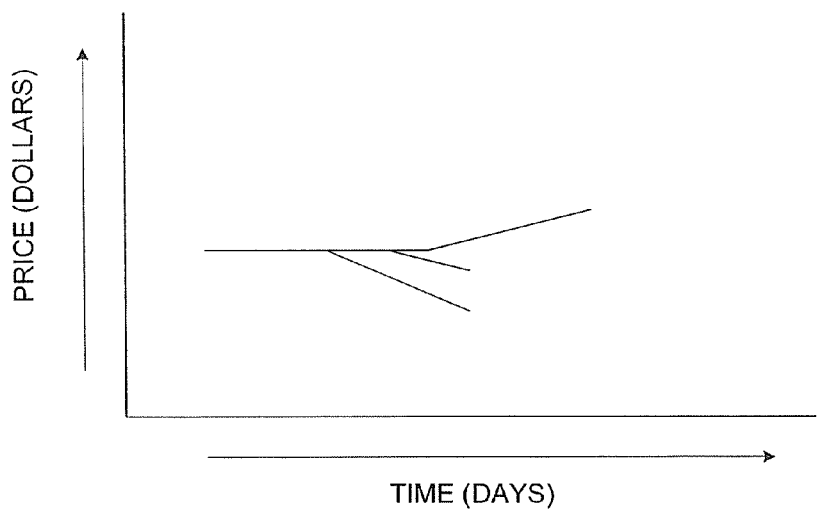
FIG. 20 is an example of a multidimensional price curve in accordance with an aspect of the present invention.

An example of a multi-dimensional curve is shown in FIG. 20. In this example, the buyer is encouraged to place an order sooner. Here, the buyer can see the earlier the order, the better the curve and final price. This would work for seasonal products where a supplier could truly benefit from early orders. Again, these curves can be dynamic, adjusting as set by the supplier and by the demand ordered. If the product is scarce or pricing is unknown, the supplier may offer these type of curve, or variations of it, to entice buyers to provide a pricing floor. Once done, then the other curves can be modified (higher or lower) and the earlier curve disappears for the rest of the buyers except for those that had already placed their orders.

A not to exceed option can also be placed in this model. The NTE means a buyer would never pay more than the existing price where they placed an order, even if the curve was going up. And, a downward curve connected at the time of purchase may be offered to give the buyer a better opportunity to get a lower price.

Option to Buy

A buyer can purchase an option to buy the product during the offer. For instance, a fee would be paid by the buyer to hold a slot in the production schedule for X number of product A. The supplier may post certain restrictions such as time of option to be exercised, etc. If the option is exercised, then the price is confirmed. If the option is not exercised, the supplier has this capacity to sell but would collect a fee from the buyer holding the option.

Seasonal Price Curve

Figure 21:
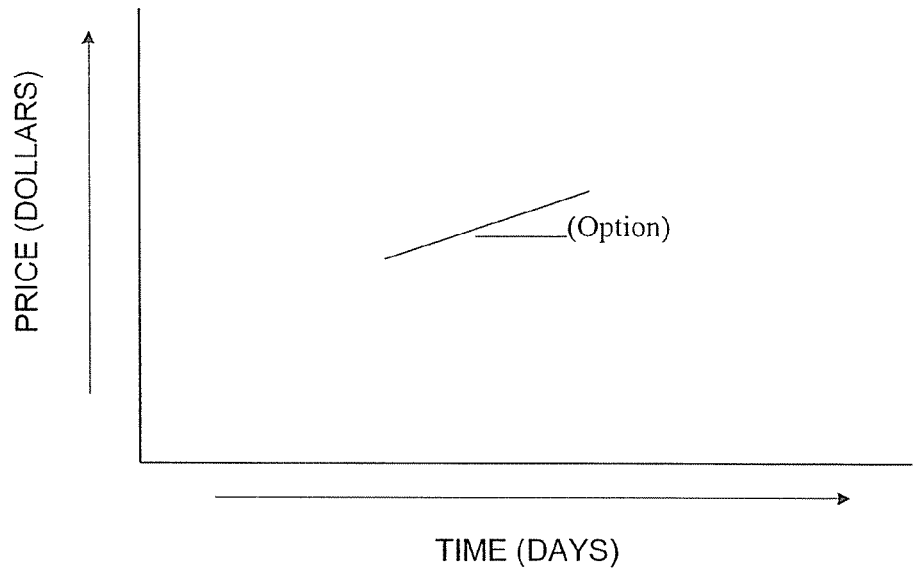
FIG. 21 is an example of a seasonal price curve in accordance with an aspect of the present invention.

Another example of a curve is shown in FIG. 21 and is one that is set in advance and is time-sensitive. Offshoots tied to volume may or may not be included at during the offer.

Option to have Production Schedule Underwritten by a Third Party

To set up a line and produce a product is a costly venture, especially if volume is not known or the run length is incomplete. Using DAS, a supplier will have the option for a third party to underwrite the cost of the production run if certain volumes are not ordered. Based on archival data, a third party can set the proper risk assessment and tie a financial figure to it. The software would record the figure and the volume required.

For example, a run would be set-up and a final volume reached. If the volume did not reach a certain threshold, then the third party would pay the supplier. If the volume did reach the threshold, then the third party would keep the payment. Partial volumes could also dictate what level of the payment would be released by the third party. In this way, a form of insurance could be purchased by the manufacturer producing the good. These contracts would be available for common trading among third parties.

Other factors which may be used in this example are: post production run, ship date, FOB point, product, quantity, history, the right to purchase X of product A within a specified periodYoption price of X. Buyers can also participate, being able to buy options to purchase X amount of product.

Figure 22:
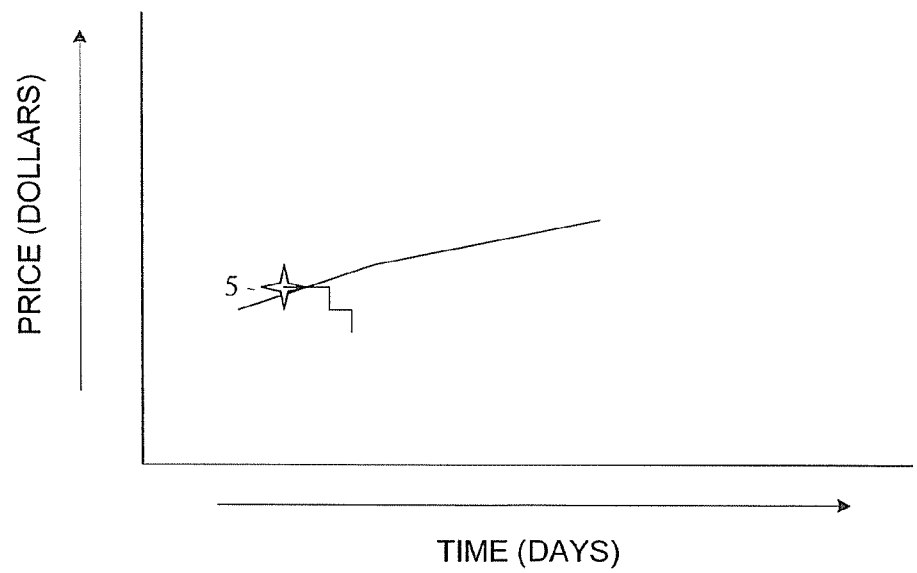
FIG. 22 is an example of another price curve in accordance with an aspect of the present invention.

Another variation on the price curve is shown with respect to FIG. 22. Here, if an order is placed at a certain point, every other order placed by buyer will drop the price by x %.

Software Option

Sales representatives/ISR's, when viewing both pricing curves (forgers and service centers), would like to know which curve they are viewing. Therefore, the software contains a labeling system including but not limited to names and/or color coding of the curves.

Currently, sales representatives are only able to see the two different curves (Forgers and Service Centers). To broaden options, when a representative logs on, a drop down box on the first page (home page) can be employed to let him or her choose whether to see Service Centers, Forgers, or any other curve. In essence, they can be logged on as the "buyer" and be able to see exactly what the buyer is seeing.

Additionally, a "view all" option can be added. This option would allow sales representatives to see all the different curves. Optionally, an extra field can be added in the aggregated offers page. This field will provide information regarding the company name, or name of the group of buyers that are able to see this specific curve.

Sales Simulation Software

The seller has the ability to program an agent for a "mock" purchase session. Buyer agents are randomly set based on seller-provided information, and the interactions are set up and executed. Additional information can be gleaned from various sources, including actual data collected from earlier mock sessions with different suppliers and buyers. The seller can learn how the process works, and, ultimately, the seller can determine the final volumes and price points that are achieved. The seller can then analyze this data and compare it with real costs to determine whether the observed margins are acceptable. With this information, the seller may modify the offer or the seller agent protocol.

Agent Analysis Software

After a critical number of interactions have taken place, the system will graph orders and non-orders for further analysis. For example, the supplier may determine that price was a critical factor in 80% of the analyzed order data, with 40% of the data resulting in non-orders because the offered price exceeded that which the buyer requested. Similarly, the seller may see that the offered warranty was an issue in 10% of the non-orders. Seller can use such information, in conjunction with recommendations presented with the data points to inform the seller of various options, to determine whether the seller should modify his or her offer.

Auto-Post and Re-Post Feature

For example, a supplier has posted an aggregated offer for ship date Y. An order enters the system from a buyer with a different ship date X specified (could be the internal ERP system, other order entry system). The order is taken and the system determines there is a new ship date with an X ship date. The system references the new ship date with the old. The system can be programmed to defer to the new ship date by a number of criteria (such as by the customer who ordered the product, the amount ordered, etc.). If so, the program can be set to automatically do the following:

If there are no orders for ship date Y, the system changes the ship date to X and can notify the buyers accordingly.

If there are orders for ship date Y, the system alerts those buyers via phone, fax, personal digital assistant, email, etc. of the change in ship date. If the buyer confirms the new ship date is acceptable, the order is added to offer X. An incentive (3% off your final price if you accept, etc.) may be offered by the system (as programmed by the supplier). Another option would be the buyer refuses to accept the discount for the ship date. The buyer can then cancel the order via the system, or the supplier can honor the ship date of X as well as Y. The supplier can also automatically post the new ship date (X) in the DealRoom.

Change in Minimum Order Quantity

Product Offers are set up with a minimum order quantity to simulate normal business practices. DAS also allows an Offer to be configured with a multiple minimum order quantities. Once the volume on a particular offer reaches a predetermined level, the minimum order quantity can be lowered (or presumably, raised).

For example, an offer for 12L14 bar could be set up with an initial minimum order quantity of 10 tons. Once orders have been placed totaling 100 tons, the minimum order quantity could be lowered to 5 tons automatically.

Customer-Determined Offer Availability

Product Offers are generally determined by the supplier. However, DAS has the capability to survey buyers of a product. The buyer can indicate a desired purchasing schedule, indicating the types of products, product options, quantities and delivery dates. Using this information, a supplier can determine a production schedule that meets their internal goals, while accommodating customer demand.

New Offer Notification

As new Offers are created, DAS can aid with the marketing and promotion of those offers. During the Offer creation process, DAS will notify the Action Manager of two potential pools of customers. First, DAS generates a list of customers who have purchased that particular product before. Second, DAS will generate a list of potential customers, based on the survey data of registered buyers.

Using these two lists of buyers, the Action Manager (or Supplier) can then create a targeted marketing program. DAS will allow new Offer notification both by email and by fax. A buyer with a particular product tagged will automatically or semi-automatically receive html alerts whenever the product has been ordered.

New Pricing Notification

As orders on offers are placed, prices fall based on the pre-determined price curve. As prices fall, DAS can generate different lists of customers, such as: those who have already placed orders; those who have purchased that particular product before; and potential customers, based on the survey data of registered buyers. The Action Manager is notified of the price reduction and presented with the list. They can then elect to notify the groups to the new price (and savings) via email or fax.

The supplier has the ability to alter the curve in one of the DealRooms to those buyers who have not yet seen the curve. For instance, 40 buyers have access to a DealRoom. 5 buyers have visited with 2 placing orders. The curve will stay the same for this group of 5 (or two if the supplier wishes to engage this option). The new curve will change according to input from the supplier (let's assume it is higher, but it also could be lower). Now, when the remaining buyers (35) visit the DealRoom, they will see only this new curve (with the volume of the two included to reflect an aggregated purchase in process). Likewise, the HTML notices generated from this DealRoom will automatically have this group separated and tagged.

Those buyers who either saw the first curve would still see the curve they saw earlier. The new buyers would see a different curve. Volume ordered by each would be reflected in the other curve. The supplier can change a curve in mid-offer without upsetting any customers. The profits would be higher with the real-time flex-curve and new buyers still benefit from aggregation (initial starting points, volume discounts, total volume, etc. could be changed by the supplier in real-time).

HTML and Instant Order Form

A buyer can receive a real-time HTML alert notifying the buyer of a current product or service price. An icon may then appear that allows the buyer to select to order the product or service immediately. Another icon can also appear which would send a reminder to the buyer to check back on the product or service at a predetermined time chosen by the buyer. If the buyer chooses to order the product based on the HTML alert, the buyer can bypass the front page (name and password sections) and the other pages in between, and be at the order page. The buyer can then enter the order (or add to the already placed order) at the order page.

Tethered Price Curve

Every buyer is given a % off the price of a product along with a scheduled discount curve based on total volume ordered. The buyer's discount follows the buyer throughout the DealRoom and by product. As more volume is ordered for a particular product, (e.g., 100 tons), the buyer would experience the discount from their own price volume curve. In this way, 100 buyers could have 100 price curves while still aggregating their demand on the same curve. Buyers are tethered off a production volume tied to a certain ship date or period.

Changing-Tethered Price Curve

The % off could also change according to time or any other criteria selected by the supplier (product, fob point, volume, etc.) If the buyer has not ordered yet, a personal discount may be reduced as more orders come in. Conversely, if few orders are placed, the buyer may see an increase in the discount curve until he orders. Once he does, his particular price curve is Alocked in A for the remaining offer time.

Sales Manager Dashboard

A sales manager dashboard can be incorporated into the system. The dashboard is designed to allow a user to quickly set up DealRooms, Offers, Products, Customers, and Customer Groups. Each of these functions can be accessed from a standard web browser or wireless personal digital assistant. Thus, the software allows quick set up and configuration of each set of data. The dashboard also contains a plurality of wizards that can quickly configure a set of information. The wizards can include:

DealRoom Wizard

A DealRoom wizard allows a user to quickly create new groups of customers based on geography, company size, sales volume, or any other category grouping. A point and drag feature can be included to direct a potential buyer, a product offer, etc. to a DealRoom.

Offer Wizard

An offer wizard allows a user to quickly create new offers, based on previous offers or entirely new offers.

Product Wizard

A product wizard allows a user to add products to be offered.

Customer Wizard

A customer wizard allows a user to register new users by manually entering information or importing information from existing data sources (e.g., a spreadsheet). Users can be set up from a workstation or the information can be entered remotely from a wireless personal digital assistant.

Customer Group Wizard

A customer group wizard allows a user to create new customer groups, reassign customers within groups, remove customers from groups, or remove entire groups.

Each wizard, upon substantially completing its function, has the ability to determine if another wizard should be invoked. For example, once the DealRoom wizard has completed setting up a new DealRoom and the customers that will have access to that DealRoom, the next logical step is to call the product wizard to create products that will be offered in the new DealRoom. The offer wizard would then be called next to configure the offers for those products. Likewise, the customer wizard can call the customer group wizard in order to assign a new customer to an appropriate group or groups of buyers.

The sales manager dashboard may be accessed via a phone line. For example: a user calls a 1-800 number to access his DealRoom. The user is then asked to enter a code, which may be entered on the number pad or spoken into the phone receiver. Once accepted by the system, the user hears a series of prompts. The prompts may include:

To post a new offer, press or say 1. Here, a series of prompts then walks the user through a series of fields to be completed (e.g., the product, starting price, price breaks, ending price, quantities). The user can at anytime review the information for accuracy. The company name and buyer(s) or groups of buyers that have access to the product are then entered. Finally a confirmation is sent to the user to confirm the order. The confirmation may be sent via email, instant message, etc. After the initial offer, the software can automatically enter new offers for the user over the phone based on the user's input.

To add a new customer, press or say 2. Here a buyer can be added online with a notification (via email, instant message, etc.) sent to the buyer with user name and password information.

To change a customer's options, press or say 3. Here a customer can be added or removed from a specified DealRoom.

To find current orders, press or say 4. Here a user can find his current, outstanding orders, or a seller can find any outstanding orders by customer and/or product.

To find DealRoom information, press or say 5. Here a user can determine when a DealRoom will close, what the current product price in the DealRoom is, etc.

A user can navigate through and even customize the options in order to have access to any and all information available in a DealRoom. Restrictions upon these options may be set by a system administrator.

Action Manager Dashboard

The action manager can have access to part of or the entire operation of DealRooms from multiple suppliers, multiple buyer and supplier price curves, etc. from a single screen. For example, drop down menus allow an action manager to see a list of DealRooms by supplier. Selecting a folder allows the action manager to then see the various DealRooms within each supplier DealRoom. Selecting the folder again allows the action manager to view the products offered in that particular DealRoom. In one section of the screen, the action manager can search via filters/free text searches to pull up the name of a DealRoom, buyer, etc. Headings displayed in the search box can include new customers, existing customers, etc. A point and drag system lets the action manager put a new buyer into a proper DealRoom (listed in folders on a side of the screen). This tool allows the action manager to quickly post new customers to DealRooms, change access rights, or delete from the DealRoom. If the action manager selects a buyer name, another portion of the screen displays the individual buyer information as well as access to notes, contact information, name and password information, etc.

Another portion of the screen is a delimiting function that allows the action manager to limit searches by state, company name, DealRoom folder, product folder, etc. Likewise, individual buyer information is available by selecting that particular folder. A product profile is also listed for each buyer, which can be completed by a buyer via email, upon registration, or by the action manager during a phone call. Products are tagged and as orders are placed for those products, the buyer is alerted via email automatically sent from this dashboard. The orders can also be tabulated and viewed through the dashboard.

The products the buyer purchases are color coded to show the following profile:

Orders a product frequently B chart the orders over time

Has ordered in the past B shows when that product was last purchased, click again to see all of their purchases for this product, at what price they entered their order, at what price they received when all the volume was added Average price of when first order is placed % savings from that price to the final price % savings from the first list price versus the price where order was placed Is order volume increasing over time, decreasing over time? Show graph Superimpose trend of average price and total volume orderedYcalculate the price sensitivity of this buyer: High, Medium, LowY Show range of the buys: min, max., average, median price points in a single graphY What is the price elasticity for this customer: As price drops, how much more is ordered Average savings on product Extrapolate how much customer will order over the year (based on data collected)

Show this on a graphYcompare to the average of all buyers for this product (tally from online orders for this item)

Develop a buyer profile showing the supplier (and possibly buyer) how often the buyer orders, etcY.for quick reference whenever the buyer profile Show curves for all of these features by different DealRoom segments List feature B high price elasticity to low price elasticityY Customer adds to order: very frequently, infrequently.

Supplier can group into segments: Green are tier 1 buyers, Blue tier two buyersYand decide to regroup the buyers into new DealRoomsY Alert System As each of the wizards is called, a user can configure a series of notifications. These notifications can be done via email, fax, or paging, to a workstation, wireless personal digital assistant, or phone/pager. As part of the customer wizard, the user can choose to be notified the first time a new user logs onto the system, or the first time a user places an order. As part of the offer wizard, the user can choose to be notified when the first order is placed, when the volume of product ordered reaches a predetermined point, or when the offer is about to close.

Support of Sales Goals

An example of the use of the sales manager's dashboard can be a quick configuration of offers for products after a sales meeting. When a supplier determines sales goals, focus on sales in a particular product line, or any other sales based initiatives, the system can be immediately configured to support these initiatives. For instance, new offers can be created for products determined to be hot sellers; new customer groups can be created to support initiatives to enter a new sales territory; and/or new DealRooms can be set up to accommodate a restructuring of sales accounts.

Posted Order Not Shown

When an order is cancelled, the volume may not be removed from the price curve due to the desire to show price transparency. However, this is likely to cause the supplier a significant loss since the buying group will be given the discounted price without the ordering the volume of product that warrants such a discount. Cancellation fees may be imposed, however, if the cancellation takes place at the top of the curve, the margin of loss is still high. In order to protect a supplier from future losses, it is desired to keep the "canceling buyer" segregated from the other buyers. This can be done by showing the "canceling buyer" the curve that the other buyers see. If the "canceling buyer" places and order on his/her curve, this volume will be placed in his/her curve only. Thus, the other buyers will not be affected. When the offer closes, and if the "canceling buyer" has not cancelled the order, the volume will be added into the curve for the other buyers and the price will be discounted accordingly. This system could be accomplished by allowing a buyer to select an option to "hold volume until close".

Purchasing Profile

The system can allow a customer to have a predefined purchasing profile. For example, if a customer typically purchases a particular product with particular options, the customer's personalized information will be automatically retrieved and entered when a new order for the customer is initiated. Likewise, if a customer has a contract pricing relationship with a supplier, the customer's contract price, along with the customer's standard options and purchase information will be automatically retrieved and entered when a new order for the customer is initiated.

Reminders, via email or instant message, could also be sent to the customer based on his/her personal purchasing profile. For example, if a customer desires to place orders 45 days in advance for particular products, the system could send reminders to the purchasing agent if the customer has not ordered within the 45 days. It is to be appreciated that any predetermined amount of time may be configured for the reminders.

The system can also automatically update fields, such as the additional information field and the shipping instructions field, based on the customer's location. For example, if a customer typically has product A sent to his/her plant at location X and product B sent to his/her plant at location Y, the instructions specific to each product can be identified and attached to the appropriate orders.

Another variation is a buyer with multiple products that are ordered from a particular supplier. A listing of these products is placed in the buyer's customer profile. When a new curve is introduced for one of these products, the buyer receives an alert or feeder, as will be discussed in greater detail below. If the alert is received via email, the email can contain a link and/or order icon, which will allow the buyer to place a new order automatically. The customer profile can be further tailored to match ship dates between the profile and the supplier's product offering prior to sending an alert to the buyer.

The buyer may choose to have a feeder running across a portion of the buyer's home page, which displays the current offers and prices for products in the customer profile. The price and ship dates can be listed along with the price curves. An icon may be selected to see the current price curve. Thus, the buyer can view, firsthand, the ability to group a purchase. With one click, the buyer can access a particular DealRoom which displays the product curve and order page that the buyer is interested in. Or, from the feeder, the buyer can click on a product and an order screen for the product appears. The feeder can be updated in real-time to reflect new product prices and volumes available.

If the buyer has already placed an order for the product with a different ship date, the system displays the old ship date and the new ship date to the buyer. The buyer is then given the opportunity to transfer the order to the new ship date by selecting an "accept new ship date" icon. A confirmation notice via email, for example, is sent to the buyer to inform him/her of the specific terms (e.g., cancellation terms) of the offer. The information immediately allows the order to be put onto a group purchase option and the price curve reflects the new change.

Posting Additional Price Breaks

The system can automatically, or semi-automatically, post additional price breaks within an existing offer. For instance, if an offer has a first price break of five dollars at 100 units and a second price break of ten dollars at 300 units, the system can automatically post price breaks according to a predefined schedule or prompt the supplier to post price breaks at various points between the 100 and 300 quantities. The ten dollars could be broken up equally (i.e., one dollar price break for every 40 units), or a variety of other pricing structures could be established, such as, more breaks at the beginning of the curve, more breaks at the end of the curve, and variations on the increments whether equally distributed or lower dollar amounts initially then higher, etc. The option, once selected by the supplier, could alter the price curves accordingly. Likewise, this feature could be integrated into the system with the ability to alert buyers via email, fax, phone, instant message, etc. of the new price breaks that have been established.

Price Curve Creation Tool

A price curve creation tool allows a supplier to import existing customers and prices (contract and/or current price) and previous volumes ordered into a price curve. The price in the DealRoom curve can be established by having the supplier select a starting price curve and an option to put the same price on a first tier for a buyer with a predetermined percentage discount (e.g., 1% off current price when order is placed online), or an option to match an offline price to the first tier of an online curve. The rest of the curve can be created by using a wizard. The wizard can walk the supplier through each buyer's curve from a single screen view and then display a curve that reflects the price and volume breaks for that particular buyer. If the supplier changes quantities, the curve's slope will immediately change to reflect the new price breaks. These price curves can likewise be changed quickly by using the feature to modify an existing curve between DealRooms.

The invention has been described with reference to the preferred aspects. Obviously, modifications and alterations will occur to others upon reading and understanding the preceding detailed description. It is intended that the invention be construed as including all such modifications alterations, and equivalents thereof and is limited only by the scope of the following claims.

Displays for Aggregated Purchasing

Displays, where a supplier can post for buyers the changes in prices relative to ship dates and time of order, can include: Show offers by the day over a period of time (e.g., calendar with 30 days).

Calendar for the product, which can coincide with the ship date.

A customer gains access to a DealRoom and sees a listing. Current quantity available in stock and price of the current stock.

The current price can read the customer's contract price or default price set by the DealRoom where the buyer has been given access.

A calendar shows the dates for any period of time (e.g., day by day, week, month, quarter).

A price per unit measure (e.g., pound, carton). For instance, a buyer would register to the DealRoom and instead of seeing a price curve upfront, the buyer would select a product category and then see a calendar appear with different prices for each date (tied to a ship date or receive date). As an example, on the first day of the month, a product has a price of $129/thousand and on the fifth day, the product has a price of $127/thousand. The buyer can select a day with a price by clicking on an icon. A price curve appears that shows where the price is in the curve, the next price break, quantity available, time for an order to be placed, etc.

Other options also exist, which include: a table with prices and quantities, a 3-dimensional chart that lays out the month along with the relative price points and quantities available, a curve that shows prices (lowest to highest, for example) for the product, and price and time remaining for each offer.

An "L" for the lowest price in view, "2L" for the next lowest price, etc. can also be listed on the calendar for a quick view.

The buyer can place an order and add to the group's acceptance date. As the offer closes, the price is confirmed and the order executed.

A quick search can be done to find the lowest current price, the lowest potential price, etc. Or, a quick search can be done at the first page by selecting a product and having the chart appear accordingly, or the prices and dates offered appear.

Some dates on the calendar may not have any numbers that would reflect that the product is not available at that time (unless pulled from inventory in which a price can be put in that correlates to the contract price/pull from inventory price).

A carrying cost calendar can be used on the screen as well for the buyer to plug in numbers such a quantity needed, time before product is completely used, date initially needed, average consumption per day, total carrying cost percentages, etc. and the system will return the appropriate volume to order and date.

The system can display information such as: how many buyers have access to a particular offer, how many buyers have visited an offer to date, how much has been ordered by a group over the history of the product.

The system can also include a price protect feature for a supplier. For example, once a buyer has ordered, the screen, or calendar, is copied and is accessible for future use. The data can be forwarded to a database that will track the price and delivery variances and arrive at a price sensitivity profiles for the buyer and the particular product. The supplier can also use this information to generate future calendars for this buyer or other buyers. A ranking system will also be available to show the price sensitivity of this buyer as the different dates and prices are pulled into a database and a color-coded or ranking system is leveled that compares the buyers and puts them into categories, such as: high price sensitivity (1:3)—for every 1% decrease in price, the customer purchases 3% more; medium price sensitivity (1:1.125)—for every 1% decrease in price, the customer purchases 1.25% more, low price sensitivity, and no price sensitivity.

The calendar can also change in real-time based on the information fed into the system by a semi-automatic function (the user inputs changing volumes and prices) or a direct feeding of information from the supplier's ERP system. Current inventory levels would not only change, but also the available volumes.

The supplier or buyer can also have a save feature incorporated that allows the buyer to save the prices presented in the calendar for a period of time determined by the supplier. In this way, the buyer has access to a product's old prices for a period of time while still having access to the lower prices that may appear from changes to the calendar in the interim. It is a way to reward a buyer for participating in the program and can be done automatically by the software and given a name (e.g., calendar May 1, 2002 for quick access).

Predictive Modeling and Reporting Function

The demand aggregation system can also include a predictive modeling and reporting function. Authorized data can be posted in a DealRoom and is audited and confirmed by an outside source, if necessary. The authorized data can include: the number of open DealRooms for a product:
   the average offer period
   minimum and maximum prices offered
   minimum and maximum quantities offered
   at least one graph illustrating starting and ending points for the product
   average volume ordered in each DealRoom
   mean, variance, standard deviation, and other statistical analysis
   trend analysis
   number of total buyers with access to the offer
   number of active buyers with access to the offer
   average number of active buyers to total buyers with access to the DealRoom An algorithm is then employed to utilize the information described above and post a probability chart on the product price point. For instance, the product being offered has the following probability posted:
   10% probability the final price will be $125
   80% probability the final price will be $135
   10% probability the final price will be $145

As volume is ordered for the product, the probabilities are updated in real-time to reflect the change. Thus, if the time required to reach the mid-point on the price curve occurs earlier within the time frame of the offer, the probabilities of the price dropping to a lower price rises and another probability is presented to illustrate that the price could drop further.

The present invention may be implemented via object oriented programming techniques. In this case each component of the system could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements allow objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

The present invention can employ abstract classes, which are designs of sets of objects that collaborate to carry out a set of responsibilities. Frameworks are essentially groups of interconnected objects and classes that provide a prefabricated structure for a working application. It should also be appreciated that the PCM and the shared memory components could be implemented utilizing hardware and/or software, and all such variations are intended to fall within the appended claims included herein.

According to an exemplary aspect of the present invention, Java and CORBA (Common Object Request Broker Architecture) are employed to carry out the present invention. Java is an object-oriented, distributed, secure, architecture neutral language. Java provides for object-oriented design, which facilitates the clean definition of interfaces and makes it possible to provide reusable "software ICs." Java has an extensive library of routines for copying easily with TCP/IP protocols like HTTP and FTP. Java applications can open and access objects across a network via URLs with the same ease to which programmers are accustomed to accessing a local file system.

Furthermore, Java utilizes "references" in place of a pointer model and so eliminates the possibility of overwriting memory and corrupting data. Instead of pointer arithmetic that is employed in many conventional systems, the Java "virtual machine" mediates access to Java objects (attributes and methods) in a type-safe way. In addition, it is not possible to turn an arbitrary integer into a reference by casting (as would be the case in C and C++ programs). In so doing, Java allows the construction of virus-free, tamper-free systems. The changes to the semantics of references make it virtually impossible for applications to forge access to data structures or to access private data in objects that they do not have access to. As a result, most activities of viruses are precluded from corrupting a Java system.

Java affords for the support of applications on networks. Networks are composed of a variety of systems with a variety of CPU and operating system architectures. To enable a Java application to execute anywhere on the network, a compiler generates an architecture neutral object file format—the compiled code is executable on many processors, given the presence of the Java runtime system. Thus, Java is useful not only for networks but also for single system software distribution. In the present personal computer market, application writers have to produce versions of their applications that are compatible with the IBM PC and with the Apple Macintosh. However, with Java, the same version of the application runs on all platforms. The Java compiler accomplishes this by generating byte code instructions which have nothing to do with particular computer architecture. Rather, they are designed to be both easy to interpret on any machine and easily translated into native machine code on the fly.

Being architecture neutral, the "implementation dependent" aspects of the system are reduced or eliminated. The Java virtual machine (VM) can execute Java byte codes directly on any machine to which the VM has been ported. Since linking is a more incremental and lightweight process, the development process can be much more rapid and exploratory. As part of the byte code stream, more compile-time information is carried over and available at runtime.

Thus, the use of Java in the present invention provides a server to send programs over the network as easily as traditional servers send data. These programs can display and manipulate data on a client computer. The present invention through the use of Java supports execution on multiple platforms. That is the same programs can be run on substantially all computers—the same Java program can work on a Macintosh, a Windows 95 machine, a Sun workstation, etc. To effect such multi-platform support, a network interface 105 and a network browser (not shown) such as Netscape Navigator or Microsoft Internet Explorer may be used in at least one aspect of the present invention. It should be appreciated, however, that a Java stand-alone application may be constructed to achieve a substantially equivalent result. Although the present invention is described with respect to employing Java, it will be appreciated that any suitable programming language may be employed to carry out the present invention.

An Internet explorer (e.g., Netscape, Microsoft Internet Explorer) is held within the memory of the client computer. The Internet Explorer allows a user to explore the Internet and view documents from the Internet. The Internet Explorer may include client programs for protocol handlers for different Internet protocols (e.g., HTTP, FTP and Gopher) to facilitate browsing using different protocols.

It is to be appreciated that any programming methodology and/or computer architecture suitable for carrying out the present invention may be employed and are intended to fall within the scope of the hereto appended claims.

The subject invention has industrial applicability in at least the fields of computer systems, networks, and electronic commerce.

What is claimed is:

1. A business transaction methodology, comprising:
   executing computer readable instructions stored in memory to allow for display of an interface to a merchant over a network;
   receiving a set of information from the merchant through the interface, the set of information including a volume schedule for a product or service, the volume schedule specifying a predetermined quantity of orders for the product or service required to activate a discounted price for the product or service;
   executing computer readable instructions stored in memory to allow for the display, over a network, of a quantity of orders necessary to activate the discounted price for a product or service to a buyer based in part on a profile of the buyers, wherein the profile and the set of information are distinct data sets; and
   receiving orders for the product or service from two or more of the buyers over the network.

2. The business transaction methodology of claim 1, further comprising classifying buyers into at least one segmented group based on at least one of an indication of geographic location or a current location.

3. The business transaction methodology of claim 2, further comprising displaying the set of information to the at least one segmented group identified by a merchant, a third-party sponsor, or a system administrator.

4. The business transaction methodology of claim 1, further comprising displaying information necessary to allow the merchant to create new offers as a part of the interface.

5. The business transaction methodology of claim 4, further comprising creating the new offers based on previous offers.

6. The business transaction methodology of claim 1, wherein the interface allows for adding a product or service to an offer.

7. The business transaction methodology of claim 6, wherein the interface allows for adding a second product or service to the offer, wherein the second product or service differs from an existing product or service included in the offer.

8. The business transaction methodology of claim 1, wherein the interface allows for registration of new merchants.

9. The business transaction methodology of claim 1, further comprising creating a new customer group, reassigning a customer within a group, removing a customer from a group, or removing groups.

10. An Internet business transaction method, comprising:
providing access to at least one of a buyer, a merchant, a third-party sponsor, or a system administrator to carry out a commercial transaction, access provided over a communications network;
providing an interface allowing for configuration of an offer for a product or service, wherein the offer includes a volume schedule comprising a predetermined amount of the product or service that must be ordered to achieve a discounted price, the interface provided over the communications network as a result of executing computer readable instructions by a processor;
presenting the offer to a buyer based on a profile associated with the buyer that is distinct from the offer, the offer presented to the buyer as a result of the execution of computer readable instructions stored in memory, the offer presented over the communications network; and
receiving orders placed by multiple buyers for the product or service based on the offer, the orders received over the communications network.

11. The method of claim 10, wherein a deal room is assigned a unique uniform resource locator (URL) for each presented offer.

12. The method of claim 11, wherein the unique URL is determined by at least one of a merchant, a third-party sponsor, or a system administrator.

13. The method of claim 10, further comprising providing access to ratings or feedback associated with a particular buyer, a particular merchant, a particular third-party sponsor, or a particular system administrator.

14. The method of claim 10, further comprising determining a probability the predetermined amount of the product or service will be ordered within a particular time period.

15. The method of claim 14, wherein the probability is determined based upon an analysis of buyer patterns.

16. The method of claim 14, wherein a trend analysis component contributes to a buyer profile based upon at least one of an analysis of buyer patterns, an analysis of offer views without a subsequent purchase, an analysis of an industry associated with a product or service, a buyer, or the buyer patterns, or a geographical location of the buyer.

17. A non-transitory computer-readable storage medium having embodied thereon instructions executable by a processor to:
provide access to at least one of a buyer, a merchant, a third-party sponsor, or a system administrator to carry out a commercial transaction;
provide a dashboard to configure an offer for a product or service, wherein the offer includes a volume schedule comprising a predetermined amount of the product or service that must be ordered to achieve a discounted price;
present the offer to a buyer based on a profile associated with the buyer that is distinct from the offer; and
receive orders placed by multiple buyers for the product or service based on the offer.

18. The non-transitory computer-readable storage medium of claim 17, wherein the offer further includes a list of deal rooms associated with the offer or an associated product or service.

19. The non-transitory computer-readable storage medium of claim 17, wherein the offer further includes a list of products or services associated with an offer, a merchant, or a third-party sponsor.

20. The non-transitory computer-readable storage medium of claim 17, wherein the offer further includes a list of customers or potential customers associated with the offer.

\* \* \* \* \*